(12) United States Patent
Fein et al.

(10) Patent No.: US 10,713,846 B2
(45) Date of Patent: Jul. 14, 2020

(54) SYSTEMS AND METHODS FOR SHARING AUGMENTATION DATA

(71) Applicant: Elwha LLC, Bellevue, WA (US)

(72) Inventors: Gene Fein, Westlake, CA (US); Royce A. Levien, Lexington, MA (US); Richard T. Lord, Tacoma, WA (US); Robert W. Lord, Seattle, WA (US); Mark A. Malamud, Seattle, WA (US); John D. Rinaldo, Jr., Bellevue, WA (US); Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 13/689,372

(22) Filed: Nov. 29, 2012

(65) Prior Publication Data

US 2014/0098129 A1  Apr. 10, 2014

Related U.S. Application Data

(63) Continuation-in-part of application No. 13/673,070, filed on Nov. 9, 2012, now Pat. No. 9,448,623, which is a continuation of application No. 13/672,575, filed on Nov. 8, 2012, now Pat. No. 9,141,188, which is a continuation-in-part of application No. 13/648,012, filed on Oct. 9, 2012, now Pat. No. 8,941,689, which is a continuation of application No. 13/646,147, filed on Oct. 5, 2012, now Pat. No. 8,928,695.

(51) Int. Cl.
*G06T 19/00* (2011.01)

(52) U.S. Cl.
CPC .................. *G06T 19/006* (2013.01)

(58) Field of Classification Search
CPC .................................................... G06T 19/006
USPC ......................................................... 345/633
See application file for complete search history.

(56) References Cited

U.S. PATENT DOCUMENTS

| 6,026,376 A | 2/2000 | Kenney |
| 6,091,378 A | 7/2000 | Richardson et al. |
| 6,326,985 B1 | 12/2001 | Tazoe et al. |
| (Continued) | | |

FOREIGN PATENT DOCUMENTS

| CN | 102436663 A | 5/2012 |
| EP | 1117074 A2 | 7/2001 |
| (Continued) | | |

OTHER PUBLICATIONS

PCT International Search Report; International App. No. PCT/US2014/025579; dated Jul. 29, 2014; pp. 1-4.
(Continued)

*Primary Examiner* — Shivang I Patel

(57) ABSTRACT

Computationally implemented methods and systems include acquiring one or more first augmentations for inclusion in a first augmented view of a first scene, displaying the first augmented view including the one or more first augmentations, and transmitting augmentation data associated with the one or more first augmentations to facilitate remote display of one or more second augmentations in a second augmented view of a second scene, the second scene having one or more visual items that are also included in the first scene. In addition to the foregoing, other aspects are described in the claims, drawings, and text.

36 Claims, 30 Drawing Sheets

(56) References Cited

U.S. PATENT DOCUMENTS

| | | |
|---|---|---|
| 6,425,764 B1 | 7/2002 | Lamson |
| 6,503,086 B1 | 1/2003 | Golubov |
| 6,625,299 B1 | 9/2003 | Meisner et al. |
| 6,697,645 B1 | 2/2004 | MacFarlane |
| 6,774,898 B1 | 8/2004 | Katayama et al. |
| 6,853,390 B1 | 2/2005 | Wandersleben et al. |
| 6,891,563 B2 | 5/2005 | Schofield et al. |
| 7,119,829 B2 | 10/2006 | Leonard et al. |
| 7,257,777 B1 | 8/2007 | Kanevsky et al. |
| 7,375,701 B2 | 5/2008 | Covannon et al. |
| 7,690,975 B2 | 4/2010 | Watanabe et al. |
| 7,801,328 B2 | 9/2010 | Au et al. |
| 7,956,869 B1 | 6/2011 | Gilra |
| 8,116,526 B2 | 2/2012 | Sroka et al. |
| 8,184,070 B1 | 5/2012 | Taubman |
| 8,188,880 B1 | 5/2012 | Chi et al. |
| 8,203,605 B1 | 6/2012 | Starner |
| 8,204,073 B1 | 6/2012 | Gailloux et al. |
| 8,402,356 B2 | 3/2013 | Martinez et al. |
| 8,527,943 B1 | 9/2013 | Chiluvuri |
| 8,544,033 B1 | 9/2013 | Acharya et al. |
| 8,633,970 B1 | 1/2014 | Mercay et al. |
| 8,751,948 B2 | 6/2014 | Wetzer et al. |
| 8,756,519 B2 | 6/2014 | Hunt et al. |
| 9,088,823 B1 | 7/2015 | Price |
| 2001/0030654 A1 | 10/2001 | Iki |
| 2001/0044858 A1 | 11/2001 | Rekimoto |
| 2002/0044152 A1 | 4/2002 | Abbott, III et al. |
| 2002/0144259 A1 | 10/2002 | Gutta et al. |
| 2002/0163521 A1 | 11/2002 | Ellenby et al. |
| 2002/0167522 A1 | 11/2002 | Miyazawa |
| 2003/0011639 A1 | 1/2003 | Webb |
| 2003/0037068 A1 | 2/2003 | Thomas et al. |
| 2003/0210832 A1 | 11/2003 | Benton |
| 2003/0229900 A1 | 12/2003 | Reisman |
| 2004/0046711 A1 | 3/2004 | Triebfuerst |
| 2004/0113885 A1 | 6/2004 | Genc et al. |
| 2004/0204247 A1 | 10/2004 | Walker et al. |
| 2004/0268263 A1 | 12/2004 | Van Dok et al. |
| 2005/0206583 A1 | 9/2005 | Lemelson et al. |
| 2006/0066567 A1 | 3/2006 | Scharenbroch et al. |
| 2006/0123353 A1 | 6/2006 | Matthews et al. |
| 2006/0181484 A1 | 8/2006 | Sprague et al. |
| 2006/0218031 A1 | 9/2006 | Weinberg et al. |
| 2006/0224445 A1 | 10/2006 | Axe et al. |
| 2006/0227862 A1 | 10/2006 | Campbell et al. |
| 2006/0262140 A1 | 11/2006 | Kujawa et al. |
| 2007/0162942 A1 | 7/2007 | Hamynen et al. |
| 2007/0265082 A1 | 11/2007 | Shimura et al. |
| 2007/0279521 A1 | 12/2007 | Cohen |
| 2008/0071559 A1 | 3/2008 | Arrasvuori |
| 2008/0125959 A1 | 5/2008 | Doherty et al. |
| 2008/0253737 A1 | 10/2008 | Kimura et al. |
| 2008/0266323 A1 | 10/2008 | Biocca et al. |
| 2008/0270947 A1 | 10/2008 | Elber et al. |
| 2008/0306999 A1 | 12/2008 | Finger et al. |
| 2009/0013052 A1 | 1/2009 | Robarts et al. |
| 2009/0049004 A1 | 2/2009 | Nurminen et al. |
| 2009/0117347 A1 | 5/2009 | Bauchot et al. |
| 2009/0125849 A1 | 5/2009 | Bouvin et al. |
| 2009/0158203 A1 | 6/2009 | Kerr et al. |
| 2009/0167787 A1 | 7/2009 | Bathiche et al. |
| 2009/0182499 A1 | 7/2009 | Bravo |
| 2009/0237328 A1 | 9/2009 | Gyorfi et al. |
| 2009/0262206 A1 | 10/2009 | Park |
| 2009/0265105 A1 | 10/2009 | Davis et al. |
| 2009/0300535 A1 | 12/2009 | Skourup et al. |
| 2009/0322671 A1 | 12/2009 | Scott et al. |
| 2010/0088023 A1 | 4/2010 | Werner |
| 2010/0104185 A1 | 4/2010 | Johnson et al. |
| 2010/0161409 A1 | 6/2010 | Ryu et al. |
| 2010/0164990 A1 | 7/2010 | Van Doorn |
| 2010/0208033 A1 | 8/2010 | Edge et al. |
| 2010/0214284 A1 | 8/2010 | Rieffel et al. |
| 2010/0226535 A1 | 9/2010 | Kimchi et al. |
| 2010/0238161 A1 | 9/2010 | Varga et al. |
| 2010/0253764 A1 | 10/2010 | Sim et al. |
| 2010/0295921 A1 | 11/2010 | Guthrie et al. |
| 2010/0328344 A1 | 12/2010 | Manila et al. |
| 2010/0332315 A1 | 12/2010 | Kamar et al. |
| 2010/0332993 A1 | 12/2010 | Bousseton et al. |
| 2011/0004072 A1 | 1/2011 | Fletcher et al. |
| 2011/0045905 A1 | 2/2011 | Radek |
| 2011/0055049 A1 | 3/2011 | Harper et al. |
| 2011/0074658 A1 | 3/2011 | Sato |
| 2011/0075257 A1 | 3/2011 | Hua et al. |
| 2011/0082755 A1 | 4/2011 | Itzhak |
| 2011/0098056 A1 | 4/2011 | Rhoads et al. |
| 2011/0112915 A1 | 5/2011 | Geer, III et al. |
| 2011/0128223 A1 | 6/2011 | Lashina et al. |
| 2011/0134108 A1 | 6/2011 | Hertenstein |
| 2011/0138317 A1 | 6/2011 | Kang et al. |
| 2011/0141254 A1 | 6/2011 | Roebke et al. |
| 2011/0164163 A1 | 7/2011 | Bilbrey et al. |
| 2011/0202878 A1 | 8/2011 | Park et al. |
| 2011/0209201 A1 | 8/2011 | Chollat |
| 2011/0214082 A1 | 9/2011 | Osterhout et al. |
| 2011/0216060 A1 | 9/2011 | Weising et al. |
| 2011/0227820 A1 | 9/2011 | Haddick et al. |
| 2011/0231781 A1 | 9/2011 | Betzler et al. |
| 2011/0238751 A1 | 9/2011 | Belimpasakis et al. |
| 2011/0242134 A1 | 10/2011 | Miller et al. |
| 2011/0258049 A1 | 10/2011 | Ramer et al. |
| 2011/0292220 A1 | 12/2011 | Georgis et al. |
| 2011/0310087 A1 | 12/2011 | Wright, Jr. et al. |
| 2012/0025975 A1 | 2/2012 | Richey et al. |
| 2012/0038669 A1 | 2/2012 | Lee et al. |
| 2012/0062596 A1 | 3/2012 | Bedi et al. |
| 2012/0098977 A1 | 4/2012 | Striemer et al. |
| 2012/0099800 A1 | 4/2012 | Llano et al. |
| 2012/0102439 A1 | 4/2012 | Mitchell et al. |
| 2012/0105473 A1* | 5/2012 | Bar-Zeev ............... G06T 7/70 345/633 |
| 2012/0105475 A1 | 5/2012 | Tseng |
| 2012/0113092 A1 | 5/2012 | Bar-Zeev et al. |
| 2012/0113140 A1 | 5/2012 | Hilliges et al. |
| 2012/0113274 A1 | 5/2012 | Adhikari et al. |
| 2012/0116920 A1 | 5/2012 | Adhikari et al. |
| 2012/0120101 A1 | 5/2012 | Adhikari et al. |
| 2012/0120113 A1 | 5/2012 | Hueso |
| 2012/0133650 A1 | 5/2012 | Lee |
| 2012/0147328 A1 | 6/2012 | Yahav |
| 2012/0154638 A1 | 6/2012 | Chou |
| 2012/0166435 A1 | 6/2012 | Graham et al. |
| 2012/0176410 A1 | 7/2012 | Meier et al. |
| 2012/0194549 A1 | 8/2012 | Osterhout et al. |
| 2012/0198339 A1 | 8/2012 | Williams et al. |
| 2012/0206323 A1* | 8/2012 | Osterhout ........... G02B 27/0093 345/8 |
| 2012/0218296 A1 | 8/2012 | Belirnpasakis et al. |
| 2012/0223966 A1 | 9/2012 | Lim |
| 2012/0233033 A1 | 9/2012 | Calman et al. |
| 2012/0243732 A1 | 9/2012 | Swaminathan et al. |
| 2012/0244907 A1 | 9/2012 | Athsani et al. |
| 2012/0246027 A1 | 9/2012 | Martin |
| 2012/0249416 A1 | 10/2012 | Maciocci et al. |
| 2012/0249588 A1 | 10/2012 | Tison et al. |
| 2012/0249591 A1* | 10/2012 | Maciocci et al. ............. 345/633 |
| 2012/0249741 A1 | 10/2012 | Maciocci et al. |
| 2012/0249797 A1 | 10/2012 | Haddick et al. |
| 2012/0268491 A1 | 10/2012 | Sugden et al. |
| 2012/0269494 A1 | 10/2012 | Satyanarayana et al. |
| 2012/0293548 A1 | 11/2012 | Perez et al. |
| 2012/0299962 A1 | 11/2012 | White et al. |
| 2012/0304111 A1 | 11/2012 | Queru |
| 2012/0306920 A1 | 12/2012 | Bathiche et al. |
| 2012/0308209 A1 | 12/2012 | Zaletel |
| 2012/0317484 A1 | 12/2012 | Gomez et al. |
| 2012/0324494 A1 | 12/2012 | Burger et al. |
| 2012/0327119 A1 | 12/2012 | Woo et al. |
| 2012/0329432 A1 | 12/2012 | Gupta et al. |
| 2013/0021373 A1 | 1/2013 | Vaught et al. |
| 2013/0027572 A1 | 1/2013 | Petrou |
| 2013/0032634 A1 | 2/2013 | McKirdy |

(56) References Cited

U.S. PATENT DOCUMENTS

| | | |
|---|---|---|
| 2013/0044128 A1 | 2/2013 | Liu et al. |
| 2013/0044129 A1 | 2/2013 | Latta et al. |
| 2013/0050258 A1 | 2/2013 | Liu et al. |
| 2013/0050432 A1 | 2/2013 | Perez et al. |
| 2013/0054622 A1 | 2/2013 | Karmarkar et al. |
| 2013/0057577 A1 | 3/2013 | Jeong |
| 2013/0076788 A1 | 3/2013 | Ben Zvi |
| 2013/0083003 A1 | 4/2013 | Perez et al. |
| 2013/0083007 A1 | 4/2013 | Geisner et al. |
| 2013/0083009 A1 | 4/2013 | Geisner et al. |
| 2013/0085345 A1 | 4/2013 | Geisner et al. |
| 2013/0093788 A1 | 4/2013 | Liu et al. |
| 2013/0125027 A1 | 5/2013 | Abovitz |
| 2013/0128050 A1 | 5/2013 | Aghdasi et al. |
| 2013/0128364 A1 | 5/2013 | Wheeler et al. |
| 2013/0141453 A1 | 6/2013 | Devara et al. |
| 2013/0147836 A1 | 6/2013 | Small et al. |
| 2013/0162632 A1 | 6/2013 | Varga et al. |
| 2013/0170697 A1 | 7/2013 | Zises |
| 2013/0188032 A1 | 7/2013 | Vertegaal |
| 2013/0194164 A1 | 8/2013 | Sugden et al. |
| 2013/0218721 A1 | 8/2013 | Borhan et al. |
| 2013/0234826 A1 | 9/2013 | Sekiguchi et al. |
| 2013/0278631 A1 | 10/2013 | Border et al. |
| 2013/0290233 A1 | 10/2013 | Ferren et al. |
| 2013/0326583 A1 | 12/2013 | Freihold et al. |
| 2013/0335573 A1 | 12/2013 | Forutanpour et al. |
| 2013/0342571 A1 | 12/2013 | Kinnebrew et al. |
| 2014/0002357 A1 | 1/2014 | Pombo et al. |
| 2014/0063055 A1 | 3/2014 | Osterhout et al. |
| 2014/0092130 A1 | 4/2014 | Anderson et al. |
| 2014/0100997 A1 | 4/2014 | Mayerle et al. |
| 2014/0108309 A1 | 4/2014 | Frank et al. |
| 2014/0129342 A1 | 5/2014 | Sanghavi et al. |
| 2014/0225898 A1 | 8/2014 | Fyke et al. |
| 2014/0237366 A1 | 8/2014 | Poulos et al. |

FOREIGN PATENT DOCUMENTS

| | | |
|---|---|---|
| EP | 1 271 293 A2 | 1/2003 |
| EP | 2 418 563 A2 | 2/2012 |
| EP | 2 442 539 A1 | 4/2012 |
| EP | 2 426 460 B1 | 3/2016 |
| KR | 10-2012-0066552 A | 6/2012 |
| WO | WO 2012/108721 A2 | 8/2012 |

OTHER PUBLICATIONS

Doobybrain; "GE's Augmented Reality Demo"; YouTube; uploaded Feb. 4, 2009; pp. 1-2; located at: http://www.youtube.com/watch?v=00FGtH5nkxM.

Inbar, Ori; "Top 10 Augmented Reality Demos That Will Revolutionize Video Games"; Games Alfresco; posted on Mar. 3, 2008, printed on Sep. 27, 2012; pp. 1-19; located at: http://gamesalfresco.com/2008/03/03/top-10-augmented-reality-demos-that-will-revolutionize-video-games/.

"Qualcomm Augmented Reality Sample Apps"; Qualcomm; bearing a date of May 18, 2011, printed on Sep. 27, 2012; pp. 1-2; Qualcomm Incorporated; located at: http://www.qualcomm.com/media/videos/qualcomm-augmented-reality-sample-apps?search=augmented%20reality&channel=11.

Shinymedia; "DEMO: World's First Augmented Reality Glasses-Vuzix Wrap 920 AR"; YouTube; uploaded Oct. 27, 2010; pp. 1-2; located at: http://www.youtube.com/watch?v=xfiZQW0k2Ro.

Taoistflyer; "Google Glasses (How It Works)"; YouTube; uploaded Apr. 7, 2012; pp. 1-2; located at: http://www.youtube.com/watch?v=Nc4ox89bofk&feature=related.

Total Immersion Home Page; bearing a date of 2012, printed on Sep. 27, 2012; pp. 1-2; Total Immersion; located at: http://www.t-immersion.com/.

Toucharcade; "Augmented Reality Demo"; YouTube; uploaded Mar. 26, 2009; pp. 1-2; located at: http://www.youtube.com/watch?v=QoZRHLmUKtM.

Vuzix—View the Future Today Home p.; bearing a date of Sep. 18, 2012, printed on Sep. 27, 2012; p. 1; Vuzix; located at: http://www.vuzix.com/home/.

Broll et al.; "An Infrastructure for Realizing Custom-Tailored Augmented Reality User Interfaces"; IEEE Transactions on Visualization and Computer Graphics; Nov./Dec. 2005; pp. 722-733; vol. 11, No. 6; IEEE Computer Society.

Irawati et al.; "VARU Framework: Enabling Rapid Prototyping of VR, AR and Ubiquitous Applications"; IEEE Virtual Reality Conference, Reno, NV; Mar. 8-12, 2008; pp. 201-208.

PCT International Search Report; International App. No. PCT/US2014/025639; dated Jul. 17, 2014; pp. 1-4.

PCT International Search Report; International App. No. PCT/US2014/025604; dated Jul. 11, 2014; pp. 1-3.

PCT International Search Report; International App. No. PCT/US2014/025669; dated Jul. 9, 2014; pp. 1-3.

PCT International Search Report; International App. No. PCT/US2014/016022; dated Jun. 6, 2014; pp. 1-3.

Bonsor, Kevin; "How Augmented Reality Works"; bearing a date of Dec. 20, 2010; located at: http://computer.howstuffworks.com/augmented-reality.htm; pp. 1-3.

Butz, et al.; "Enveloping Users and Computers in a Collaborative 3D Augmented Reality"; bearing a date of Oct. 20-21, 1999; pp. 35-44; Augmented Reality IEEE.

European Patent Office, Extended European Search Report, Pursuant to Rule 62 EPC; App. No. EP 14 76 7447; dated Sep. 21, 2016 (received by our agent on Oct. 6, 2016); pp. 1-7.

European Patent Office, Extended European Search Report, Pursuant to Rule 62 EPC; App. No. EP 14 76 9243.8; dated Oct. 12, 2016 (received by our agent on Oct. 17, 2016); pp. 1-10.

European Patent Office, Extended European Search Report, Pursuant to Rule 62 EPC; App. No. EP 14 77 0781.4; dated Oct. 12, 2016 (received by our agent on Oct. 13, 2016); pp. 1-10.

European Patent Office, Extended European Search Report, Pursuant to Rule 62 EPC; App. No. EP 14 77 0115.5; dated Oct. 12, 2016 (received by our agent on Oct. 13, 2016); pp. 1-10.

Rekimoto, et al.; "Augment-able Reality: Situated Communication through Physical and Digital Spaces"; bearing a date of Oct. 19-20, 1998; pp. 68-75; Wearable Computers.

Rekimoto, et al.; "CyberCode: Designing Augmented Reality Environments with Visual Tags"; bearing a date of Apr. 1, 2000; pp. 1-10; ACM.

Takacs, Gabriel et al.; "Outdoors Augmented Reality on Mobile Phone using Loxel-Based Visual Feature Organization"; Multimedia Information Retrieval 2008; bearing a date of Oct. 30-31, 2008; pp. 427-434; ACM.

European Patent Office, Supplementary European Search Report, Pursuant to Rule 62 EPC; App. No. EP 14751531.6; dated Sep. 9, 2016 (received by our Agent on Sep. 9, 2016); pp. 1-11.

Correia et al.; "HyperMem: A System to Store and Replay Experiences in Mixed Reality Worlds"; Proceedings of the 2005 International Conference on Cyberworlds (CW' 05); bearing a date of 2005; created on Oct. 25, 2016; 8 pages; IEEE.

Chinese State Intellectual Property Office, First Office Action, App. No. 201480028245.3 (Based on PCT Patent Application No. PCT/2014/025579); dated Feb. 14, 2018; (machine translation provided herewith, 13 pages total).

European Patent Office, Communication Pursuant to Article 94(3) EPC; App. No. EP 14770115.5; dated Oct. 15, 2018 (received by our Agent Oct. 17, 2018); pp. 1-9.

European Patent Office, Communication pursuant to Article 94(3) EPC; App. No. EP 14751531.6; dated Feb. 12, 2020 (received by our Agent on Feb. 12, 2020); pp. 1-5.

European Patent Office, Communication pursuant to Article 94(3) EPC; App. No. EP 14767447.7; dated Nov. 21, 2019 (recived by our Agent on Nov. 25, 2019); pp. 1-6.

* cited by examiner

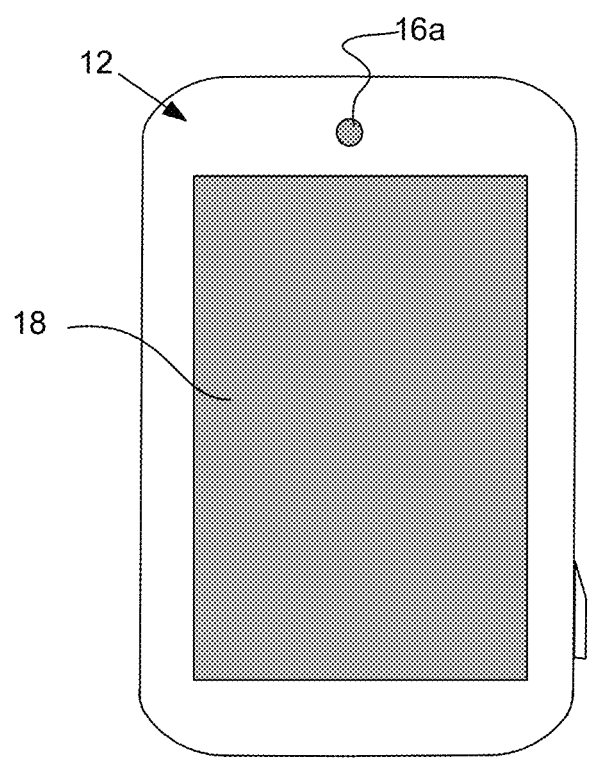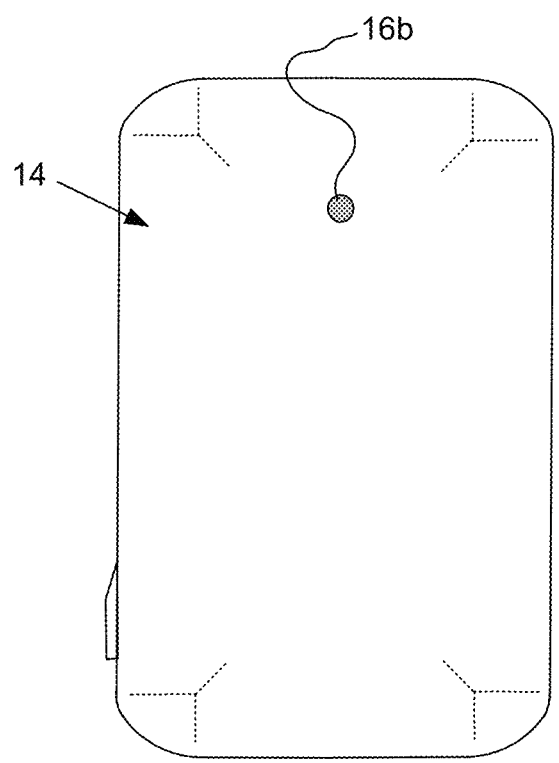
FIG. 1A
FIG. 1B

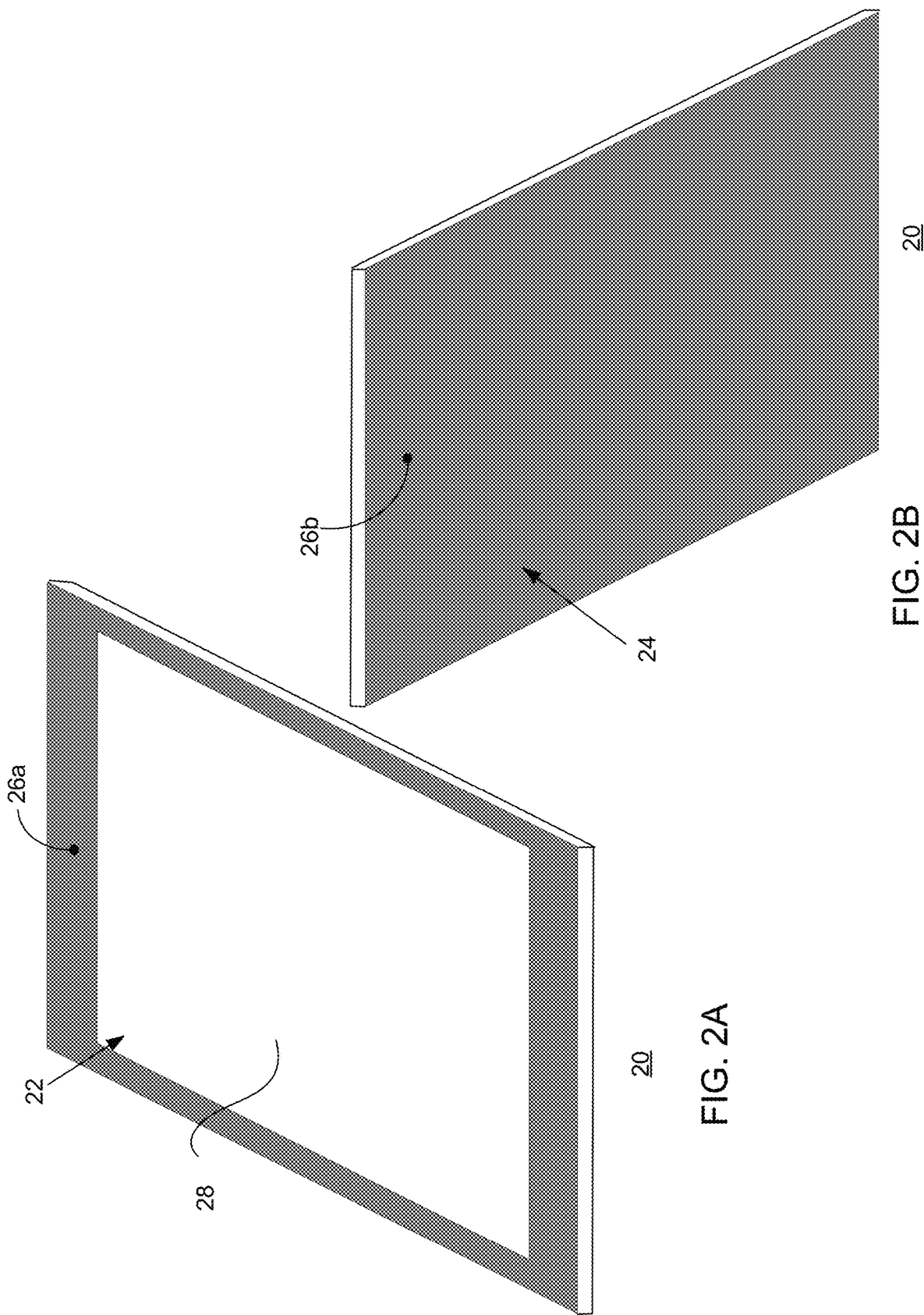

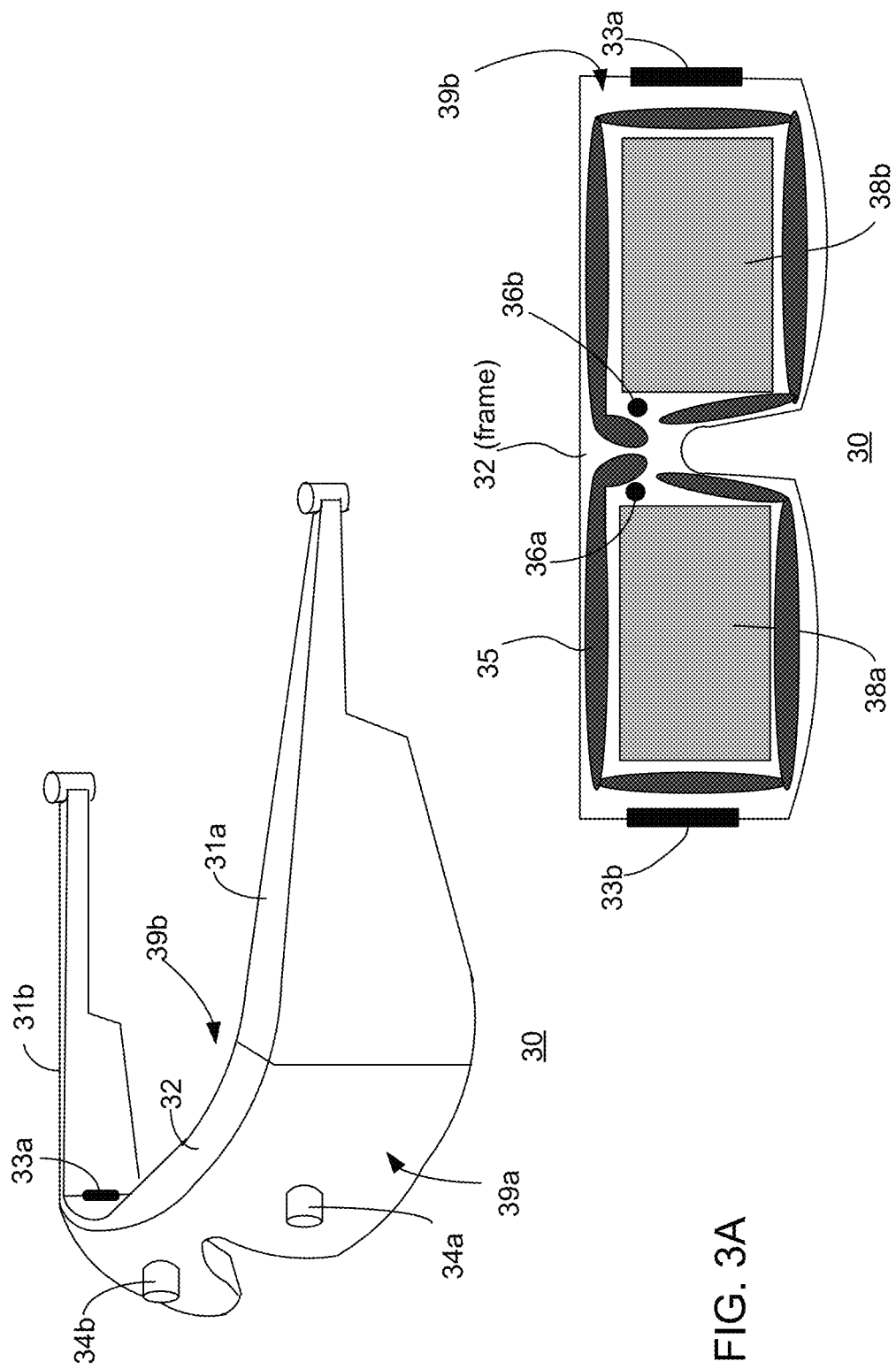

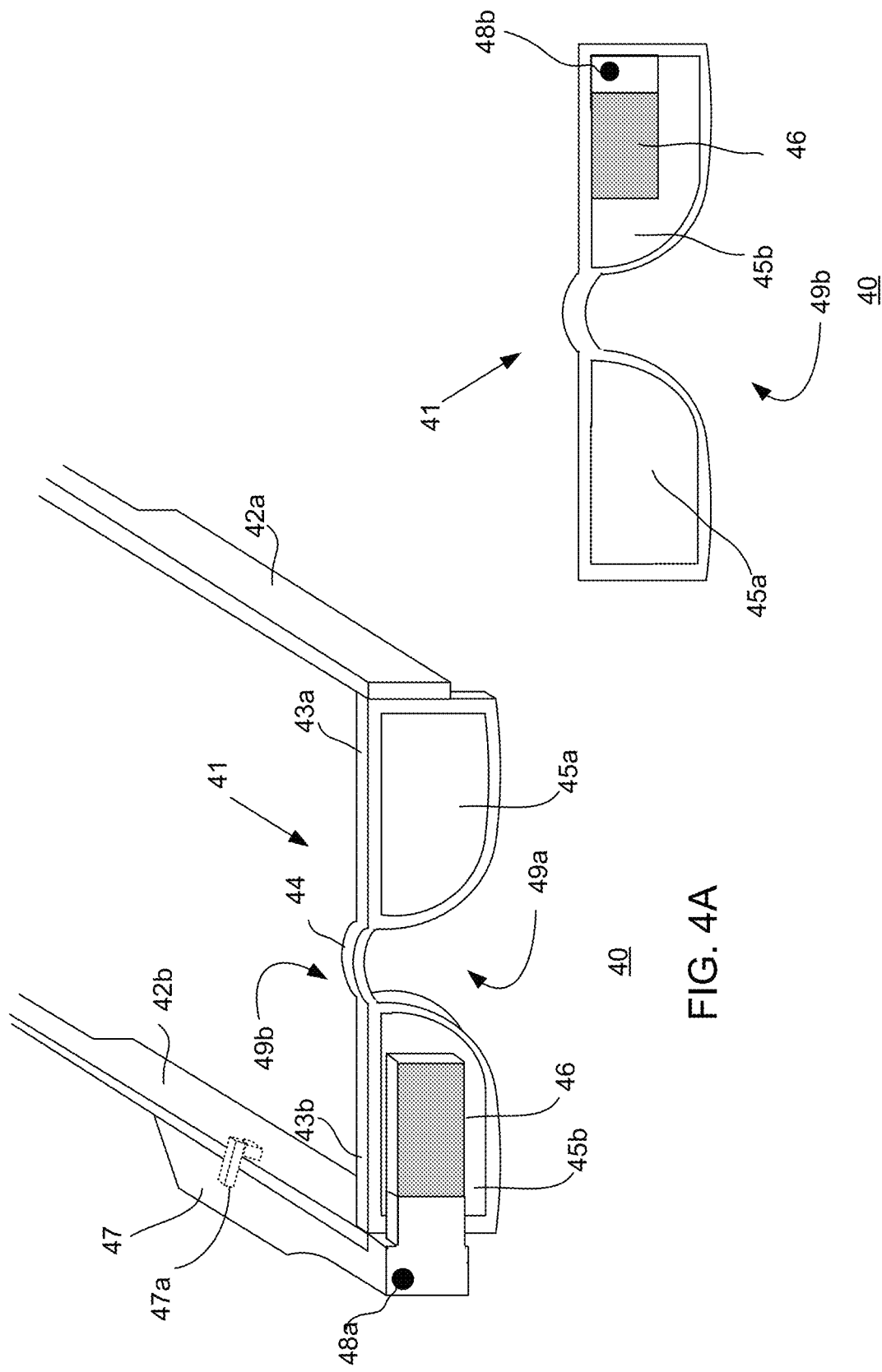

Actual View 60c

Augmented View 60d

Augmented View 60e

Augmented View 60f

Actual View 60g

Augmented View 60h

Augmented View 60i

Augmented View 60k

102* Augmentation Procuring Module

- 801 Memory Augmentation Procuring Module
- 802 Network Augmentation Procuring Module
- 804 Associated Party Ascertaining Module
  - 805 Location Associated Party Ascertaining Module
  - 806 Item Associated Party Ascertaining Module
- 808 Augmentation Seeking Module
- 810 Augmentation Obtaining Module
- 812 Visual Item Sensing Module
- 814 Scene Location Detecting Module

FIG. 8A

106* Augmentation Data Relaying Module

- 816 Network Relaying Module
- 818 User Responsive Augmentation Data Relaying Module
- 820 Content Information Augmentation Data Relaying Module
- 821 Format Information Augmentation Data Relaying Module
  - 822 Visibility Rule Relaying Module

FIG. 8B

107* Usage/Non-Usage Data Acquiring Module

- 824 Network Acquiring Module
- 826 Successful Reception Indicating Data Acquiring Module
- 828 Remotely Displayed Indicating Data Acquiring Module
- 830 Modification Indicating Data Acquiring Module
- 832 Format Indicating Data Acquiring Module
- 834 Content Information Acquiring Module

FIG. 8C

110 User Interface

- 852 Display Monitor[s]
- 854 Visual Capturing Device[s]
- 856 Audio Speaker[s]
- 858 Audio Input Device[s]
- 860 Keyboard/Keypad[s]

FIG. 8D

SYSTEMS AND METHODS FOR SHARING AUGMENTATION DATA

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation-in-part of U.S. patent application Ser. No. 13/673,070, entitled PRESENTING AN AUGMENTED VIEW IN RESPONSE TO ACQUISITION OF DATA INFERRING USER ACTIVITY, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 9, Nov., 2012, which is currently co-pending or is an application of which a currently co-pending application is entitled to the benefit of the filing date, and which is a continuation of U.S. patent application Ser. No. 13/672,575, entitled PRESENTING AN AUGMENTED VIEW IN RESPONSE TO ACQUISITION OF DATA INFERRING USER ACTIVITY, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 8, Nov., 2012.

For purposes of the USPTO extra-statutory requirements, the present application constitutes a continuation-in-part of U.S. patent application Ser. No. 13/648,012, entitled FORMATTING OF ONE OR MORE PERSISTENT AUGMENTATIONS IN AN AUGMENTED VIEW IN RESPONSE TO MULTIPLE INPUT FACTORS, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 9, Oct., 2012, which is currently co-pending or is an application of which a currently co-pending application is entitled to the benefit of the filing date, and which is a continuation of U.S. patent application Ser. No. 13/646,147, entitled FORMATTING OF ONE OR MORE PERSISTENT AUGMENTATIONS IN AN AUGMENTED VIEW IN RESPONSE TO MULTIPLE INPUT FACTORS, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 5, Oct., 2012.

RELATED APPLICATIONS

None
The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s). If the listings of applications provided above are inconsistent with the listings provided via an ADS, it is the intent of the Applicant to claim priority to each application that appears in the Priority Applications section of the ADS and to each application that appears in the Priority Applications section of this application. All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

In one or more various aspects, a method includes but is not limited to acquiring one or more first augmentations for inclusion in a first augmented view of a first scene, displaying the first augmented view including the one or more first augmentations, and transmitting augmentation data associated with the one or more first augmentations to facilitate remote display of one or more second augmentations in a second augmented view of a second scene, the second scene having one or more visual items that are also included in the first scene. In some implementations, at least one of the acquiring one or more first augmentations for inclusion in a first augmented view of a first scene, displaying the first augmented view including the one or more first augmentations, or transmitting augmentation data associated with the one or more first augmentations to facilitate remote display of one or more second augmentations in a second augmented view of a second scene, the second scene having one or more visual items that are also included in the first scene being performed by a machine, article of manufacture, or composition of matter. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein—referenced method aspects depending upon the design choices of the system designer, and limited to patentable subject matter under 35 USC 101.

In one or more various aspects, a system includes, but is not limited to, means for acquiring one or more first augmentations for inclusion in a first augmented view of a first scene, means for displaying the first augmented view including the one or more first augmentations, and means for transmitting augmentation data associated with the one or more first augmentations to facilitate remote display of one or more second augmentations in a second augmented view of a second scene, the second scene having one or more visual items that are also included in the first scene. In addition to the foregoing, other system aspects are described in the claims, drawings, and text forming a part of the disclosure set forth herein.

In one or more various aspects, a system includes, but is not limited to, circuitry for acquiring one or more first augmentations for inclusion in a first augmented view of a first scene, circuitry for displaying the first augmented view including the one or more first augmentations, and circuitry for transmitting augmentation data associated with the one or more first augmentations to facilitate remote display of one or more second augmentations in a second augmented view of a second scene, the second scene having one or more visual items that are also included in the first scene. In addition to the foregoing, other system aspects are described in the claims, drawings, and text forming a part of the disclosure set forth herein.

In one or more various aspects, a computer program product, comprising a signal bearing non-transitory storage medium, bearing one or more instructions including, but not limited to, acquiring one or more first augmentations for inclusion in a first augmented view of a first scene, displaying the first augmented view including the one or more first augmentations, and transmitting augmentation data associated with the one or more first augmentations to facilitate remote display of one or more second augmentations in a second augmented view of a second scene, the second scene having one or more visual items that are also included in the first scene. In addition to the foregoing, other computer program product aspects are described in the claims, drawings, and text forming a part of the disclosure set forth herein.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIGS. 1A and 1B show the front and back views of an augmented reality (AR) device that is in the form of a smartphone 10.

FIGS. 2A and 2B show the front and back views of an augmented reality (AR) device that is in the form of a tablet computer 20.

FIGS. 3A and 3B show different views of an augmented reality (AR) device that is in the form of a goggle 30.

FIGS. 4A and 4B show different views of an augmented reality (AR) device that is in the form of a goggle 40.

FIG. 8A shows another perspective of the augmentation procuring module 102\* of FIGS. 7A and 7B (e.g., the augmentation procuring module 102' of FIG. 7A or the augmentation procuring module 102" of FIG. 7B) in accordance with various implementations.

FIG. 8B shows the augmentation data relaying module 106\* of FIGS. 7A and 7B (e.g., the augmentation data relaying module 106' of FIG. 7A or the augmentation data relaying module 106" of FIG. 7B) in accordance with various implementations.

FIG. 8C shows the usage/non-usage data acquiring module 107\* of FIGS. 7A and 7B (e.g., the usage/non-usage data acquiring module 107' of FIG. 7A or the usage/non-usage data acquiring module 107" of FIG. 7B) in accordance with various implementations.

FIG. 8D shows another perspective of the user interface 110 of FIGS. 7A and 7B.

DETAILED DESCRIPTION

Figure 5:
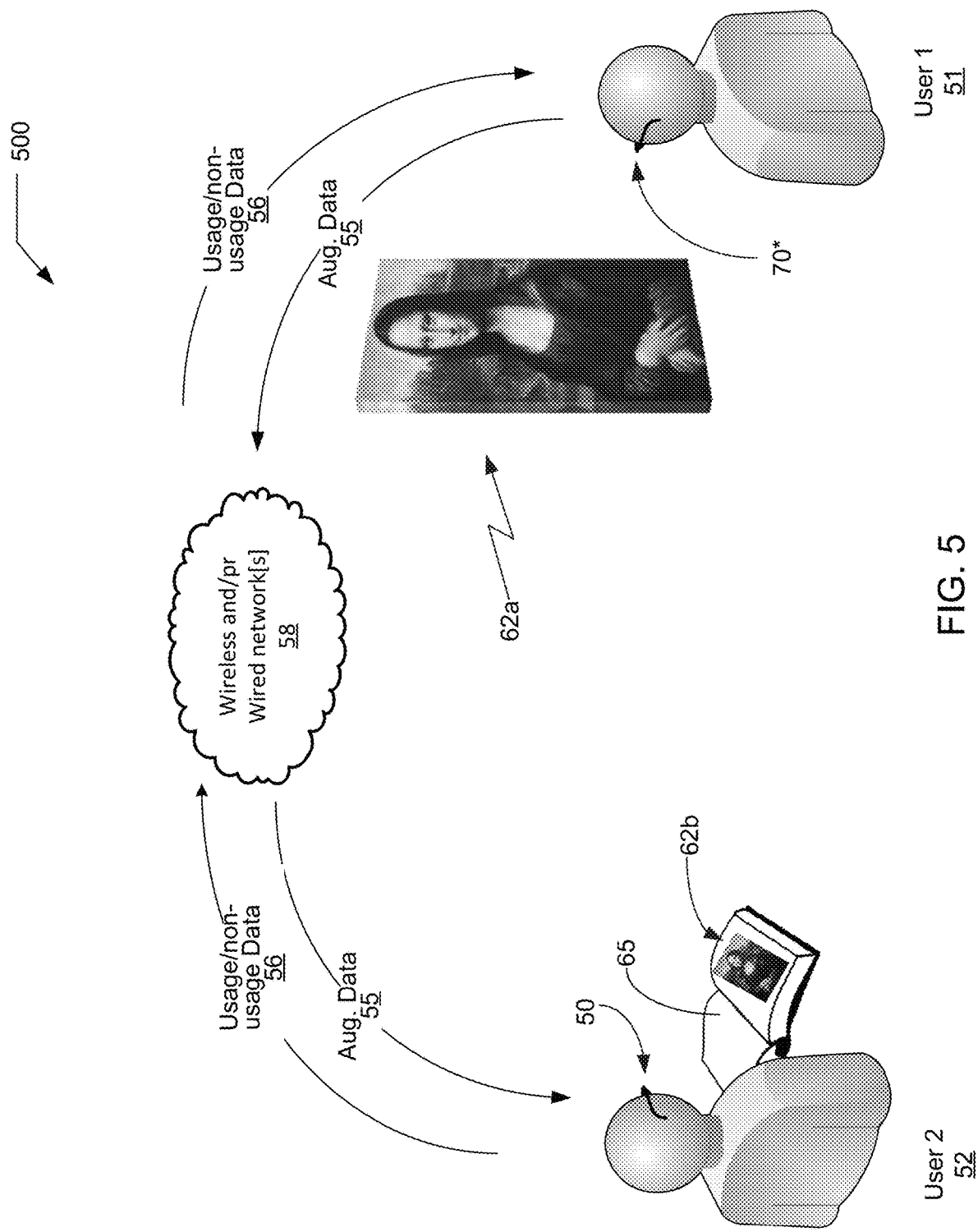
FIG. 5 shows an example environment 500 in which a first user 51 who is using an augmented reality (AR) device 70\* exchanges augmentation data 55 and usage/non-usage data 56 with a second user 52 who is using a second AR device 50.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

The evolution of personal computing technology over the past 40 years has been simply breathtaking, evolving from clunky large personal desktop computing devices with poor resolution television monitors and limited functionality to sleek and powerful mobile computing devices such as tablet computers and smartphones. As the personal computing technology continues to evolve a number of promising and exciting new technologies have emerged that are rapidly being developed for widespread personal use. One of the most promising new technologies is Augmented Reality (or simply "AR").

Wikipedia™ defines Augmented Reality as "a live, direct or indirect, view of a physical, real-world environment whose elements are augmented by computer-generated sensory input such as sound, video, graphics or GPS data." In order to facilitate understanding of the various concepts, processes, and systems to be discussed herein, certain basic terms and phrases will now be introduced and elucidated. For example, in the following the terms "augmentation," "augmented view," "actual view," "scene from a real environment," or variations thereof, are repeatedly recited. For purposes of the following, the phrase "scene" or "scene from a real environment" will be in reference to an actual or true (visual) scene from an actual physical environment (as opposed to a virtual environment or world) in the proximate vicinity of an AR device and/or the user of the AR device (herein "AR device user"). For purposes of the following description, the phrase "actual view" is in reference to a true or unmodified (or substantially true or unmodified) view of a scene from the real environment. The phrase "augmented view," in contrast, is in reference to a view of an actual scene from the real environment that has been augmented (e.g., modified) and that may be presented (e.g., displayed or transmitted) through an AR system. An "augmentation" is any modification, revision, or addition that may be included in an augmented view of a scene from the real environment and that may not be present in the actual view of the scene from the real environment.

There are at least two types of computing devices that can be used to implement AR technology: "specifically-designed" AR systems and "nonspecifically-designed" AR systems. Nonspecifically-designed AR systems are general purpose computing systems or devices that can be configured to implement AR functionalities by executing, for example, AR software applications. Examples of such devices include, for example, personal mobile computing/communication devices such as tablet computers and smartphones. In contrast, specifically—designed AR systems are systems or devices that have been specifically designed to implement AR functionalities. Specifically-designed AR systems may come in a variety of forms but are most commonly in the form of a head-mounted display (HMD) such as in the form of eyeglasses, goggles, helmet, and so forth. These devices are sometimes referred to as "wearable computing devices." Typically these wearable computing devices will include one or more features that allow a user to wear the device on his/or her head (e.g., a coupling device for coupling the AR device to the user's head). Such features include, for example, a strap, a pair of earpieces or temple pieces (e.g., the parts of goggles or glasses that are attached to the frame of, for example, a glasses and that extend out to the ears of the user holding the eyeglasses frame to the face of the user—see example 42a or 42b of FIG. 4A, or in the case of a helmet-type AR device the helmet structure itself). Alternatively, a wearable computing device may be made wearable by having a feature (e.g., one or more clips, straps such as a Velcro strap, magnets, and/or hooks) that allows it to be attached or clipped onto the frame of a pair glasses or goggles thus allowing the AR device to be coupled to the user's head.

All of these devices (e.g., specifically-designed AR systems and nonspecifically-designed AR systems) will generally have certain common components including one or more cameras (e.g., digital, web, and/or HD cameras), one or more displays (e.g., LCD displays or see-through displays), and logic for processing data generated by the one or more cameras and/or for generating and merging computer generated data or images with actual views or images of scenes from real world environment to generate augmented views of the scenes of the real world environment. Although most if not all current AR systems will contain these same basic components (e.g., camera, display, etc.), they can, however, take on a wide range of form factors as briefly described above (e.g., tablet computer, goggles, and so forth).

FIGS. 1A and 1B, 2A and 2B, 3A and 3B, and 4A and 4B illustrate some of the form factors that current AR devices can take on. For example, FIG. 1A depicts the front-side 12 (e.g., the side of a personal computing/communication device that a display is located or disposed on), respectively, of a nonspecifically-designed AR system that is in the form of a smartphone 10 and that can be configured or designed to implement one or more AR functionalities. FIG. 1B shows the backside 14 (e.g., the side of a personal computing/communication device that is opposite of the front-side 12 personal computing/communication device) of the exemplary smartphone 10 of FIG. 1A. The exemplary smartphone 10 may include a display 18, such as a touchscreen or liquid crystal display (LCD), on the front-side 12 of the smartphone 10. The smartphone 10 of FIGS. 1A and 1B is also depicted as having lens 16a for a forward-facing camera on the front-side 12 and lens 16b for a rear-facing camera on the back-side 14 of the smartphone 10. When employed to provide one or more augmented views of one or more scenes of real world environments, the display 18 may be used in order to display the augmented views. In some cases, the forward-facing camera associated with lens 16a may be used in order to track the gaze or focus of one or more eyes of a user. The rear-facing camera that is associated with lens 16b, on the other hand, may be used to capture (e.g., sense and/or record) actual scenes of real world environments in order to generate augmented views of those actual scenes. The generated augmented views may then be displayed through display 18.

FIGS. 2A and 2B illustrates the front-side 22 (e.g., the side of a personal computing/communication device that a display is located or disposed on) and the backside 24 (e.g., the side of the computing/communication device that is opposite of the front-side of the computing/communication device), respectively, of a nonspecifically-designed AR system that is in the form of a tablet computer 20 and that can be configured or designed to implement one or more AR functionalities. In FIGS. 2A and 2B, the tablet computer 20 is depicted as having a display 28, such as a touchscreen, on the front-side 22 of the tablet computer 20. The tablet computer 20 is also depicted as having lens 26a for a forward-facing camera on the front-side 22 and lens 26b for a rear-facing camera on the back-side 24 of the tablet computer 20.

In some cases, the forward-facing camera associated with lens 26a may be used in order to track the gaze or focus of one or more eyes of a user. The rear-facing camera associated with lens 26b on the back-side 24 of the tablet computer 20 may be used to capture (e.g., sense and/or record) actual scenes of real world environments in order to generate augmented views of those actual scenes. Note that in some cases, a single camera may be coupled to both lens 26a and lens 26b, thus the single camera can act as both a forward-facing and rear-facing camera. The generated augmented views may then be displayed through display 28. References to "real environment" or "real world environment" herein may be in reference to true or actual physical environments rather than to a virtual environment or virtual world.

FIGS. 3A and 3B illustrate a specifically-designed AR system in the form of video goggles 30 that can implement one or more AR functionalities. In particular, FIG. 3A illustrates a perspective view of the video goggle 30, which includes, among other things, a frame piece 32, a left temple 31a, and a right temple 31b. Disposed on the front-side 39a of the frame piece 32 are two forwarding looking lenses 34a and 34b for a pair of corresponding forward-looking cameras for capturing (e.g., recording, scanning, sensing, etc.) actual scenes of real world environments in order to generate augmented views of those actual scenes. FIG. 3B illustrates a view of the backside 39b of the frame piece 32 of the exemplary video goggles 30 of FIG. 3A. The backside 39b of the frame piece 32 is depicted as including a left display 38a and a right display 38b, a rim 35 surrounding the left display 38a and the right display 38b, a left lens 36a for a left camera and a right lens 36b for a right camera, and a left hinge 33b and a right hinge 33a. The rim 35 that may surround the left display 38a and the right display 38b may be a soft, semi-soft, or hard rim that in some cases may act as a cushion, as well as a barrier to prevent excess light from entering a user's field of view (thus allowing the user to better view the left and right displays 38a and 38b).

The forward-looking cameras associated with the forward-looking lens 34a and 34b may be used to capture (e.g., sense and/or record) actual scenes of real world environments in order to generate augmented views of those actual scenes. These augmented views that are generated may then be displayed through displays 38a and 38b. Note that in alternative implementations, the video goggle 30 may only employ a single forward-looking lens for a single forward-looking camera rather than employing two forward-looking lenses 34a and 34b for two forward-looking cameras as illustrated in FIG. 3A. In such implementations, the single forward-looking lens may be disposed at the mid-point or bridge part of the frame piece 32 above where a user's nose would be positioned. The output associated with the corresponding single forward-looking camera would then be displayed through both displays 38a and 38b.

The video goggles 30 may also include inward-looking lenses 36a and 36b as depicted in FIG. 3B for two inward-looking cameras (not shown) on the backside 39b of the frame piece 32 and disposed between the displays 38a and 38b and rim 35. The inward-looking cameras may be employed in order to track the movements as well as the gaze and focus of one or more eyes of a user. Note that alternatively, the video goggles 30 may include fewer or more inward-looking cameras and inward-looking lenses. Further, there is no requirement that a corresponding camera is needed for each inward-looking lens as it may be possible to employ, for example, a single camera for viewing through multiple lenses.

The frame piece 32, the left temple 31a, and the right temple 31b may house various electronics that are designed for, for example, processing data provided by the various cameras (e.g., forward-looking as well as backward looking cameras), and for generating augmented views of scenes from real world environment that may be displayed through displays 38a and 38b. The types of electronics that may be included with the video goggles 30 may include, for example, the same or similar types of electronics (e.g., microprocessors, controllers, network interface card, memory, etc.) that are often found in mobile computing/communication devices such as the smartphone 10 or the tablet computer 20 described earlier. The left temple 31a and the right temple 31b are features that allow the AR system to be worn on a user's head.

Turning now to FIGS. 4A and 4B, which illustrate a specifically-designed AR system that is in the form of electronic glasses 40 that can implement one or more AR functionalities. In particular, FIG. 4A illustrates a perspective view of the electronic glasses 40, which includes, among other things, a frame piece 41 (which further includes a left rim piece 43a, a right rim piece 43b, and a bridge 44), a left temple 42a, a right temple 42b, a left lens 45a, a right lens 45b, a see-through display 46, and electronics housing 47 (e.g. note that in some cases, the electronics housing 47 may include an optional clip 47a for coupling the electronics housing 47 to the right temple 42b). The frame piece 41 having a front-side 49a and a backside 49b opposite of the front-side 49a. Disposed at the end of the electronics housing 47 is a forward-looking lens 48a for a corresponding forward-looking camera for capturing (e.g., recording, scanning, sensing, etc.) actual scenes of real world environments in order to generate augmented views of those actual scenes. In some alternative implementations, the forward-looking lens 48a may be alternatively located at bridge 44 of the frame piece 41 or at some other location. Note that the left lens 45a and the right lens 45b are optional and are not necessary for implementing AR functionalities.

In FIG. 4A, the see-through display 46 is depicted as covering only a portion of the right lens 45b and being depicted as being attached to the end of the electronics housing 47. Thus, the see-through display 46 may be used to display and overlay computer generated data and/or images onto portions of views of actual scenes of the real world environment that a user might see through right lens 45b. Note again that since the see-through display 46 covers only a portion of the right lens 45b, only a portion of the view that a user may see through the right lens 45b may be augmented (e.g., modified). In some other alternative implementations, the see-through display 46 may alternatively cover the entire right lens 45b so that the entire view of the user through the right lens 45b may be augmented if needed. Although the electronic glasses 40 in FIGS. 4A and 4B is depicted as having only one see-through display 46 over the right lens 45b, in alternative implementations, a second see-through display may be disposed over the left lens 45a. The left temple 42a and the right temple 42b are features that allow the AR system to be worn on a user's head.

FIG. 4B depicts a view of the backside 49b of the frame piece 41 of the electronic glasses 40 depicted in FIG. 4A. In FIG. 4B, the see-through display 46 can be seen through the clear right lens 45b. Further illustrated in FIG. 4B is an inward-looking lens 48b that can be seen through the clear right lens 45b and which is for a corresponding inward-looking camera. As illustrated the inward-looking lens 48b is disposed on the electronics housing 47 near the see-through display 46. The inward-looking cameras may be employed in order to track the movements as well as the gaze and focus of the right eye of a user. The placement of the inward-looking lens 48b is a design choice and may be located elsewhere so long as it has a view to the right eye of a user. In alternative implementations, a second inward-looking lens for a second inward-looking camera may be included in order to track and monitor the movements as well as the gaze and focus of the left eye of the user. In the exemplary electronic glasses 40 illustrated in FIG. 4A, all of the major components are depicted as being located on the right-side of the electronic glasses 40. Alternatively, these components (e.g., electronic housing 47, see-through display 46, and so forth) may be alternatively or additionally located on the left-side of the electronic glasses 40.

The electronics housing 47 may house various electronics including electronics that are designed for, for example, processing data provided by the various cameras (e.g., forward-looking as well as backward looking cameras), and for generating augmented views of scenes from real world environment that may be displayed through see-through display 46. The types of electronics that may be included with the electronic glasses 40 may include, for example, the types of electronics (e.g., microprocessors, controllers, network interface card, memory, camera, battery, etc.) that are often found in mobile computing/communication devices such as the smartphone 10 or the tablet computer 20 described earlier.

In some cases, the electronic housing 47 (and its contents including one or more cameras) and the see-through display 46 may be a separate unit that can be clipped onto a prescription or non-prescription eyeglasses. In such an embodiment, the electronic housing 47 may include one or more features (e.g. one or more clips, magnets, straps, and so forth) that allows the housing to be worn by a user by allowing the electronic housing 47 to be attached to a pair of eye-glasses or goggles.

There are many types of augmentations that may be provided through AR systems including, for example, augmentations in the form of text that is added to an augmented view of a scene from the real physical environment, an augmentation in the form of 2 or 3-dimensional item (which may or may not be an animated item that moves) that is added to an augmented view, and/or an augmentation that simply modifies, emphasizes, deletes, or de-emphasizes an existing real world item (e.g., intensity of light, color of a car, removal of undesirable elements in the corresponding real field of view such as rubbish on the ground, etc.) in the augmented view. In some cases, informational augmentations in the form of, for example, textual augmentations may be included in an augmented view of a scene from the real environment in order to display information related to, for example, the scene from the real environment or a visual item included in the scene from the real environment. For example, if an AR device is being used to view the front of a retail store, then the AR device may be designed to include into the augmented view of the retail store sales and discount information related to the retail store.

In current AR systems, the insertion or inclusion of an augmentation in an augmented view of an actual scene of the real environment may be prompted by a variety of factors. For example, one type of augmentation that many currently available AR systems are designed to include into an augmented view of an actual scene of the real environment is a vision-based augmentation that depends, for its existence or inclusion in the augmented view, on the presence of a visual cue in the actual view of a scene from the real environment. That is, in many currently available AR systems, an augmentation will be included into an augmented view only when a visual cue (e.g., a visual marker or a visual pattern) is detected in the actual view of a scene from the real environment. In some cases, the visual cue that may be the basis for the inclusion of the augmentation in the augmented view may be a visual marker (e.g., a recognizable symbol or pattern such as the face of a dollar bill) that may have been purposefully placed in an actual scene of the real environment in order to prompt an AR system to insert a particular augmentation into the augmented view of the actual scene of the real environment. In other cases, the visual cue may be a recognizable or identifiable visual pattern (e.g., a human face) that may be recognized using image feature analysis (e.g., image tracking such as Parallel Tracking).

There are, of course, other types of augmentations that currently available AR systems can provide or have been proposed that depend, for their existence or inclusion in an augmented view, on factors other than visual cues in the actual views of scenes of the real environment. For example, in some current AR systems, an augmentation can be provided that could depend, for its existence in the augmented view, on the location and/or orientation of the AR system that is presenting (e.g., displaying and/or transmitting) the augmented view. That is, there are several currently available AR systems that are designed to insert one or more augmentations into an augmented view based on the location of the AR system and/or which direction is the AR system "facing" (e.g., east, west, north, up, down, etc.).

As the AR technology evolves and the use of AR devices becomes more widespread, the ability to share augmentations between AR device users may become desirable. That is, it is contemplated that in the future augmentations may be provided from a variety of sources. For example, in some cases an augmentation, such as an informational augmentation that provides information related to an item visible through an AR device, may be provided by third party sources (e.g., retail stores, schools, sports arenas, and so forth) that may be associated with the various scenes or visual items viewed through AR devices. For example, if an AR user enters a particular shopping mall, then an informational augmentation providing retail information related to that mall may be provided to the AR user through his or her AR device. Such informational augmentation may be downloaded to the AR device only when the AR device detects that it is in the proximate vicinity of the mall or when the AR device visually detects one or more visual cues (e.g., visual markers) associated with the mall that prompts the AR device to acquire the appropriate information augmentation from one or more sources (e.g., wireless routers or servers) affiliated with the mall. In contrast, other AR device users who are not in the vicinity of the mall or do not have visual access to the one or more visual cues associated with the mall may not have access to such informational augmentations even though such augmentations may be useful to the other AR device users (e.g., the other AR device users may be interested in what is on sale at the mall). Such augmentations may be particularly useful when the other AR device user or users are in communication with the first AR user who is at the mall. That is, it may be helpful to facilitate communication between two multiple AR device users when all of the AR device users have access to the same augmentations. Thus, the ability to be able to share augmentations between AR device users, in real-time in some cases, may be greatly beneficial.

In accordance with various embodiments, computationally implemented methods, systems, circuitry, articles of manufacture, and computer program products are described herein that are designed to, among other things, obtain at a first AR device one or more augmentations for inclusion in a first augmented view of a first scene that is to be visually presented by the first AR device; and relaying augmentation data associated with the one or more first augmentations to a second AR device to facilitate at the second AR device the remote display of one or more second augmentations in a second augmented view of a second scene.

More particularly, the computationally implemented methods, systems, circuitry, articles of manufacture, and computer program products may be designed to, among other things, acquiring one or more first augmentations for inclusion in a first augmented view of a first scene, displaying the first augmented view including the one or more first augmentations, and transmitting augmentation data associated with the one or more first augmentations to facilitate remote display of one or more second augmentations in a second augmented view of a second scene, the second scene having one or more visual items that are also included in the first scene.

Figure 7A:
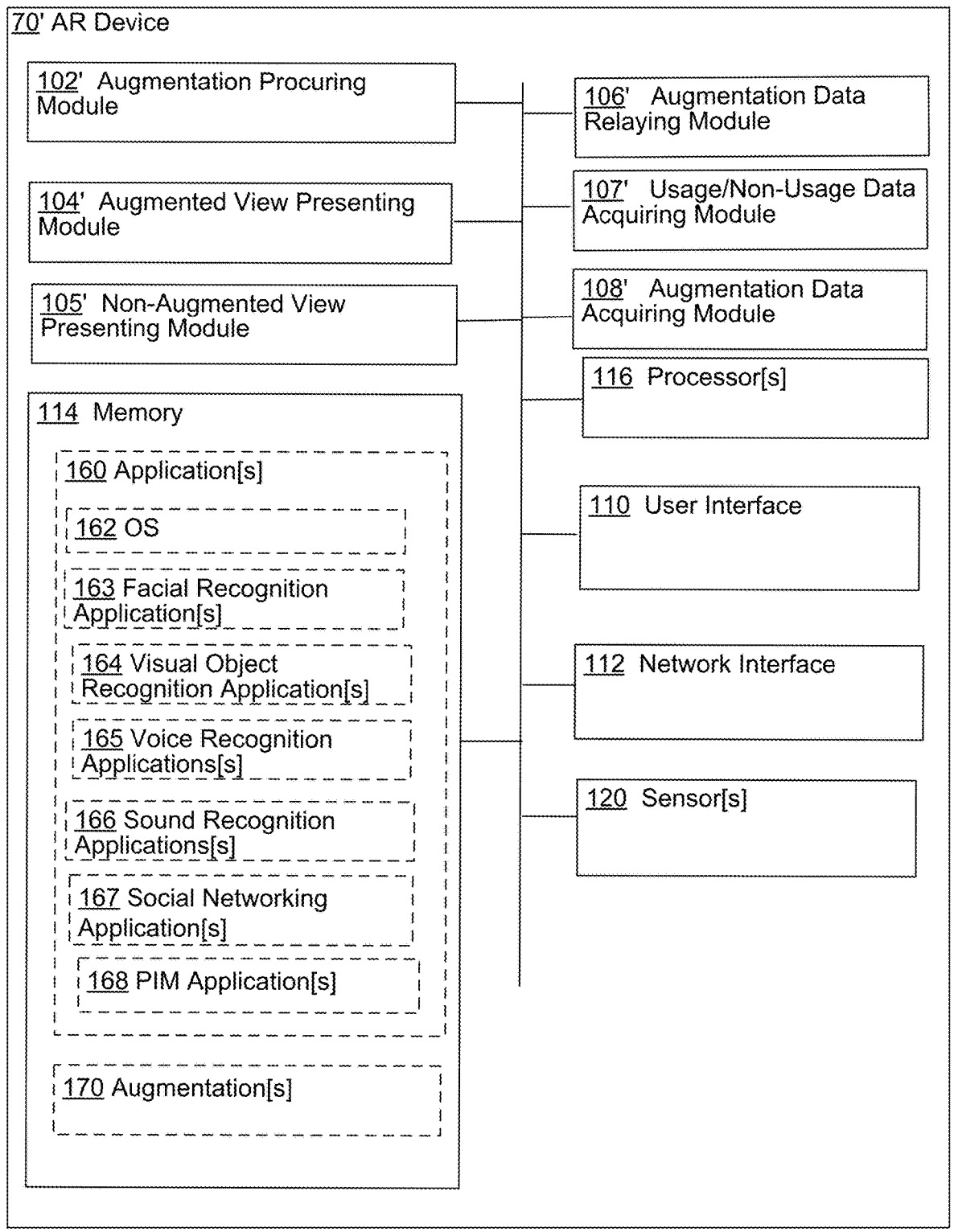
FIG. 7A shows a block diagram of particular implementation of an AR device 70'.
Figure 7B:
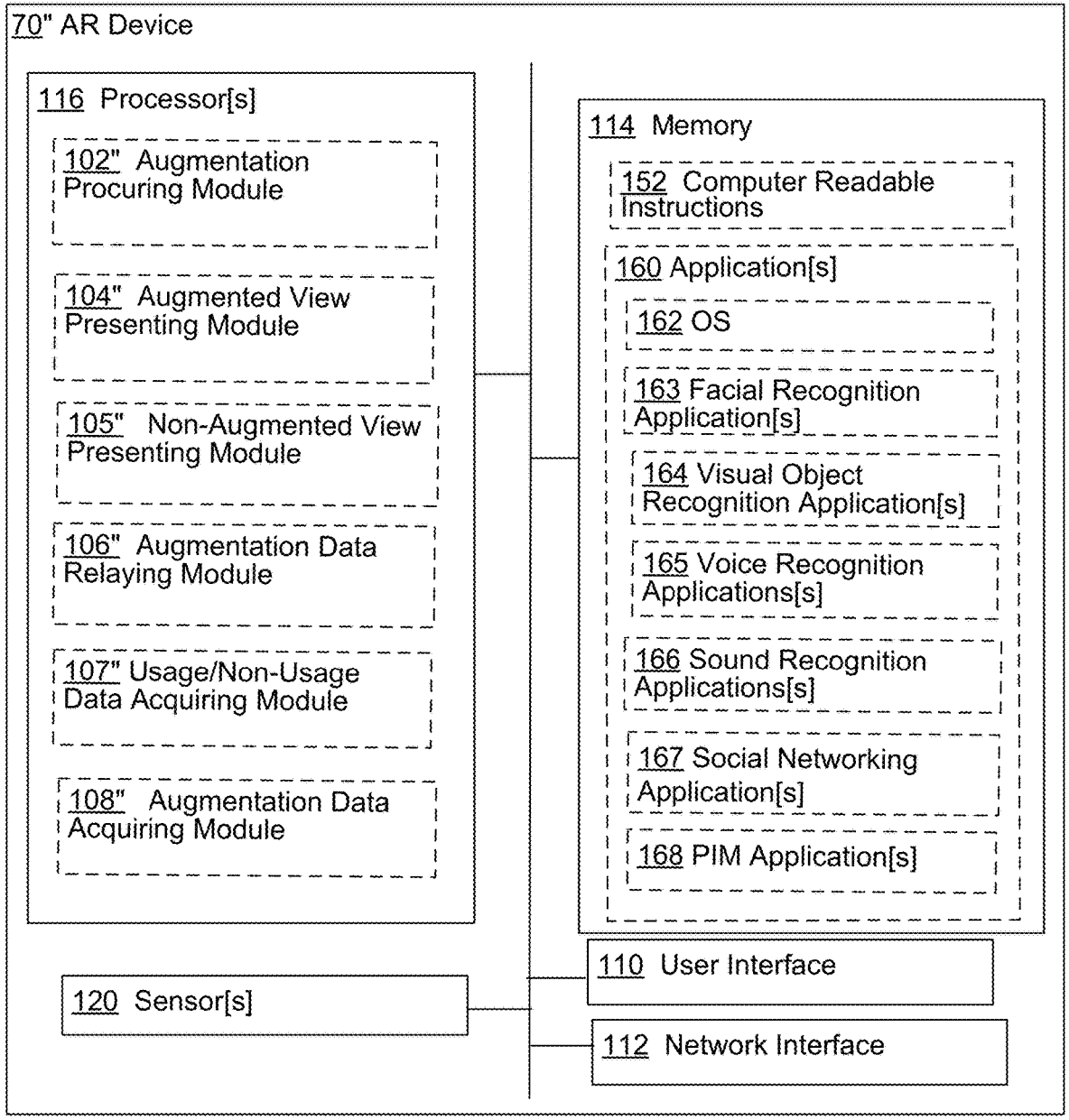
FIG. 7B shows a block diagram of yet another implementation of an AR device 70".

In various embodiments, the methods, systems, circuitry, articles of manufacture, and computer program products in accordance with various embodiments may be implemented by the AR device 70\* of FIG. 7A or 7B. Note that for purposes of the following, "*" represents a wildcard. Thus, references in the following to the AR device 70\* of FIG. 7A or 7B may be in reference to the AR device 70' of FIG. 7A or to the AR device 70" of FIG. 7B. Note further that the AR device 70\* of FIG. 7A or 7B may have a variety of form factors including any one of the form factors illustrated in FIGS. 1A, 1B, 2A, 2B, 3A, 3B, 4A, and 4B.

In order to further facilitate understanding of the various operations, processes, and systems to be described herein, certain concepts and terms will now be introduced with references to FIGS. 5, 6A, 6B, 6C, 6D, 6E, 6F, 6G, 6H, 6I, 6K, 6M, 6N, 6P, 6Q, and 6R. In particular, FIG. 5 illustrates how a first AR device user 51 (hereinafter "first user 51" or simply "user 51") may exchange various augmentation data and/or augmentation-related data with a second AR device user 52 (hereinafter "second user 52" or simply "user 52") in accordance with various embodiments. In contrast, FIGS. 6A, 6B, 6C, 6D, 6E, 6F, 6G, 6H, 6I, 6K, 6M, 6N, 6P, 6Q, and 6R illustrates example actual views and augmented views of scenes from the real environment that may be displayed through the first AR device 70\* or the second AR device 50 of FIG. 5 in accordance with various embodiments.

Referring particularly now to FIG. 5 which illustrates an example environment 500 in which a first user 51 (using a first AR device 70\*) relays augmentation data 55 to a second user 52 (who is using a second AR device 50) and acquiring from the second user 52 usage/non-usage data 56. In particular, FIG. 5 illustrates an example scenario in which the first user 51 is viewing a first visual item 62*a* in the form of a painting (i.e., the Mona Lisa) at a first location (e.g., a museum in New York). In the example scenario, the first user 51 is depicted as viewing (see actual view 60*a* of FIG. 6A, which is an exemplary actual or unmodified view of the first visual item 62*a* as seen through the AR device 70\*) the first visual item 62*a* using a first AR device 70\*(being in the form of electronic glasses) and may view through the first AR device 70\* an augmented view 60*b* (see FIG. 6B) of the first visual item 62*a*. The augmented view 60*b* that the first user 51 may view through the first AR device 70\* may include one or more first augmentations 64*a* (see FIG. 6B) that provides information related to the first visual item 62*a*.

The first AR device 70\*, which may include a wireless transceiver (which may be part of the network interface 112 illustrated in FIGS. 7A and 7B), may relay augmentation data 55 to the second AR device 50 of the second user 52, who is using the second AR device 50 in order to view an open book 66 that contains a second visual item 62*b* (e.g., an image of the Mona Lisa). The second user 52 may be remotely located from the first user 51. For example, the second user 52 may be viewing the book 66 at a second location such as the home of the second user 52 while the first user 70\* may be viewing the first visual item 62*a* (e.g., the Mona Lisa) at the first location (e.g., a museum). The augmentation data 55 may be relayed (e.g., transmitted or sent) to the second AR device 50 via one or more wireless and/or wired networks (e.g., a cellular telephone or data network, a wireless local area network (WLAN), a wireless wide area network (WAN), a public switched telephone network (PTSN), and/or other types of networks). The augmentation data 55 that may be relayed to the second AR device 50 may include, for example, content information, formatting information including, for example, visibility rules (e.g., rules that define when or how an augmentation may be presented through an augmented view), and/or other types of information associated with the one or more first augmentations (e.g., augmentation 64*a* of FIG. 6B) presented through the first AR device 70\*. Greater details regarding the augmentation data 55 will be described in greater detail in the processes and operations to be described herein.

Based, at least in part, on the augmentation data 55 received from the first AR device 70*, the second AR device 50 may or may not visually present, for example, a second augmented view 60d (see FIG. 6D) that includes one or more second augmentations (e.g., augmentation 64b) as the second user 52 views the second visual item 62b (e.g., the image of the Mona Lisa in book 66) through the second AR device 50. Note that the formatting and the presentation of the one or more second augmentations by the second AR device 50 may, in addition to being based on the augmentation data 55 provided by the first AR device 70*, be based on its own visibility rules (e.g., the visibility rules of the second AR device 50 or the second user 52).

In order to further coordinate (e.g., synchronize or harmonize) the views provided through the second AR device 50 with the views provided through the first AR device 70*, the second AR device 50 may relay to the first AR device 70*, via one or more wireless and/or wired networks 58, usage/non-usage data, which may include a variety of data including data that indicates that the augmentation data 55 has been received by the second AR device 50, data that indicate the second one or more augmentations 64b (see FIG. 6D) was displayed by the second AR device 50, and/or other types of data related to the presentation and/or usage of augmentations. A more detailed discussion related to the usage/non-usage data 56 will be provided with respect to the processes and operations to be described herein.

Turning now to FIGS. 6A, 6B, 6C, 6D, 6E, 6F, 6G, 6H, 6I, 6K, 6M, 6N, 6P, 6Q, and 6R that illustrate exemplary actual views and augmented views of various scenes from the real environment that may be provided by the first AR device 70* and the second AR device 50 illustrated in FIG. 5. The exemplary actual views and the exemplary augmented views illustrated in these figures are provided in order to facilitate understanding of various concepts that will be described in connection with the various operations and processes to be discussed herein. In particular, FIGS. 6A, 6B, 6I, 6K, 6M, 6N, 6P, 6Q, and 6R illustrate example actual view and augmented views that may be presented by the first AR device 70* of FIG. 5 (e.g., the AR device 70' of FIG. 7A or the AR device 70" of FIG. 7B). In contrast, FIGS. 6C, 6D, 6E, 6F, 6G, and 6H illustrate example actual views and augmented views that may be presented by the second AR device 50 of FIG. 5. Note that the shapes (e.g., rectangular shapes) of the actual and augmented views that are illustrated in 6A, 6B, 6C, 6D, 6E, 6F, 6G, 6H, 6I, 6K, 6M, 6N, 6P, 6Q, and 6R are not meant to be accurate depictions of the shapes of the actual and augmented views that may be obtained through, for example, the AR device 70* or the AR device 50 of FIG. 5. Instead, the actual and augmented views illustrated in FIGS. 6A, 6B, 6C, 6D, 6E, 6F, 6G, 6H, 6I, 6K, 6M, 6N, 6P, 6Q, and 6R were made to have simple rectangular shapes for ease illustration and explanation.

Figure 6A:
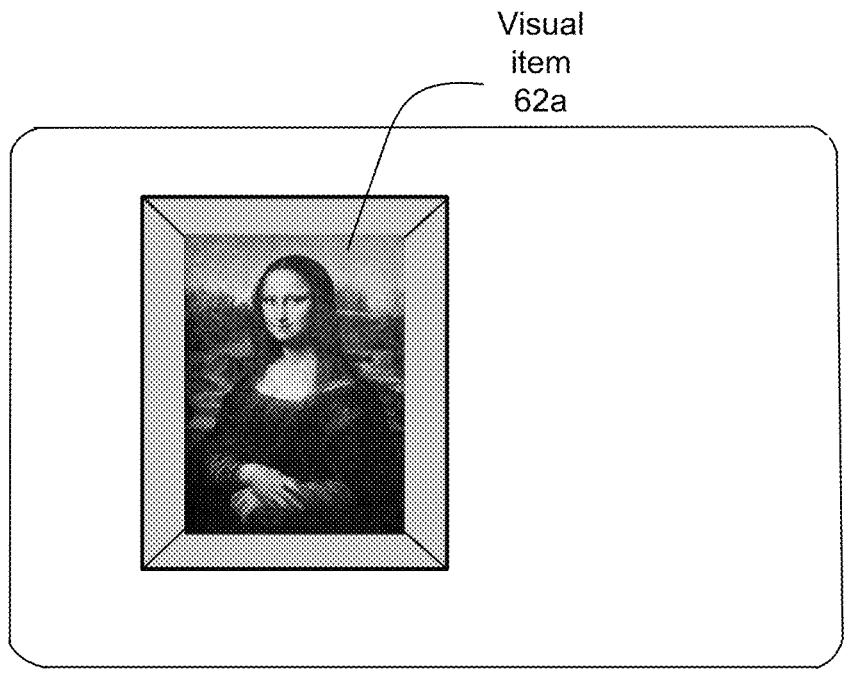
FIGS. 6A, 6B, 6C, 6D, 6E, 6F, 6G, 6H, 6I, 6K, 6M, 6N, 6P, 6Q, and 6R show exemplary actual and augmented views of various scenes from the real environment.
Figure 6B:
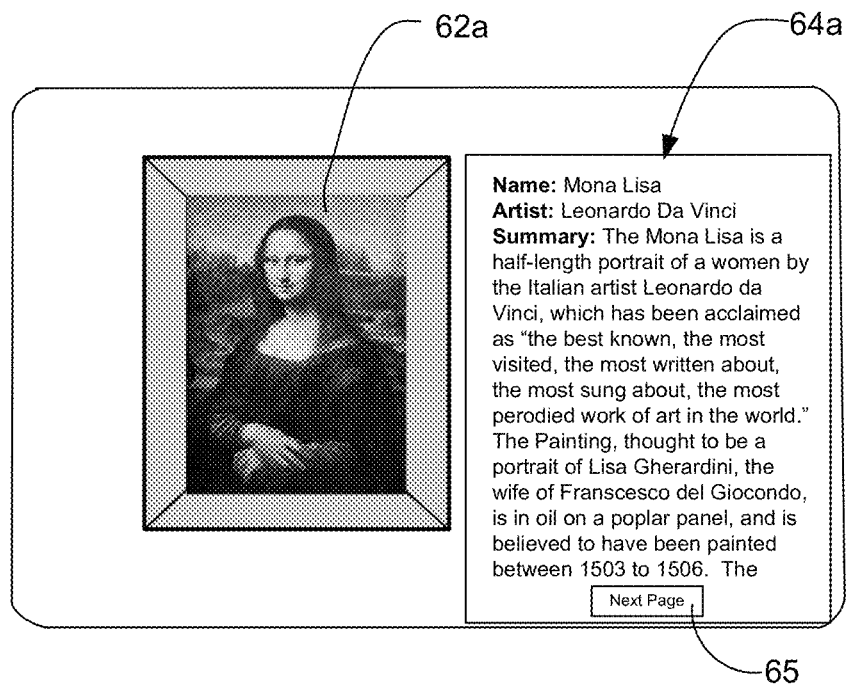

Referring particularly now to FIG. 6A, which illustrates an actual view 60a of a scene from the real environment as captured by, for example, the first AR device 70* of FIG. 5. The actual view 60a, as captured by the first AR device 70*(or simply "AR device 70*") includes a first visual item 62a (or simply "visual item 62a"). In various embodiments, the AR device 70* may obtain an augmentation 64a (e.g., data for generating the augmentation 64a) from one or more third party sources (e.g., wireless network servers associated with the museum displaying the visual item 62a, e.g., the Mona Lisa painting). Based on the obtained augmentation 64a, the first AR device 70* may present the first augmented view 60b (which includes augmentation 64a) as illustrated in FIG. 6B.

In some cases, the acquisition of the augmentation 64a by the first AR device 70* from the one or more third party sources may have been prompted by the detection of one or more visual cues (e.g., detection of the visual item 62a or other visual items such as a marker placed in the vicinity of the visual item 62a). In alternative embodiments, the acquisition of the augmentation 64a by the AR device 70* may have been prompted by the location that is associated with the visual item 62a or the location associated with the actual scene associated with the visual item 62a. In still other embodiments, the acquisition of the augmentation 64a by the AR device 70* may have been prompted by the reception of wireless signals (e.g., as generated by a wireless router or server located at the museum) that directly or indirectly indicates the availability of the augmentation 64a for downloading.

Note that in various embodiments the augmentation 64a that is included in the augmented view 60b that may be presented by the first AR device 70* may be placed at a specific predefined location within the augmented view 60b based on one or more visibility rules. For example, the AR device 70* may comply with one or more visibility rules that requires the augmentation 64a to be placed in the proximate vicinity (e.g., adjacent) to the visual item 62a in the augmented view 60b. In FIG. 6B, the example augmentation 64a to be included in the augmented view 60b includes information (e.g., name of painting, name of artist, and background summary) related to the visual item 62a. Note that included with the augmentations 64a is a tab 65 for scrolling through the background summary. Such a tab 65 may be selected or activated using a variety of techniques (e.g., using eye focus or gaze tracking application, a voice command system, and so forth).

As described previously, the first AR device 70* of FIG. 5 (as well as FIGS. 7A and 7B) may be designed to relay (e.g., transmit) augmentation data 55 to the second AR device 50 via one or more wireless and/or wired networks 58. The augmentation data 55 that may be relayed to the second AR device 50 may include information related to the augmentation 64a presented by the first AR device 70* including, for example, content information, formatting information including one or more visibility rules, and/or other information related to the augmentation 64a of FIG. 6B. As briefly described above, the second user 52 of FIG. 5 is remotely located from the first user 51 and is viewing an art book 66 that includes a second visual item 62b (e.g., an image of the Mona Lisa).

Figure 6C:
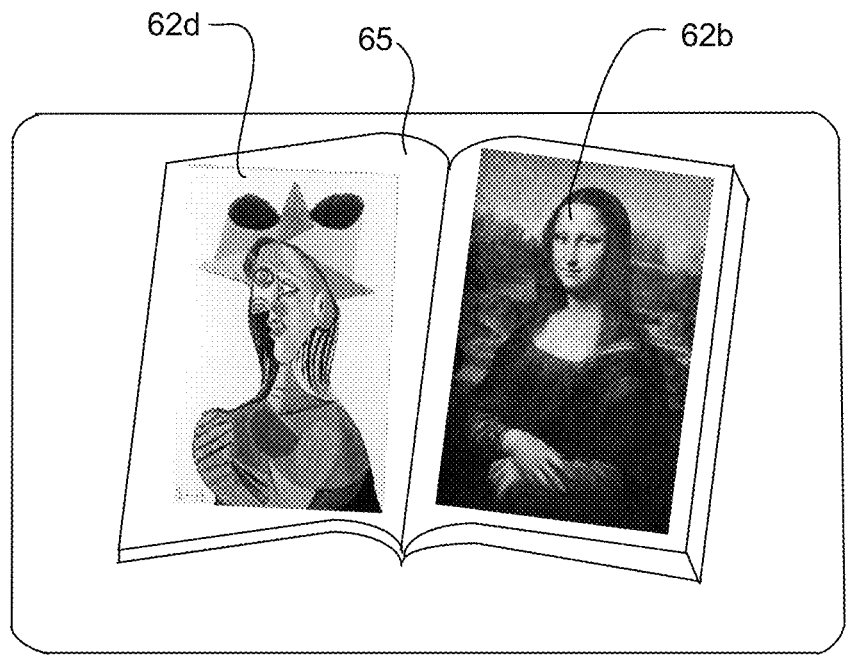
Figure 6D:
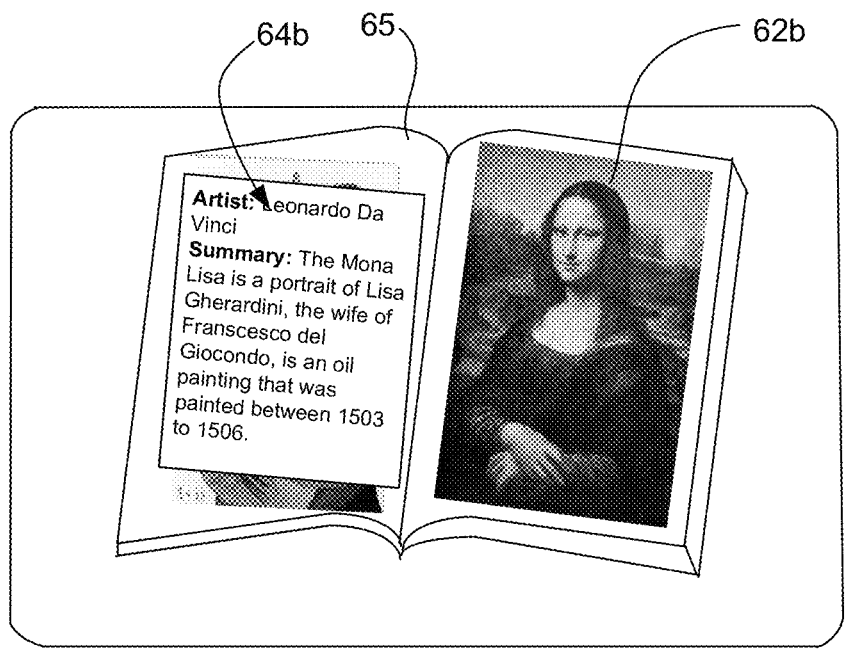

FIG. 6C illustrates an actual view 60c (e.g., unmodified or non-augmented view) of the book 66 of FIG. 5 as viewed through the AR device 50. The actual view 60c includes art book 66 with its pages open, a visual item 62b (e.g., an image of the Mona Lisa that mirrors the visual item 62a (e.g., the Mona Lisa painting) of FIGS. 6A and 6B), and another visual item 62d (e.g., an image of a Picasso). Based, at least in part, on the received augmentation data 55 received from the first AR device 70* the second AR device 50 may display or present an augmented view 60d, as illustrated in FIG. 6D. The augmented view 60d that may be presented by the AR device 50 includes the open art book 66 and the visual item 62b (e.g., image of the Mona Lisa) that was part of the actual view 60c of FIG. 6C. In addition to the art book 66 and the visual item 62b, an augmentation 64b has been included into the augmented view 60d.

The content and formatting of the augmentation 64b that is included into the augmented view 60d may be based, at least in part, on the augmentation data 55 received by the second AR device 50. The augmentation 64b, as illustrated, is a modified version (e.g., a shorten version with less information—no name for the painting and shortened shorter summary section) of the augmentation 64a (see FIG. 6B) presented by the first AR device 70*. In various embodiments, the specific formatting and content of the augmentation 64b to be presented by the second AR device 50, in addition to being dependent on the received augmentation data 55, may in some cases be dependent on the visibility rules of the second AR device 50. As will be further described and illustrated herein, many other types of augmentations (see, for example augmentations 64c, 64d, and 64e of FIGS. 6E, 6F, and 6H) may be presented by the second AR device 50 based on the augmentation data 55, and in some cases, based on its own visibility rules (e.g., rules that govern when and how an augmentation should be included into an augmented view).

Figure 6E:
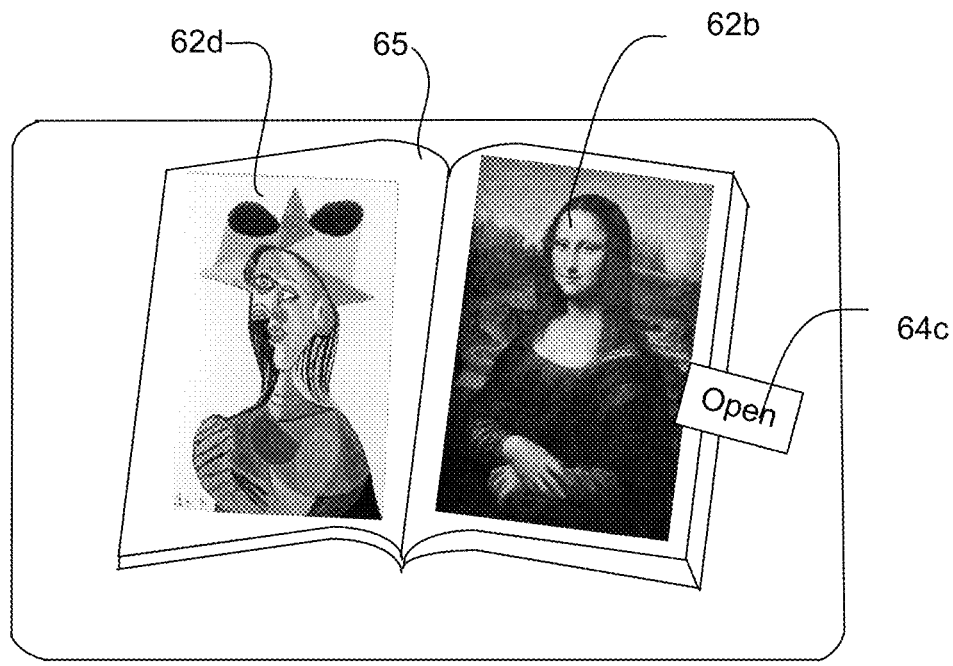

FIG. 6E illustrates another augmented view 60e of the same scene (e.g., open art book 66 illustrated in FIG. 6C) that may be alternatively presented by the second AR device 50 of FIG. 5. The augmented view 60e shows pages of the open art book 66 that includes the visual item 62b (e.g., image of the Mona Lisa painting) and the visual item 62d (e.g., image of a Picasso painting). In addition, the augmented view 60e includes an augmentation 64c that is in the form of a functional tab. The augmentation 64c (e.g., functional tab) may be selected or activated (selected by voice command or by eye focus) by the second user 52 in order to, for example, "pull-up" (e.g., retrieve or display) a more informational augmentation such as augmentation 64a or 64b of FIG. 6B or 6D). The format and content of the augmentation 64c may be in response to the augmentation data 55 which may cause the second AR device 50 to present such an augmentation 64c.

Figure 6F:
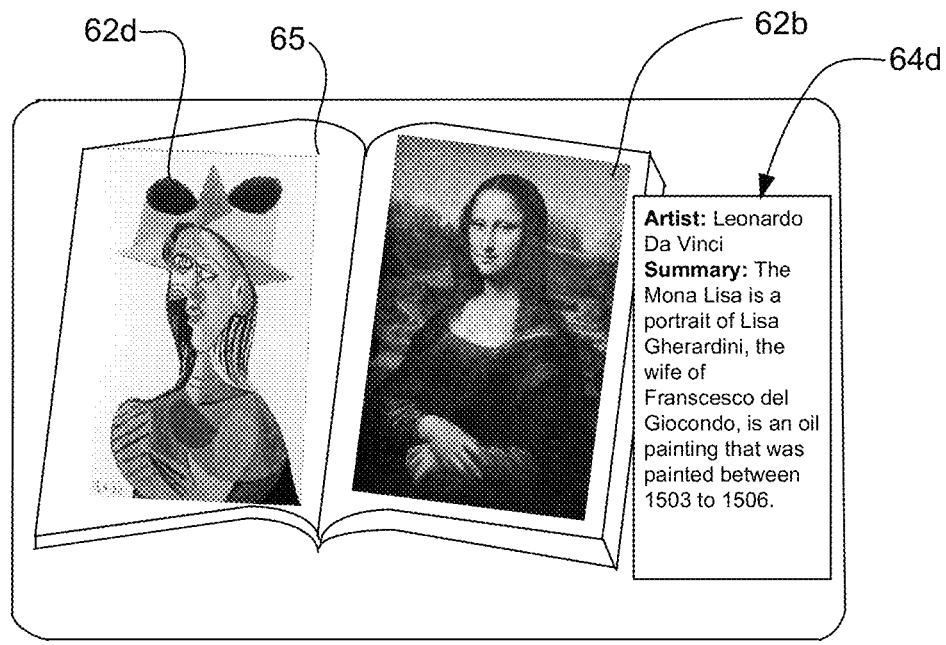

Turning now to FIG. 6F, which illustrates another augmented view 60f that may be presented by the second AR device 50 in response, at least in part, to the received augmentation data 55 as illustrated in FIG. 5. The augmented view 60f is similar to the augmented view 60d of FIG. 6D except that the augmentation 64d in augmented view 60f has been relocated from being located on top of the visual item 62d (as was the case in FIG. 6D) to the right-side of the augmented view 60f so that the view of the visual item 62d is not obstructed. This may be as result of the augmentation data 55 having one or more visibility rules that prevent augmentations from obstructing the view of certain visual items such as visual item 62d (e.g., the image of the Picasso painting).

Figure 6G:
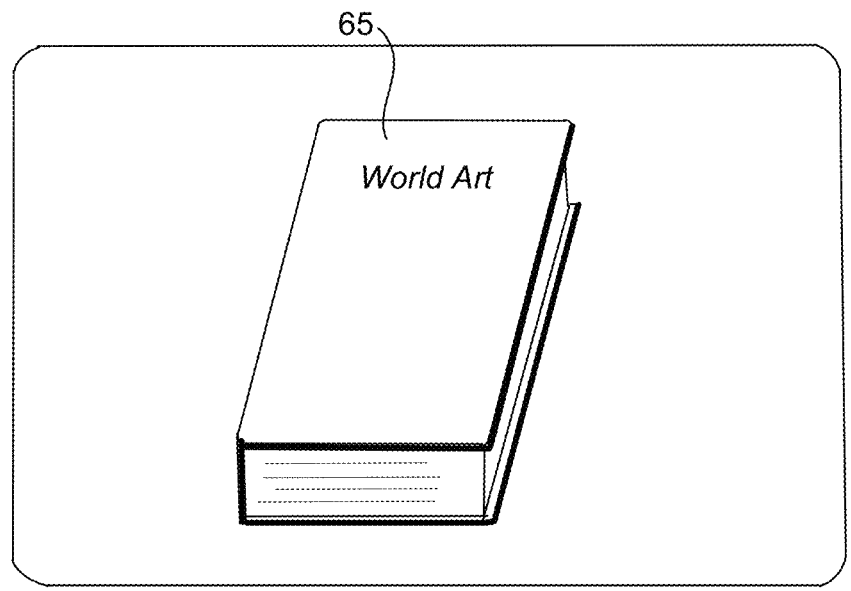
Figure 6H:
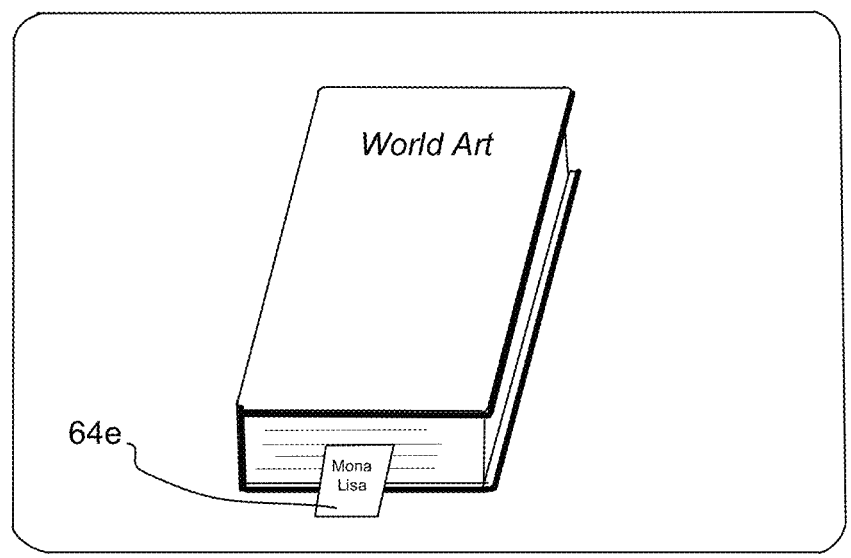

FIG. 6G illustrates an actual view 60g of the art book 66 after the open art book 66 was closed. The actual view 60g may have been captured by the second AR device 50 of FIG. 5. Referring now to FIG. 6H illustrating an augmented view 60h of the closed art book 66. The augmented view 60h includes an augmentation 64e in the shape of a book or page marker. The augmentation 64e, in some cases, may be a functional tab (e.g., a functional tab to provide additional information upon request) that may be used in order to retrieve an information augmentation such as was the case with the augmentation 64c of FIG. 6E. The placement of the augmentation 64e at the specific location (e.g., adjacent to the closed art book 66) in the augmented view 60h and in particular, with respect to the location of the closed art book 66 in the augmented view 60h may be in response to (e.g., in compliance with) one or more visibility rules that may be included with the augmentation data 55 received by the AR device 50.

Figure 6I:
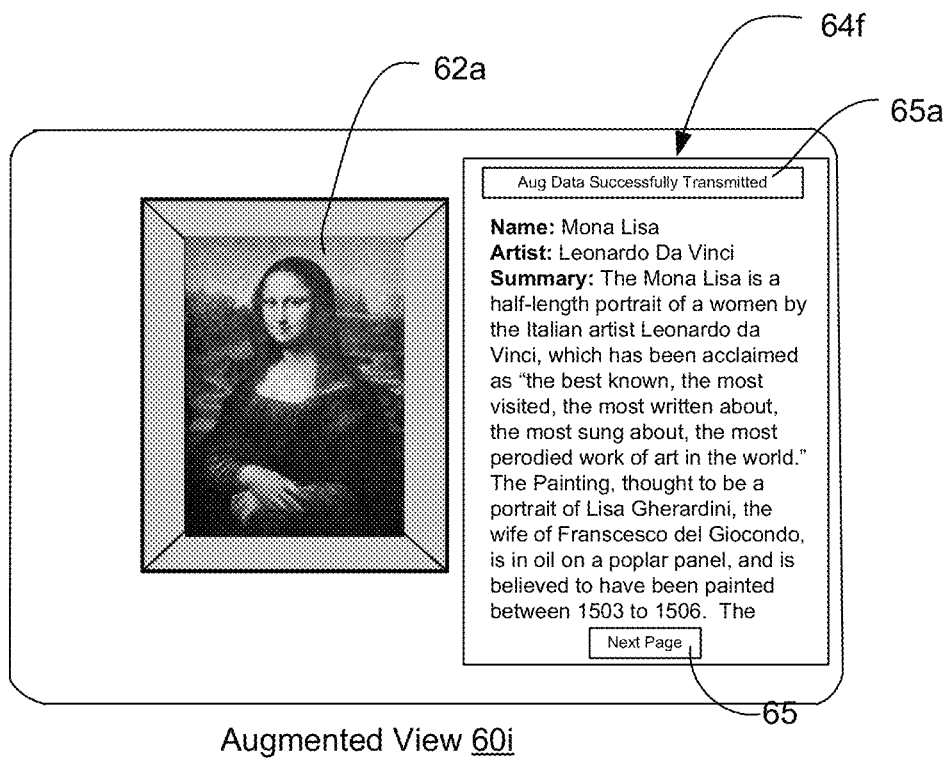

FIGS. 6I, 6K, 6M, 6N, 6P, 6Q, and 6R illustrate the various types of information that may be presented by the first AR device 70* of FIG. 5 (as well as FIGS. 7A and 7B) in a variety of different ways in augmented views (e.g., augmented views 60i, 60k, 60m, 60n, 60p, 60q, and 60r). For example, FIG. 6I illustrates another augmented view 60i that may be additionally or alternatively presented by the first AR device 70* in alternative embodiments. The augmented view 60i is depicted as including an augmentation 64f that includes a message strip 65a (or simply "message 65a") that indicates that the augmentation data 55 that was transmitted by the first AR device 70* was successfully transmitted by the AR device 70*(or successfully received by the second AR device 50). This approach of providing information is a direct way of presenting the message 65a. Such a message 65a may be in response, at least in part, to reception by the first AR device 70* of the usage/non-usage data 56 that may indicate that the augmentation data 55 was successfully received by the second AR device 50.

Figure 6K:
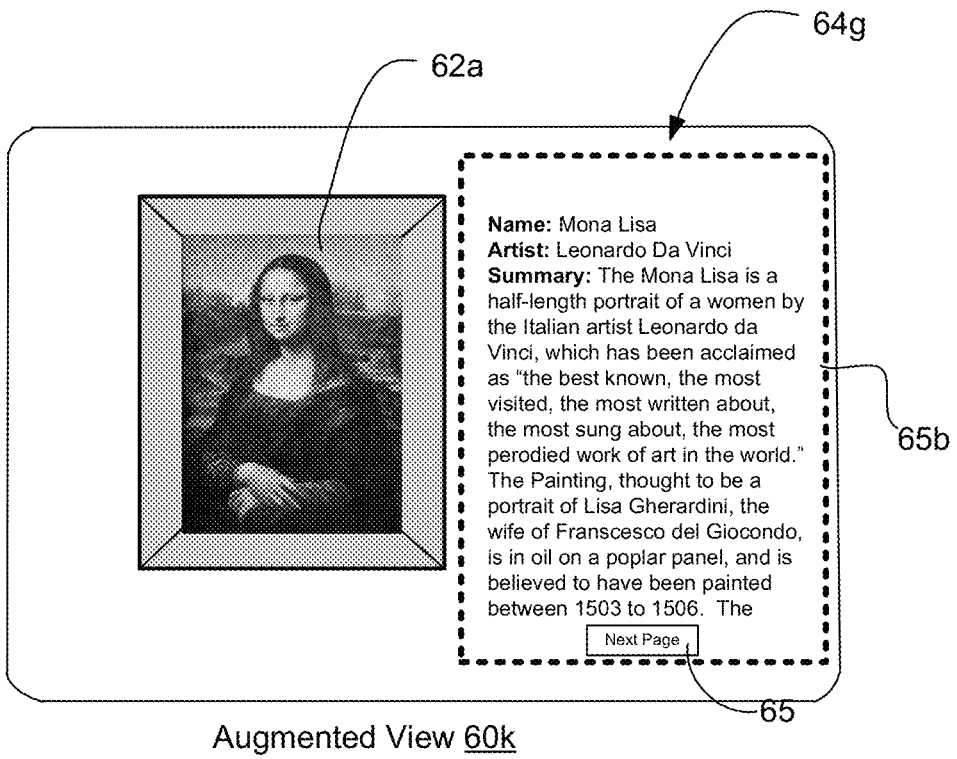

FIG. 6K illustrates another augmented view 60k that may be additionally or alternatively presented by the first AR device 70* and that includes an augmentation 64g. The augmentation 64g indirectly indicates the same message provided by the augmented view 6I. That is, augmentation 64g may have flashing uniquely colored or patterned border (e.g., border 65b) that may indirectly indicate to a user (e.g., the second user 52) of the second AR device 50 that the augmentation data 55 that was transmitted by the first AR device 70* was successfully transmitted by the AR device 70*(or successfully received by the second AR device 50).

Figure 6M:
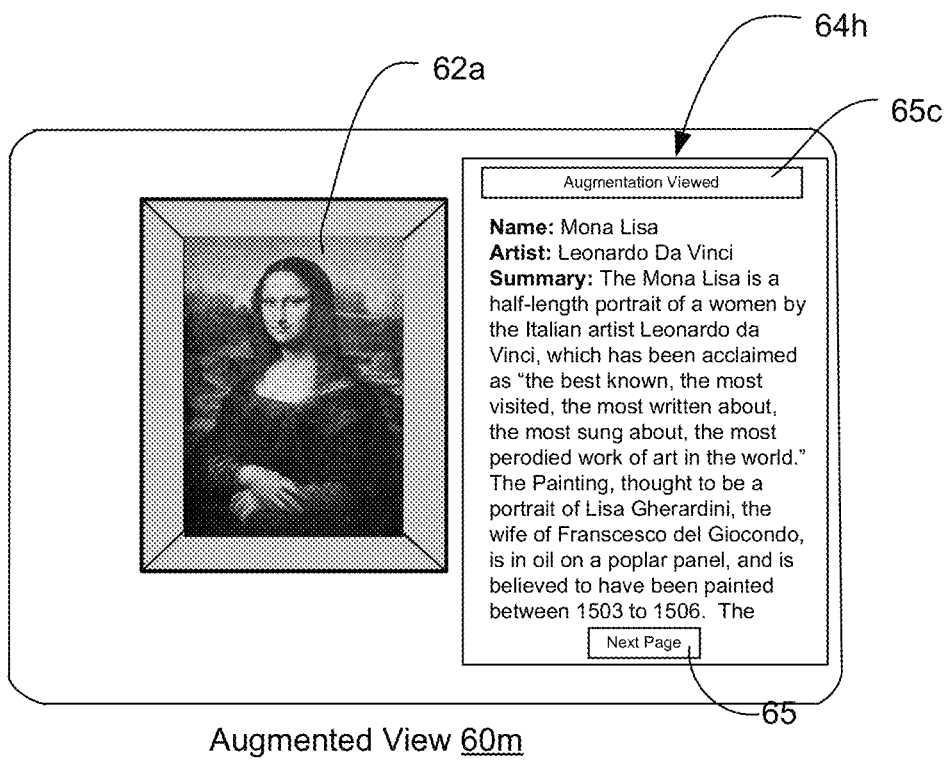

FIG. 6M illustrates an augmented view 60m that may be additionally or alternatively presented by the first AR device 70* and that includes an augmentation 64h with yet another type of message 65c. In this example, the message 65c included with the augmentation 64h directly indicates that one or more second augmentations (e.g., augmentation 64b, 64c, or 64d of FIG. 6D, 6E, or 6F) has been displayed by the second AR device 50 (e.g., augmentation has been viewed). The presentation of the message 65c in the augmented view 60m may be in response to receiving, by the AR device 70*, of the usage/non—usage data 56 that indicates that the one or more second augmentations (e.g., augmentation 64b, 64c, or 64d of FIG. 6D, 6E, or 6F) was presented or displayed by the second AR device 50.

Figure 6N:
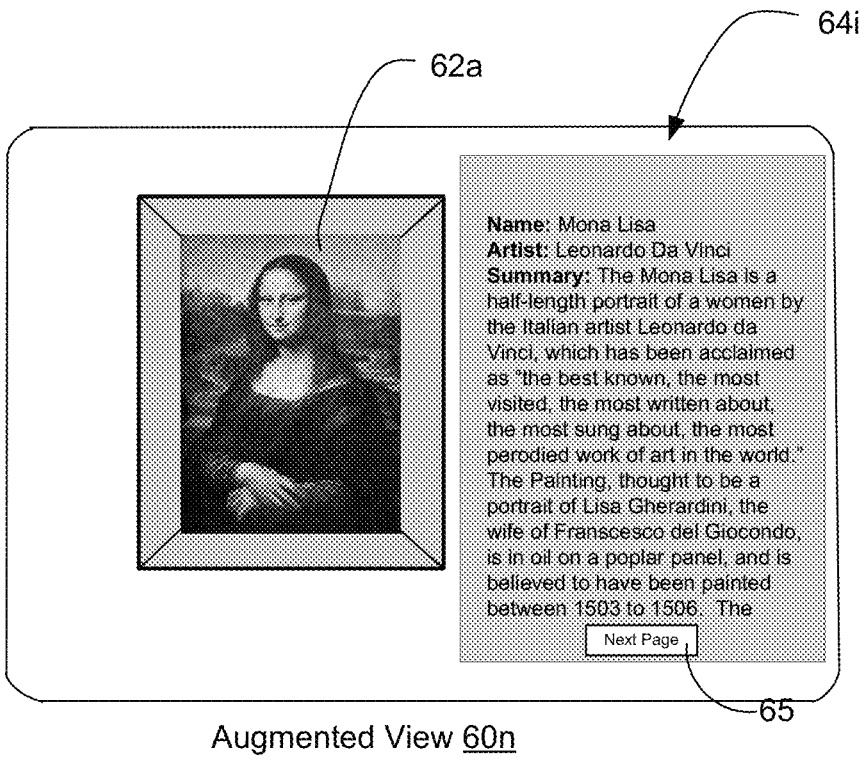

FIG. 6N shows how the same message 65c that was directly indicated in FIG. 6M can also be indirectly indicated in an alternative augmented view 60n. In particular, FIG. 6N shows an augmented view 60n that includes an augmentation 64i that has a particular background color that may indirectly indicate to a user (e.g., the first user 51) viewing the augmented view 60n that the one or more second augmentations (e.g., augmentation 64b, 64c, or 64d of FIG. 6D, 6E, or 6F) was viewed or presented at the second AR device 50. The presentation of the augmented view 60n at the first AR device 70* may be in response, at least in part, the reception of eth usage/non-usage data 56 by the first AR device 70*.

Figure 6P:
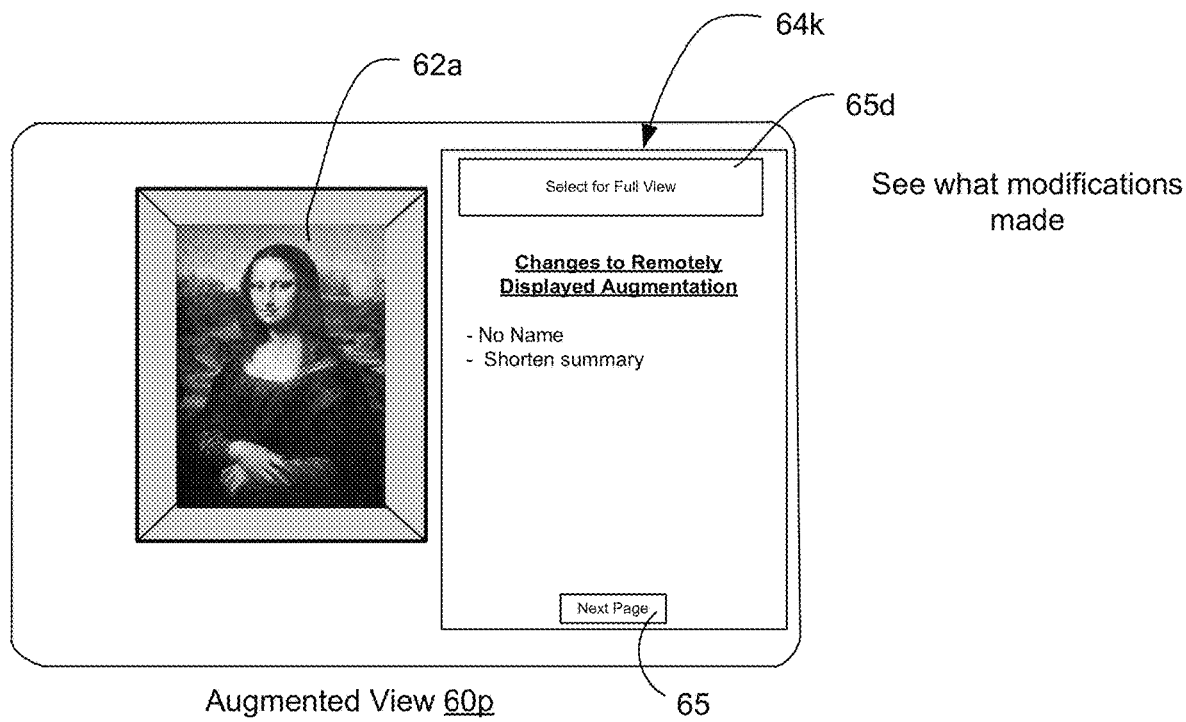

Turning now to FIG. 6P, which illustrates an augmented view 60p that the first AR device 70* may display that includes an augmentation 64k that indicates the modifications that were made by the second AR device 50 to the original first augmentation (e.g., the augmentation 64a of FIG. 6B, which was displayed by the first AR device 70*) in order to generate the second augmentation (e.g., the augmentation 64*b* of FIG. 6D, which was displayed by the second AR device 50) by the second AR device 50. The augmented view 60*p* may be presented by the first AR device 70* in response to the first AR device 70* receiving the usage/non-usage data 56 from the second AR device 50, which may provide the actual augmentation (e.g., augmentation 64*b* of FIG. 6D) that was displayed by the second AR device 50 or a summary (e.g., modifications) of the actual augmentation (e.g., augmentation 64*b* of FIG. 6D) that was displayed by the second AR device 50.

Figure 6Q:
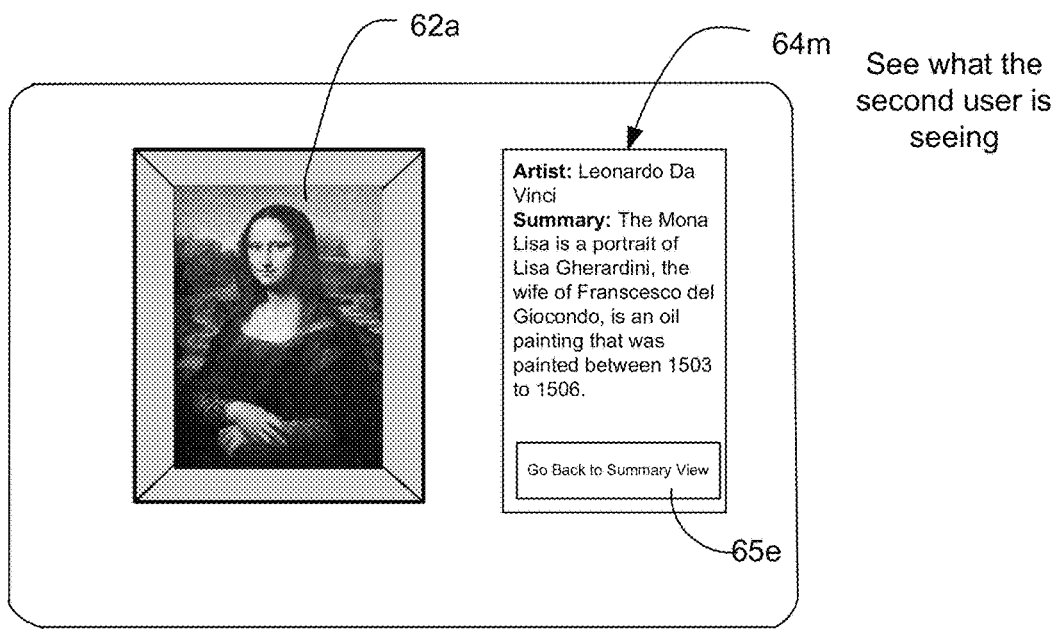

The augmentation 64*k* illustrated in FIG. 6P, in addition to the summary of the modifications made, may include a "select for a full view" functional tab 65*d* for "pulling-up" or retrieving the second augmentation (e.g., augmentation 64*b* of FIG. D) that was displayed by the second AR device 50 (e.g., so that the first user may 51 can see what the second user 52 is seeing). If the first user 51 selects or activates (e.g., by voice command or by other means such as by eye focus or gaze) the "select for full view" functional tab 65*d* included in the augmented view 60*p* of FIG. 6P then the first AR device 70*, as illustrated in FIG. 6Q, may be designed to present an augmented view 60*q* (see FIG. 6Q) that provides a full view of the augmentation 64*m* that was presented by the second AR device 50. The augmentation 64*m* may also include a functional tab 65*e* (e.g., "Go Back to Summary View" functional tab 65*e*) for retrieving or refreshing the summary view (e.g., the summary augmentation 64*k* illustrated in FIG. 6P) that was previously displayed.

Figure 6R:
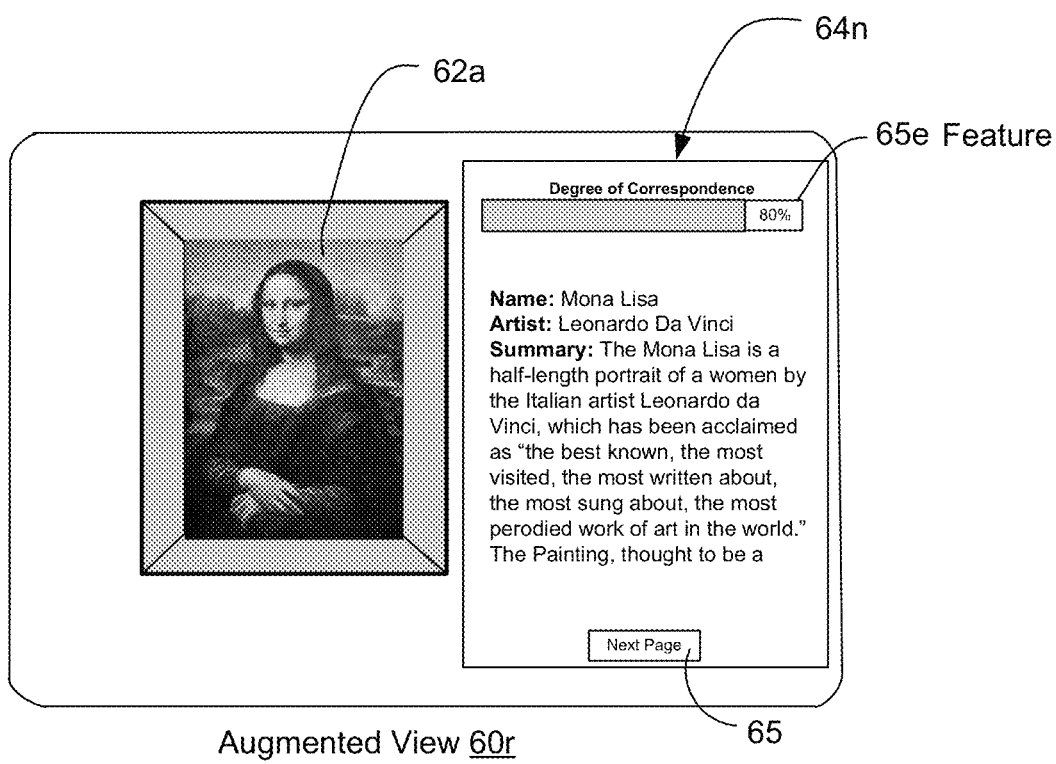

FIG. 6R illustrates yet another type of augmented view 60*r* that the first AR device 70* may present in response to receiving the usage/non-usage data 56 transmitted by the second AR device 50. In particular, the augmented view 60*r* includes an augmentation 64*n* that further includes a "degree of correspondence" feature 65*e* that indicates the degree of correspondence between the first augmentation 64*a* (see FIG. 6B) as presented by the first AR device 70* and the second augmentation 64*b* (see FIG. 6D) as presented by the second AR device 50. Note that this is essentially a variation to the summary augmentation 64*k* illustrated in FIG. 6P. The various actual and augmented views illustrated in FIGS. 6A, 6B, 6C, 6D, 6E, 6F, 6G, 6H, 6I, 6K, 6M, 6N, 6P, 6Q, and 6R as well as the example scenario illustrated in FIG. 5 will be discussed in greater detail herein with respect to the processes and operations to be described below.

Referring now to FIGS. 7A and 7B, FIGS. 7A and 7B are two block diagrams representing two different implementations of an augmented reality (AR) device 70* that can execute the operations and processes to be described herein. In particular, and as will be further described herein, FIG. 7A illustrates an AR device 70' that is the "hardwired" or "hard" implementation of an AR device 70' that can implement the operations and processes to be described herein. The AR device 70' includes certain logic modules including an augmentation procuring module 102', an augmented view presenting module 104', a non-augmented view presenting module 105', an augmentation data relaying module 106', a usage/non-usage data acquiring module 107', and an augmentation data acquiring module 108' that are implemented using purely hardware or circuitry components (e.g., application specific integrated circuit (or ASIC). In contrast, FIG. 7B illustrates an AR device 70" that is the "soft" implementation of the AR device 70' of FIG. 7A in which certain logic modules including an augmentation procuring module 102", an augmented view presenting module 104", a non-augmented view presenting module 105", an augmentation data relaying module 106", a usage/non-usage data acquiring module 107", and an augmentation data acquiring module 108" are implemented using electronic circuitry (e.g., one or more processors including one or more microprocessors, controllers, etc.) executing one or more programming instructions (e.g., software).

The embodiments of the AR device 70* illustrated in FIGS. 7A and 7B are two extreme implementations of the AR device 70* in which all of the logic modules (e.g., the augmentation procuring module 102', the augmented view presenting module 104', the non-augmented view presenting module 105', the augmentation data relaying module 106', the usage/non-usage data acquiring module 107', and the augmentation data acquiring module 108') are implemented using purely hardware solutions (e.g., circuitry such as ASIC) as illustrated in FIG. 7A or in which all of the logic modules (e.g., the augmentation procuring module 102", the augmented view presenting module 104", the non-augmented view presenting module 105", the augmentation data relaying module 106", the usage/non-usage data acquiring module 107", and the augmentation data acquiring module 108") are implemented using software solutions (e.g., programmable instructions being executed by hardware such as one or more processors) as illustrated in FIG. 7B. Since, there are many ways of combining hardware, software, and/or firmware in order to implement the various logic modules (e.g., the augmentation procuring module 102*, the augmented view presenting module 104*, the non-augmented view presenting module 105*(e.g., for displaying or presenting an non-augmented or unmodified views of scenes from the real environment), the augmentation data relaying module 106*, the usage/non-usage data acquiring module 107*, and the augmentation data acquiring module 108*), only the two extreme implementations (e.g., the purely hardware solution as illustrated in FIG. 7A and the software solution of FIG. 7B) are illustrated here. It should be noted here that with respect to the "soft" implementation illustrated in FIG. 7B, hardware in the form of circuitry such as one or more processors 116 are still needed in order to execute the software. Further details related to the two implementations of AR device 70* illustrated in FIGS. 7A and 7B will be provided in greater detail below.

In some instances, one or more components may be referred to herein as "configured to," "configured by," "configurable to," "operable/operative to," "adapted/adaptable," "able to," "conformable/conformed to," "designed to," etc. Those skilled in the art will recognize that such terms (e.g., "configured to") generally encompass active-state components and/or inactive-state components and/or standby-state components, unless context requires otherwise.

Referring particularly now to FIG. 7A, which illustrates a block diagram of an AR device 70' that includes an augmentation procuring module 102', an augmented view presenting module 104', a non-augmented view presenting module 105' (e.g., for displaying or presenting an non-augmented or unmodified views of scenes from the real environment), an augmentation data relaying module 106', a usage/non-usage data acquiring module 107', and an augmentation data acquiring module 108', one or more processors 116 (e.g., one or more microprocessors), a memory 114 that may store one or more applications 160 (e.g., an operating system (OS) 162, one or more facial recognition applications 163, one or more visual object recognition applications 164 (e.g., for visually recognizing one or more items that are visible in a scene from the real physical environment), one or more voice recognition applications 165, one or more sound recognition applications 166 (e.g., an application for recognizing/identifying sounds other than voice such as the sound of a train passing or waves crashing along a shoreline), one or more social networking applications 167 such as Twitter or Facebook, one or more personal information manager (PIM) applications 168 such as Microsoft Outlook, and so forth), and one or more augmentations 170, a user interface 110 (e.g., a display, a mouse, a microphone, etc.), a network interface 112 (e.g., a network interface card or "NIC"), and/or one or more sensors 120. Although not depicted, the memory 114 may also include communication applications such as an email application and/or an instant messaging (IM) application.

In various embodiments, the augmentation procuring module 102' of FIG. 7A is a logic module that may be designed to, among other things, obtain or get one or more first augmentations (e.g., augmentation 64a of FIG. 6B) for inclusion in a first augmented view (e.g., augmented view 60b of FIG. 6B) of a first scene (e.g., actual view 60a of FIG. 6A). In contrast, the augmented view presenting module 104' of FIG. 7A is a logic module that may be configured to present the first augmented view (e.g., augmented view 60b of FIG. 6B) including the one or more first augmentations (e.g., augmentation 64a of FIG. 6B). Based at least on the one or more first augmentations that were presented, the augmentation data relaying module 106' of FIG. 7A may be designed to relay augmentation data associated with the one or more first augmentations to, for example, an augmented reality (AR) device, to facilitate remote display at the AR device of one or more second augmentations (e.g., augmentation 64b of FIG. 6D) in a second augmented view (e.g., augmented view 62d of FIG. 6D) of a second scene that includes one or more visual items (e.g., visual item 62b of FIG. 6C) that are also included in the first scene (e.g., visual item 62a of the actual view 60a of FIG. 6A).

Turning now to FIG. 7B, which illustrates a block diagram of another AR device 70" that can implement the operations and processes to be described herein. As indicated earlier, the AR device 70" in FIG. 7B is merely the "soft" version of the AR device 70' of FIG. 7A because the various logic modules (e.g., the augmentation procuring module 102", the augmented view presenting module 104", the non-augmented view presenting module 105", the augmentation data relaying module 106", the usage/non-usage data acquiring module 107", and the augmentation data acquiring module 108") are implemented using software and one or more processors 116 (e.g., one or more microprocessors or controllers) executing the software (e.g., computer readable instructions 152) rather than being implemented using purely hardware (e.g., ASIC) as was the case in the AR device 70' of FIG. 7A. Thus, the augmentation procuring module 102", the augmented view presenting module 104", the non-augmented view presenting module 105", the augmentation data relaying module 106", the usage/non-usage data acquiring module 107", and the augmentation data acquiring module 108" of FIG. 7B may be designed to execute the same functions as the augmentation procuring module 102', the augmented view presenting module 104', the non-augmented view presenting module 105', the augmentation data relaying module 106', the usage/non-usage data acquiring module 107', and the augmentation data acquiring module 108' of FIG. 7A. The AR device 70", as illustrated in FIG. 7B, has other components (e.g., user interface 110, network interface 112, and so forth) that are the same or similar to the other components included in the AR device 70' of FIG. 7A. Note that in the embodiment of the AR device 70* illustrated in FIG. 7B, the augmentation procuring module 102", the augmented view presenting module 104", the non-augmented view presenting module 105", the augmentation data relaying module 106", the usage/non-usage data acquiring module 107", and the augmentation data acquiring module 108" may be implemented by the one or more processors 116 (or other types of circuitry such as field programmable gate arrays or FPGAs) executing one or more computer readable instructions 152 stored in memory 114.

In various embodiments, the memory 114 of the AR device 70' of FIG. 7A and the AR device 70' of FIG. 7B may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices.

Turning now to FIG. 8A illustrating a particular implementation of the augmentation procuring module 102*(e.g., the augmentation procuring module 102' or the augmentation procuring module 102") of FIGS. 7A and 7B. As illustrated, the augmentation procuring module 102* may include one or more sub-logic modules in various alternative implementations. For example, in various embodiments, the augmentation procuring module 102* may include a memory augmentation procuring module 801, a network augmentation procuring module 802, an associated party ascertaining module 804 (which may further include a location associated party ascertaining module 805 and/or an item associated party ascertaining module 806), an augmentation seeking module 808, an augmentation obtaining module 810, a visual item sensing module 812, and/or a scene location detecting module 814. Specific details related to the augmentation procuring module 102* as well as the above-described sub-modules of the augmentation procuring module 102* will be provided below with respect to the operations and processes to be described herein.

FIG. 8B illustrates a particular implementation of the augmentation data relaying module 106*(e.g., the augmentation data relaying module 106' or the augmentation data relaying module 106") of FIG. 7A or 7B. As illustrated, the augmentation data relaying module 106* may include one or more sub-logic modules in various alternative embodiments. For example, in various embodiments, the augmentation data relaying module 106* may include a network relaying module 816, a user responsive augmentation data relaying module 818, a content information augmentation data relaying module 820, and/or a format information augmentation data relaying module 821 (which may further include a visibility rule relaying module 822). Specific details related to the augmentation data relaying module 106* as well as the above-described sub-modules of the augmentation data relaying module 106* will be provided below with respect to the operations and processes to be described herein.

Referring now to FIG. 8C illustrating a particular implementation of the usage/non-usage data acquiring module 107*(e.g., the usage/non-usage data acquiring module 107' or the usage/non-usage data acquiring module 107") of FIG. 7A or 7B. As illustrated, the usage/non-usage data acquiring module 107* may include one or more sub-logic modules in various alternative embodiments. For example, in various embodiments, the usage/non-usage data acquiring module 107* may include a network acquiring module 824, a successful reception indicating data acquiring module 826, a remotely displayed indicating data acquiring module 828, a modification indicating data acquiring module 830, a format indicating data acquiring module 832, and/or a content information acquiring module 834. Specific details related to the usage/non-usage data acquiring module 107* as well as the above-described sub-modules of the usage/non-usage data acquiring module 107* will be provided below with respect to the operations and processes to be described herein.

FIG. 8D illustrates the various types of user interface devices that may be part of the user interface 110 of the AR device 70* of FIG. 7A or 7B. In various embodiments, the user interface 110 may include one or more display monitors 852 (e.g., a touchscreen, a liquid crystal display (LCD) monitor, a see-through display, and/or other types of displays or display monitors), one or more visual capturing devices 854 (e.g., one or more video or web cameras, digital cameras, and/or other types of cameras), one or more audio speakers 856, one or more audio input devices 858 (e.g., one or more microphones), and/or one or more keyboard/keypads 860. Although not depicted, other types of user interfaces may be included with the user interface 110 in various alternative embodiments including, for example, a mouse or other types of user input/output devices.

Figure 8E:
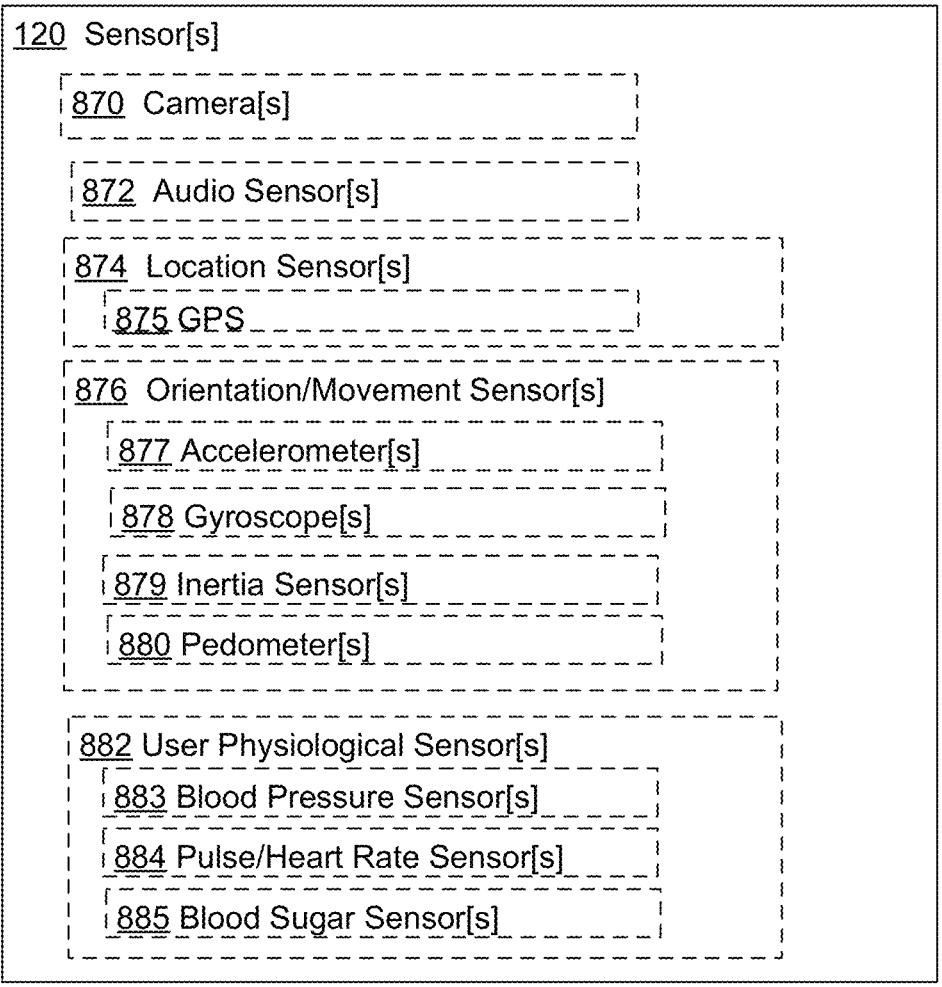
FIG. 8E shows another perspective of the one or more sensors 120 of FIGS. 7A and 7B.

FIG. 8E illustrates at least some of the various types of sensors 120 that may be included with the AR device 70*(e.g. the AR device 70' of FIG. 7A or the AR device 70" of FIG. 7B). As illustrated, the one or more sensors 120 that may be included with the AR device 70* may include one or more cameras 870 (note that the one or more cameras 870 may be the same as the one or more visual capturing devices 854 described above with respect to the user interface 110), one or more audio sensors 872 (see also audio input device[s] 858 described above), one or more location sensors 874 such as one or more global positioning systems (GPSs) 875, one or more orientation/movement sensors 876 (which may comprise one or more accelerometers 877, one or more gyroscopes 878, one or more inertia sensors 879, one or more pedometers 880), and/or one or more user physiological sensors 882 (e.g., one or more blood pressure sensors 883, one or more pulse/heart rate sensors 884, one or more blood sugar sensors 885). Note that with respect to the one or more location sensors 874, the one or more orientation/movement sensors 876, and/or one or more user physiological sensors 882, these sensor devices may include other types of sensors not depicted in FIG. 8C. For example the one or more location sensors 874 in some alternative implementations may include a location sensor that employs triangulation techniques and signals from cellular towers to determine location while the one or more user physiological sensors 882 may include in some alternative embodiments one or more galvanic skin sensors and/or other types of sensors.

Figure 9:
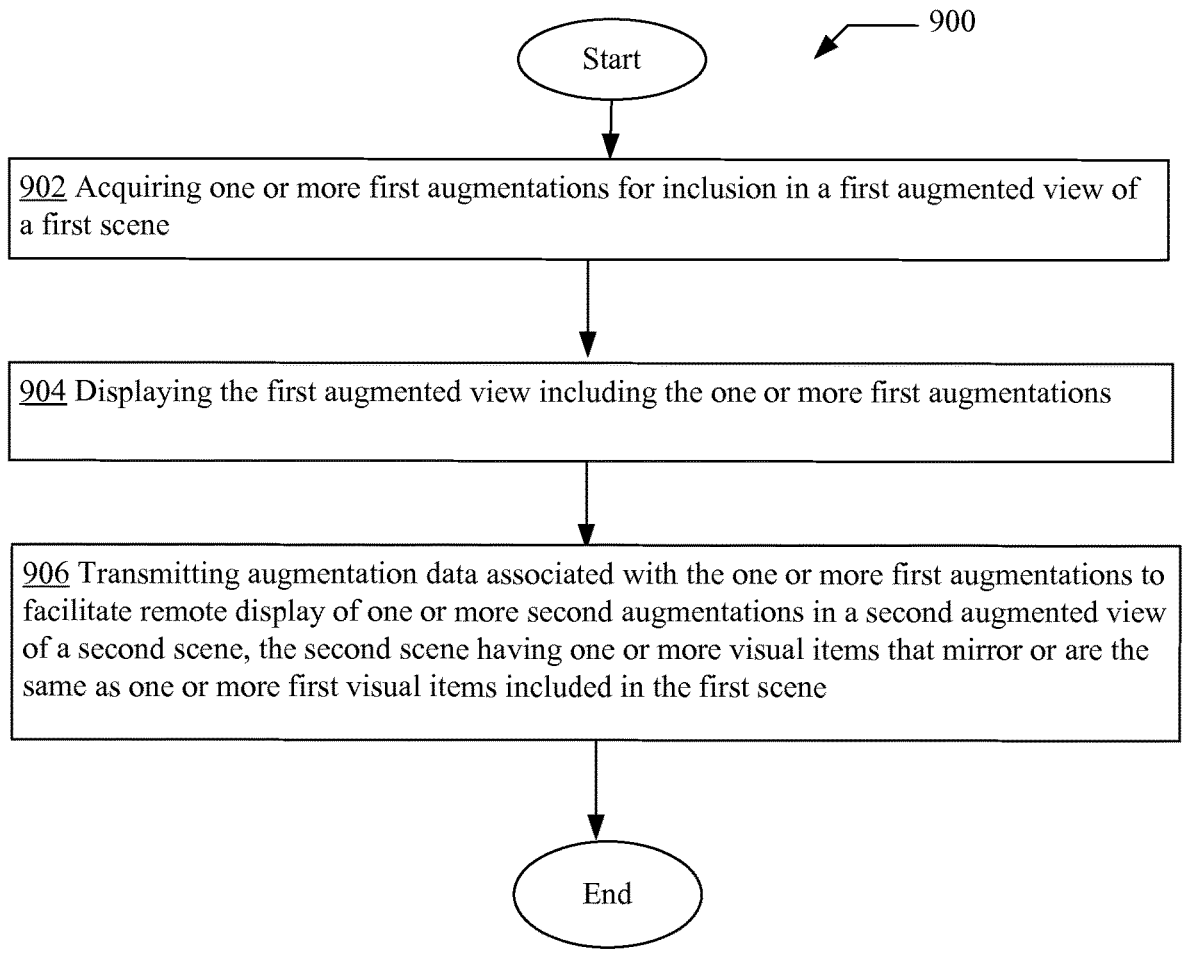
FIG. 9 is a high-level logic flowchart of a process, e.g., operational flow 900, according to some embodiments.

A more detailed discussion related to the AR device 70*(e.g., the AR device 70' of FIG. 7A or the AR device 70" of FIG. 7B) discussed above will now be provided with respect to the example processes and operations to be described herein. FIG. 9 illustrates an operational flow 900 representing example operations for sharing or relaying of information related to one or more augmentations between, for example, two augmented reality (AR) devices. The example processes may involve initially obtaining and then visually presenting one or more first augmentations at, for example, a first AR device, and then transmitting data associated with the one or more first augmentations in order to facilitate the remote presentation of one or more second augmentations at, for example, a second AR device.

In FIG. 9 and in the following figures that include various examples of operational flows, discussions and explanations will be provided with respect to the AR device 70* described above and as illustrated in FIGS. 1A, 1B, 2A, 2B, 3A, 3B, 4A, 4B, 7A, 7B, 8A, 8B, 8C, 8D, and 8E, and/or with respect to other examples (e.g., the example scenarios and example actual and augmented views as illustrated in FIGS. 5, 6A, 6B, 6C, 6D, 6E, 6F, 6G, 6H, 6I, 6K, 6M, 6N, 6P, 6Q, and 6R) and contexts. However, it should be understood that the operational flows may be executed in a number of other environments and contexts, and/or in modified versions of FIGS. 1A, 1B, 2A, 2B, 3A, 3B, 4A, 4B, 5, 6A, 6B, 6C, 6D, 6E, 6F, 6G, 6H, 6I, 6K, 6M, 6N, 6P, 6Q, 6R, 7A, 7B, 8A, 8B, 8C, 8D, and 8E. Also, although the various operational flows are presented in the sequence(s) illustrated, it should be understood that the various operations may be performed in other orders other than those which are illustrated, or may be performed concurrently.

Further, in FIG. 9 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 9 as well as the other operations to be described herein are performed by at least one of a machine, an article of manufacture, or a composition of matter unless indicated otherwise.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

More particularly, in FIG. 9 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated FIG. 9 as well as the other operations to be described herein may be performed by at least one of a machine, an article of manufacture, or a composition of matter. In various embodiments, the operational flow 900 of FIG. 9 to be described below may be implemented by the first AR device 70* of FIG. 5 (e.g., the AR device 70' of FIG. 7A or the AR device 70" of FIG. 7B)

In any event, after a start operation, the operational flow 900 of FIG. 9 may move to an augmentation acquiring operation 902 for acquiring one or more first augmentations for inclusion in a first augmented view of a first scene. For instance, and as illustration, the augmentation procuring module 102* of FIG. 7A or 7B (e.g., the augmentation procuring module 102' of FIG. 7A or the augmentation procuring module 102" of FIG. 7B) acquiring (e.g., procuring by the first AR device 70* of FIG. 5) one or more first augmentations (e.g., augmentation 64a of FIG. 6B) for inclusion in a first augmented view (e.g., augmented view 60b of FIG. 6B) of a first scene (e.g., actual view 60a of FIG. 6A).

As further illustrated in FIG. 9, operational flow 900 may also include an augmented view displaying operation 904 for displaying the first augmented view including the one or more first augmentations. For instance, the augmented view presenting module 104*(e.g., the augmented view presenting module 104' of FIG. 7A or the augmented view presenting module 104" of FIG. 7B) of the AR device 70* displaying (e.g., visually presenting or showing through the one or more display monitors 852—see FIG. 8D) the first augmented view (e.g., augmented view 60b of FIG. 6B) including the one or more first augmentations (e.g., augmentation 64a of FIG. 6B).

In addition to the augmentation acquiring operation 902 and the augmented view displaying operation 904, operational flow 900 may also include an augmentation data transmitting operation 906 for transmitting augmentation data associated with the one or more first augmentations to facilitate remote display of one or more second augmentations in a second augmented view of a second scene, the second scene having one or more visual items that mirror or are the same as one or more first visual items included in the first scene. For instance, the augmentation data relaying module 106* (e.g., the augmentation data relaying module 106' of FIG. 7A or the augmentation data relaying module 106" of FIG. 7B) transmitting (e.g., relaying to the second AR device 50 of FIG. 5) augmentation data (e.g., augmentation data 55 of FIG. 5) associated with the one or more first augmentations (e.g., augmentation 64a of FIG. 6B) to facilitate remote display of one or more second augmentations (e.g., augmentation 64b of FIG. 6D) in a second augmented view (e.g., augmented view 60d of FIG. 6D) of a second scene (see actual view 60c of FIG. 6C), the second scene having one or more visual items (e.g., visual item 62b of FIG. 6C or 6D, which is a visual image of Mona Lisa) that mirror or are the same as one or more first visual items included in the first scene (see visual item 62a of FIG. 6A or 6B, which is another visual image of Mona Lisa). Note again that in the following discussions related to the various operational flows of FIGS. 10A, 10B, 10C, 11, 12A, 12B, 12C, 13, 14, 15, and 16, repeated references will be made to various example scenarios and actual and augmented views illustrated in FIGS. 5, 6A, 6B, 6C, 6D, 6E, 6F, 6G, 6H, 6I, 6K, 6M, 6N, 6P, 6Q, and 6R. These references to the various scenarios, actual views, augmented views, and augmentations illustrated in FIGS. FIGS. 5, 6A, 6B, 6C, 6D, 6E, 6F, 6G, 6H, 6I, 6K, 6M, 6N, 6P, 6Q, and 6R are for illustrative purposes only and are not meant to be limiting or be the only implementation.

Figure 10A:
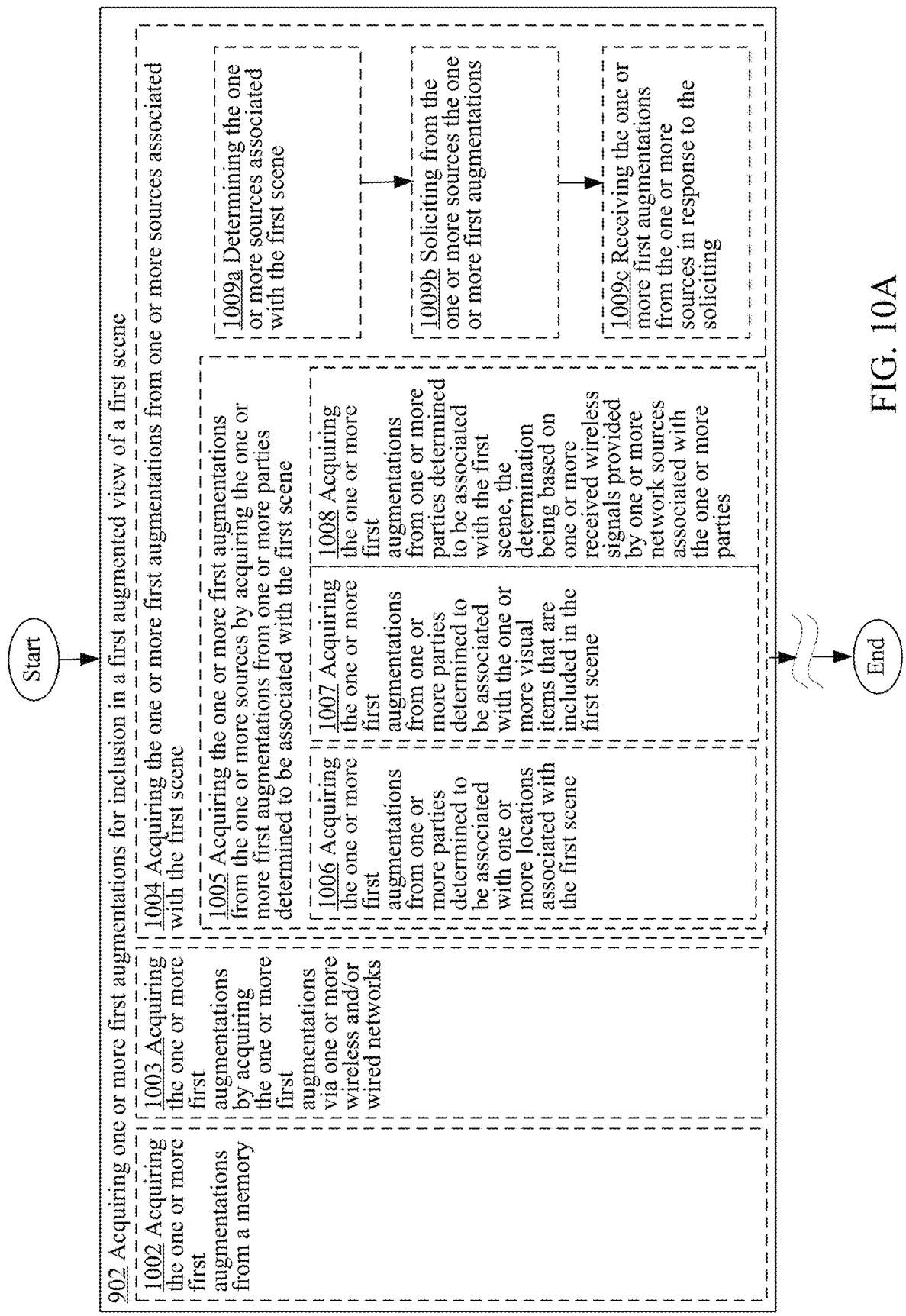
FIG. 10A is a high-level logic flowchart of a process depicting alternate implementations of the augmentation acquiring operation 902 of FIG. 9.
Figure 10B:
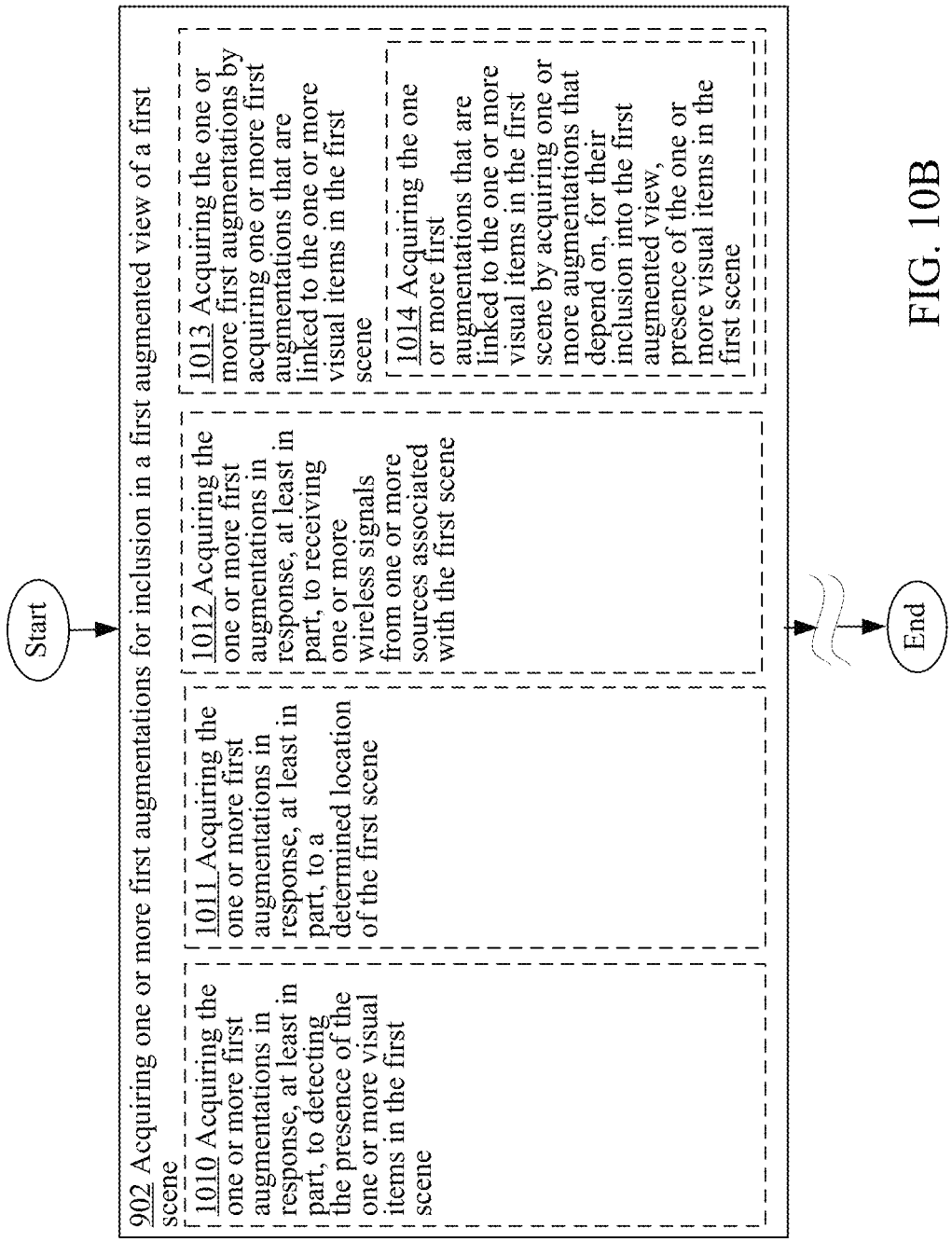
FIG. 10B is a high-level logic flowchart of a process depicting alternate implementations of the augmentation acquiring operation 902 of FIG. 9.
Figure 10C:
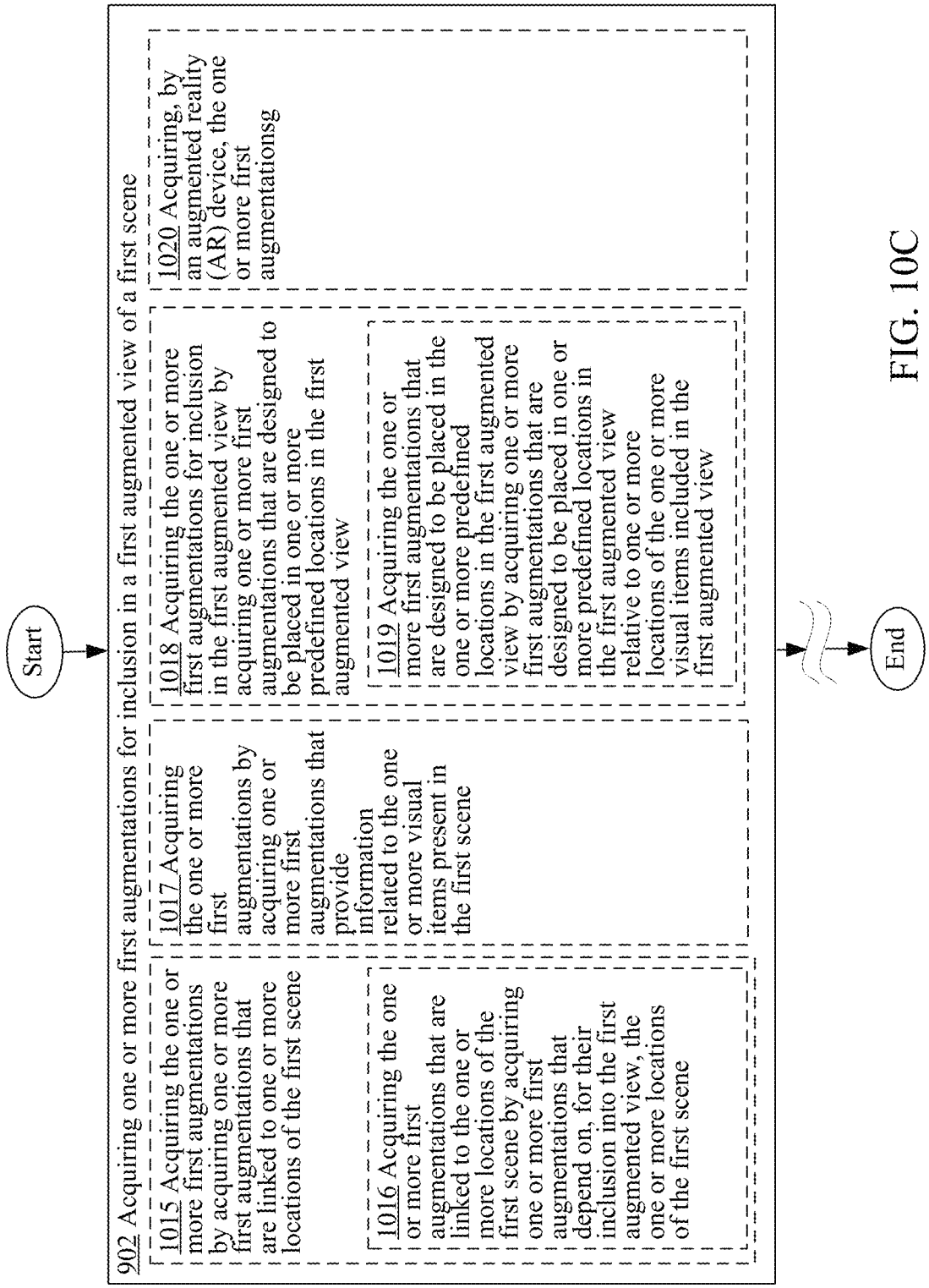
FIG. 10C is a high-level logic flowchart of a process depicting alternate implementations of the augmentation acquiring operation 902 of FIG. 9.

As will be described below, the augmentation acquiring operation 902, the augmented view displaying operation 904, and the augmentation data transmitting operation 906 of FIG. 9 may be executed in a variety of different ways in various alternative implementations. FIGS. 10A, 10B, and 10C, for example, illustrate at least some of the alternative ways that the augmentation acquiring operation 902 of FIG. 9 may be executed in various alternative implementations. For example, the augmentation obtained through the augmentation acquiring operation 902 of FIG. 9 may be obtained in a variety of different ways in various alternative implementations. In some cases, for example, the augmentation acquiring operation 902 may include an operation 1002 for acquiring the one or more first augmentations from a memory as illustrated in FIG. 10A. For instance, the memory augmentation procuring module 801 (see FIG. 8A) of the AR device 70*(e.g., the AR device 70' of FIG. 7A or the AR device 70" of FIG. 7B) acquiring or procuring the one or more first augmentations 170 (see FIG. 7A or 7B) from a memory 114 (e.g., volatile memory such as RAM or DRAM (dynamic random access memory) memory, non-volatile memory such as flash memory or ROM (read-only memory) memory, cache memory, and so forth).

As further illustrated in FIG. 10, the augmentation acquiring operation 902 may additionally or alternatively include one or more operations including an operation 1003 for acquiring the one or more first augmentations by acquiring the one or more first augmentations via one or more wireless and/or wired networks. For instance, the network augmentation procuring module 802 (see FIG. 8A) of the AR device 70* acquiring the one or more first augmentations by acquiring (e.g., procuring) the one or more first augmentations (e.g., augmentation 64a of FIG. 6B) via one or more wireless and/or wired networks 51.

In the same or alternative implementations, the augmentation acquiring operation 902 may additionally or alternatively include an operation 1004 for acquiring the one or more first augmentations from one or more sources associated with the first scene. For instance, the augmentation procuring module 102* of FIG. 7A or 7B acquiring the one or more first augmentations (e.g., augmentation 64a of FIG. 6B) from one or more sources associated with the first scene. For example, in the example illustrations of in FIGS. 5, 6A, and 6B, the operators of the museum displaying the painting (e.g., the Mona Lisa painting illustrated in FIGS. 5, 6A, and 6B) and who may be associated with the physical environment (e.g., actual view 60a) that the painting was being displayed may be the source for the one or more first augmentations 64a.

As further illustrated in FIG. 10A, operation 1004 may include one or more additional operations in various alternative implementations including, in some cases, an operation 1005 for acquiring the one or more first augmentations from the one or more sources by acquiring the one or more first augmentations from one or more parties determined to be associated with the first scene. For instance, the augmentation procuring module 102* including the associated party ascertaining module 804 (see FIG. 8A) acquiring the one or more first augmentations (e.g., augmentation 64a of FIG. 6B) from the one or more sources by acquiring the one or more first augmentations 64a from one or more parties as determined by the associated party ascertaining module 804 to be associated with the first scene (e.g., actual view 60a of FIG. 6A).

In various implementations, operation 1005 may include one or more additional operations including in some cases an operation 1006 for acquiring the one or more first augmentations from one or more parties determined to be associated with one or more locations associated with the first scene. For instance, the augmentation procuring module 102* including the location associated party ascertaining module 805 (see FIG. 8A) acquiring the one or more first augmentations from one or more parties determined by the location associated party ascertaining module 805 to be associated with one or more (geographic) locations associated with the first scene (e.g., actual view 60a of FIG. 6A).

In the same or different implementations, operation 1005 may additionally or alternatively include an operation 1007 for acquiring the one or more first augmentations from one or more parties determined to be associated with the one or more visual items that are included in the first scene as further depicted in FIG. 10A. For instance, the augmentation procuring module 102* including the item associated party ascertaining module 806 (see FIG. 8A) acquiring the one or more first augmentations (e.g., augmentation 64*a* of FIG. 6B) from one or more parties determined by the item associated party ascertaining module 806 to be associated with the one or more visual items (e.g., visual item 62*a*) that are included in the first scene (e.g. actual view 60*a* of FIG. 6A). In some cases, the one or more visual items that may be included in the first scene may be identified using, for example, visual objection recognition application 164.

In the same or different implementations, operation 1005 may additionally or alternatively include an operation 1008 for acquiring the one or more first augmentations from one or more parties determined to be associated with the first scene, the determination being based on one or more received wireless signals provided by one or more network sources associated with the one or more parties. For instance, the augmentation procuring module 102* including the associated party ascertaining module 804 acquiring (e.g., obtaining or procuring) the one or more first augmentations from one or more parties determined by the associated party ascertaining module 804 to be associated with the first scene, the determination by the associated party ascertaining module 804 being based on one or more received wireless signals provided by one or more network sources (e.g., network servers) associated with the one or more parties (e.g. museum operators). For example, in the example illustrations of FIGS. 6A and 6B, the operators of the museum displaying the Mona Lisa painting (e.g., visual item 62*a*) may have employed a transceiver (e.g., a wireless router) in the museum to transmit wireless signals in order to communicate with computer devices including, for example, an AR device 70*. Such a system may allow the museum operators to be identified and/or to allow the downloading by an AR device 70* of one or more augmentations (e.g., augmentation 64*a* or 64*b* of FIG. 6B or 6D) that may be provided by the museum operators.

As further illustrated in FIG. 10A, in some implementations operation 1005 for acquiring the one or more first augmentations from the one or more sources by acquiring the one or more first augmentations from one or more parties determined to be associated with the first scene may actually involve multiple operations that includes an operation 1009*a* for determining the one or more sources associated with the first scene, an operation 1009*b* for soliciting from the one or more sources the one or more first augmentations, and an operation 1009*c* for receiving the one or more first augmentations from the one or more sources in response to the soliciting as illustrated in FIG. 10A. For instance, the associated party ascertaining module 804 of the AR device 70* initially determining or identifying the one or more sources (e.g., one or more parties or servers) associated with the first scene (e.g., actual view 60*a*). The augmentation seeking module 808 (see FIG. 8A) of the AR device 70* may then solicit or seek from the one or more determined or identified sources the one or more first augmentations 64*a*. Finally, the augmentation obtaining module 810 (see FIG. 8A) of the AR device 70* receiving the one or more first augmentations 64*a* from the one or more sources in response to the soliciting of the one or more augmentations 64*a*.

Referring now to FIG. 10B, in some implementations, the augmentations acquiring operation 902 of FIG. 9 may involve or include an operation 1010 for acquiring the one or more first augmentations in response, at least in part, to detecting the presence of the one or more visual items in the first scene. For instance, the augmentation procuring module 102* including the visual item sensing module 812 (see FIG. 8A) of the AR device 70* acquiring the one or more first augmentations (e.g., augmentation 64*a* of FIG. 6B) in response, at least in part, to the visual item sensing module 812 detecting the presence of the one or more visual items (e.g., visual item 62*a* of FIG. 6A) in the first scene (e.g., actual view 60*a* of FIG. 6A).

In the same or alternative implementations, the augmentation acquiring operation 902 may additionally or alternatively include an operation 1011 for acquiring the one or more first augmentations in response, at least in part, to a determined location of the first scene as further illustrated in FIG. 10B. For instance, the augmentation procuring module 102* including the scene location detecting module 814 (see FIG. 8A) of the AR device 70* acquiring the one or more first augmentations (e.g., augmentation 64*a* of FIG. 6B) in response, at least in part, to a determined location of the first scene (e.g., actual view 60*a* of FIG. 6A) as determined by the scene location detecting module 814. Such a determination or detection of the location may be made by employing a location determining device or sensor such as a global positioning system (GPS) 876.

In the same or different implementations, the augmentation acquiring operation 902 may additionally or alternatively include an operation 1012 for acquiring the one or more first augmentations in response, at least in part, to receiving one or more wireless signals from one or more sources associated with the first scene. For instance, the augmentation procuring module 102* of the AR device 70* acquiring the one or more first augmentations (e.g., augmentation 64*a* of FIG. 6B) in response, at least in part, to receiving one or more wireless signals from one or more sources (e.g., the operators of the museum displaying the Mona Lisa painting in FIG. 6A) associated with the first scene. In various embodiments, the one or more wireless signals that may have been received may provide a variety of information including, for example, the identity of the one or more sources, augmentation content and/or format, one or more rules for inserting the augmentation into an augmented view, and so forth.

In the same or alternative implementations, the augmentation acquiring operation 902 may additionally or alternatively include an operation 1013 for acquiring the one or more first augmentations by acquiring one or more first augmentations that are linked to the one or more visual items in the first scene. For instance the augmentation procuring module 102* of the AR device 70* acquiring the one or more first augmentations (e.g., augmentation 64*a* of FIG. 6B) by acquiring (e.g., obtaining) one or more first augmentations 64*a* that are linked to the one or more visual items (e.g., visual item 64*a*—Mona Lisa Painting—in the example illustrated in FIG. 6A) in the first scene (e.g., actual view 60*a* of FIG. 6A).

In some cases operation 1013 may further include or involve an operation 1014 for acquiring the one or more first augmentations that are linked to the one or more visual items in the first scene by acquiring one or more augmentations that depend on, for their inclusion into the first augmented view, presence of the one or more visual items in the first scene. For instance the augmentation procuring module 102* of the AR device 70* acquiring the one or more first augmentations (e.g., augmentation 64a of FIG. 6B) that are linked to the one or more visual items (e.g., visual item 62a of FIG. 6A) in the first scene (e.g., actual view 60a of FIG. 6A) by acquiring one or more augmentations 64a that depend on, for their inclusion into the first augmented view (e.g., augmented view 60b of FIG. 6B), presence of the one or more visual items (e.g., visual item 62a) in the first scene (e.g., actual view 60a). For example, in the example illustrated in FIG. 6B, the augmentation 64a may be linked to the visual item 62a—the Mona Lisa Painting—for its existence in the augmented view 60b.

Turning now to FIG. 10C, in some implementations, the augmentation acquiring operation 902 of FIG. 9 may include an operation 1015 for acquiring the one or more first augmentations by acquiring one or more first augmentations that are linked to one or more locations of the first scene. For instance the augmentation procuring module 102* of the AR device 70* acquiring the one or more first augmentations (e.g., augmentation 64a of FIG. 6B) by acquiring (e.g., obtaining or retrieving) one or more first augmentations 64a that are linked to one or more locations of the first scene (for example, in the example illustrated in FIG. 6B, the augmentation 64a being dependent, for its existence or insertion into an augmented view 60d, to the location associated with t the visual item 62a).

In some cases, operation 1015 may further include or involve an operation 1016 for acquiring the one or more first augmentations that are linked to the one or more locations of the first scene by acquiring one or more first augmentations that depend on, for their inclusion into the first augmented view, the one or more locations of the first scene. For instance the augmentation procuring module 102* of the AR device 70* acquiring the one or more first augmentations (e.g., augmentation 64a of FIG. 6B) that are linked to the one or more locations of the first scene (e.g., actual view 60a of FIG. 6A) by acquiring one or more first augmentations 64a that depend on, for their inclusion into the first augmented view 60b, the one or more locations of the first scene (e.g., actual view 60a of FIG. 6A). In the example illustrated in FIG. 6B, for example, the existence of the augmentation 64a in the augmented view 60b being dependent on the location associated with the scene (e.g., actual view 60a) that is being visually augmented.

As further illustrated in FIG. 10C, in some implementations the augmentation acquiring operation 902 may involve or include an operation 1017 for acquiring the one or more first augmentations by acquiring one or more first augmentations that provide information related to the one or more visual items present in the first scene. For instance the augmentation procuring module 102* of the AR device 70* acquiring the one or more first augmentations (e.g., augmentation 64a of FIG. 6B) by acquiring one or more first augmentations (e.g., augmentation 64a of FIG. 6B) that provide information related to the one or more visual items (e.g., background information of the visual item 62a in FIGS. 6A and 6B that augmentation 64a is linked to) present in the first scene (e.g., actual view 60a of FIG. 6A). For example, in the example illustrated in FIG. 6B, the augmentation 64a providing the name of the artist and painting (e.g., visual item 62a) and the background information related to the painting (e.g., the Mona Lisa painting).

In the same or alternative implementations, the augmentation acquisition operation 902 may additionally or alternatively include an operation 1018 for acquiring the one or more first augmentations for inclusion in the first augmented view by acquiring one or more first augmentations that are designed to be placed in one or more predefined locations in the first augmented view. For instance the augmentation procuring module 102* of the AR device 70* acquiring the one or more first augmentations (e.g., augmentation 64a of FIG. 6B) for inclusion in the first augmented view (e.g., augmented view 60b of FIG. 6B) by acquiring one or more first augmentations 64a that are designed to be placed in one or more predefined locations (e.g., top right corner) in the first augmented view 60b.

As further illustrated in FIG. 10C, in some cases operation 1018 may further include or involve an operation 1019 for acquiring the one or more first augmentations that are designed to be placed in the one or more predefined locations in the first augmented view by acquiring one or more first augmentations that are designed to be placed in one or more predefined locations in the first augmented view relative to one or more locations of the one or more visual items included in the first augmented view. For instance the augmentation procuring module 102* of the AR device 70* acquiring the one or more first augmentations (e.g., augmentation 64a of FIG. 6B) that are designed to be placed in the one or more predefined locations in the first augmented view (e.g., augmented view 60b of FIG. 6B) by acquiring one or more first augmentations 64a that are designed to be placed in one or more predefined locations in the first augmented view 60b relative to one or more locations of the one or more visual items 62a (e.g., locating the augmentation 64a adjacent or immediate proximity to the visual item 62a) included in the first augmented view 60b.

In the same or alternative implementations, the augmentation acquiring operation 902 may actually involve an operation 1020 for acquiring, by an augmented reality (AR) device, the one or more first augmentations. For instance, the AR device 70* of FIG. 7A or 7B acquiring the one or more first augmentations 64a.

Figure 11:
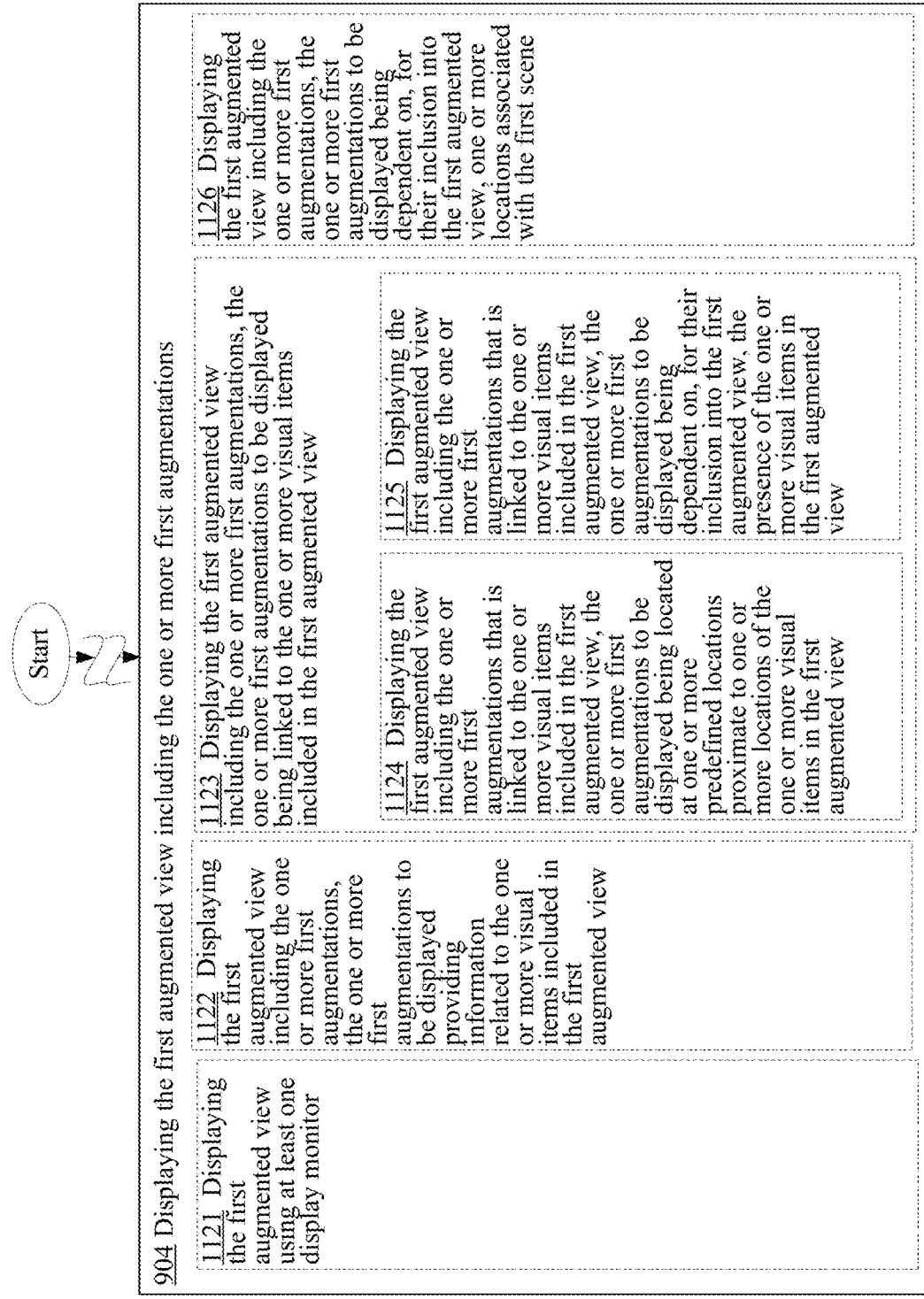
FIG. 11 is a high-level logic flowchart of a process depicting alternate implementations of the augmented view displaying operation 904 of FIG. 9.

Referring back to the FIG. 9, the augmented view displaying operation 904 similar to the augmentation acquiring operation 902 of FIG. 9 may be executed in a number of different ways in various alternative implementations as illustrated in FIG. 11. For example, in some implementations, the augmented view displaying operation 904 may include an operation 1121 for displaying the first augmented view using at least one display monitor. For instance, the augmented view presenting module 104* of FIG. 7A or 7B displaying (e.g., visually presenting) the first augmented view using at least one display monitor (e.g., an LCD, a see-through display, or a touchscreen).

In the same or different implementations, the augmented view displaying operation 904 of FIG. 9 may additionally or alternatively include an operation 1122 for displaying the first augmented view including the one or more first augmentations, the one or more first augmentations to be displayed providing information related to the one or more visual items included in the first augmented view as further illustrated in FIG. 11. For instance, the augmented view presenting module 104* of FIG. 7A or 7B displaying (e.g., presenting) the first augmented view (e.g., augmented view 60b of FIG. 6B) including the one or more first augmentations (e.g., augmentation 64a of FIG. 6B), the one or more first augmentations 64a to be displayed providing information related to the one or more visual items 62a included in the first augmented view 60b.

In the same or different implementations, the augmented view displaying operation 904 may additionally or alternatively include an operation 1123 for displaying the first augmented view including the one or more first augmentations, the one or more first augmentations to be displayed being linked to the one or more visual items included in the first augmented view. For instance, the augmented view presenting module 104* of FIG. 7A or 7B displaying (e.g., visually presenting) the first augmented view (e.g., augmented view 60b of FIG. 6B) including the one or more first augmentations (e.g., augmentation 64a in FIG. 6B), the one or more first augmentations 64a to be displayed being linked to (e.g., dependent on for its inclusion in the first augmented view 60b) the one or more visual items 62a included in the first augmented view 60b.

As further illustrated in FIG. 11, in some implementations, operation 1123 may further include or involve one or more additional operations including in some cases an operation 1124 for displaying the first augmented view including the one or more first augmentations that is linked to the one or more visual items included in the first augmented view, the one or more first augmentations to be displayed being located at one or more predefined locations proximate to one or more locations of the one or more visual items in the first augmented view. For instance, the augmented view presenting module 104* of FIG. 7A or 7B displaying (e.g., visually presenting) the first augmented view (e.g., augmented view 60b of FIG. 6B) including the one or more first augmentations (e.g., augmentation 64a of FIG. 6B) that is linked to the one or more visual items (e.g., visual item 62a in FIG. 6B) included in the first augmented view 60b, the one or more first augmentations 64a to be displayed being located at one or more predefined locations proximate to one or more locations of the one or more visual items 62a in the first augmented view 60b. For example, placing or locating in an augmented view 60a an augmentation 64a adjacent to a visual item 62a that the augmentation 64a is linked to.

In the same or different implementations, operation 1123 may additionally or alternatively include an operation 1125 for displaying the first augmented view including the one or more first augmentations that is linked to the one or more visual items included in the first augmented view, the one or more first augmentations to be displayed being dependent on, for their inclusion into the first augmented view, the presence of the one or more visual items in the first augmented view For instance, the augmented view presenting module 104* of FIG. 7A or 7B displaying (e.g., visually presenting) the first augmented view (e.g., augmented view 60b of FIG. 6B) including the one or more first augmentations (e.g., augmentation 64a of FIG. 6B) that is linked to the one or more visual items (e.g., visual item 62a of FIG. 6A or 6B) included in the first augmented view 60b, the one or more first augmentations 64a to be displayed being dependent on, for their inclusion into the first augmented view 60b, the presence of the one or more visual items 62a in the first augmented view 60b.

In the same or different implementations, the augmented view displaying operation 904 may additionally or alternatively include an operation 1126 for displaying the first augmented view including the one or more first augmentations, the one or more first augmentations to be displayed being dependent on, for their inclusion into the first augmented view, one or more locations associated with the first scene. For instance, the augmented view presenting module 104* of FIG. 7A or 7B displaying (e.g., visually presenting) the first augmented view (e.g., augmented view 60b of FIG. 6B) including the one or more first augmentations (e.g., augmentation 64a of FIG. 6B), the one or more first augmentations 64a to be displayed being dependent on, for their inclusion into the first augmented view 60b, one or more locations associated with the first scene. For example, in the example views illustrated in FIGS. 6A and 6B the inclusion of the augmentation 64a into the augmented view 60b may be in response to the detected geographic or physical location of the first scene (e.g., the actual view 60a of FIG. 6A where the visual item 62a is found or the geographical location of the visual item 62a).

Figure 12A:
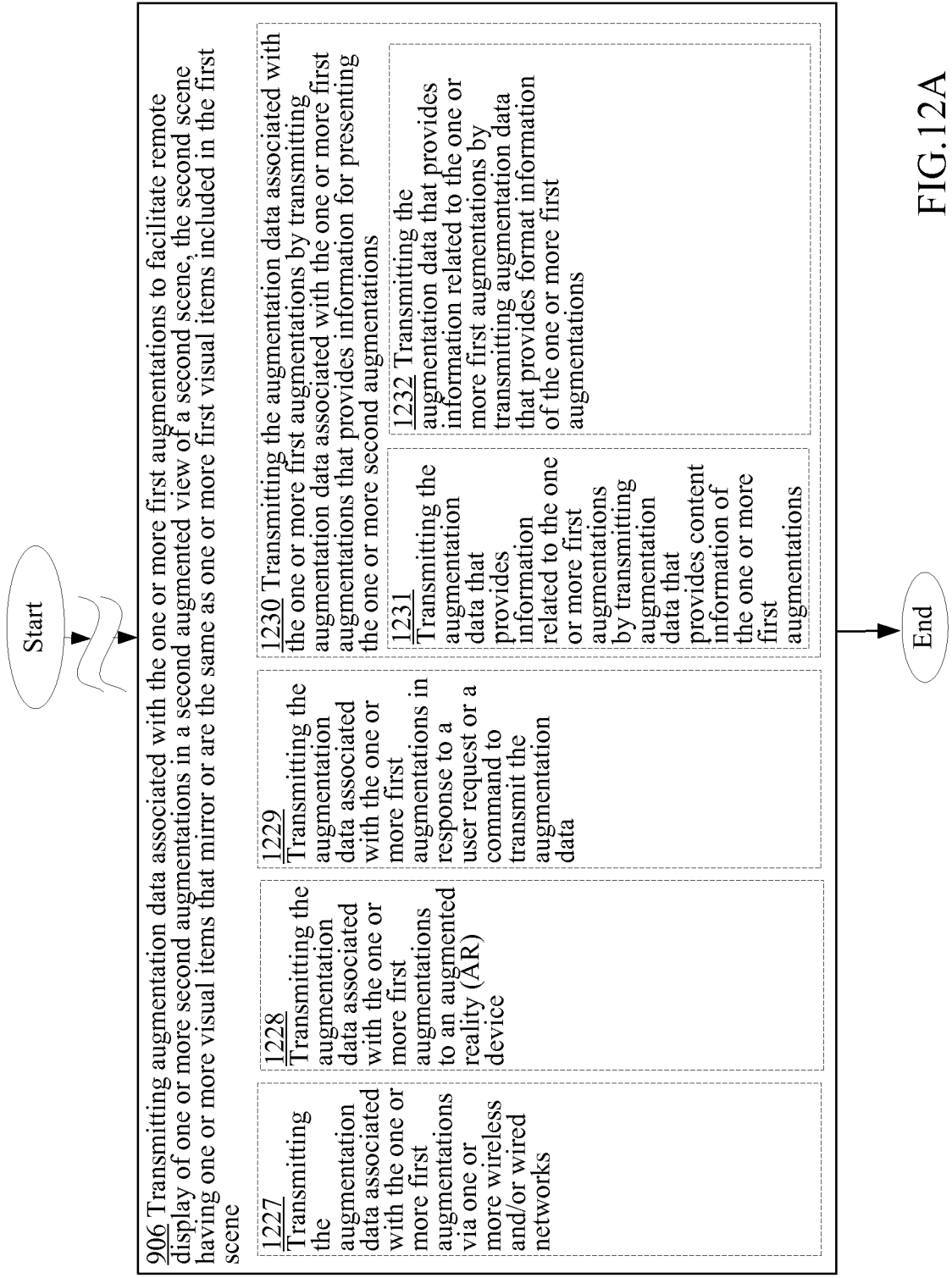
FIG. 12A is a high-level logic flowchart of a process depicting alternate implementations of the augmentation data transmitting operation 906 of FIG. 9.
Figure 12B:
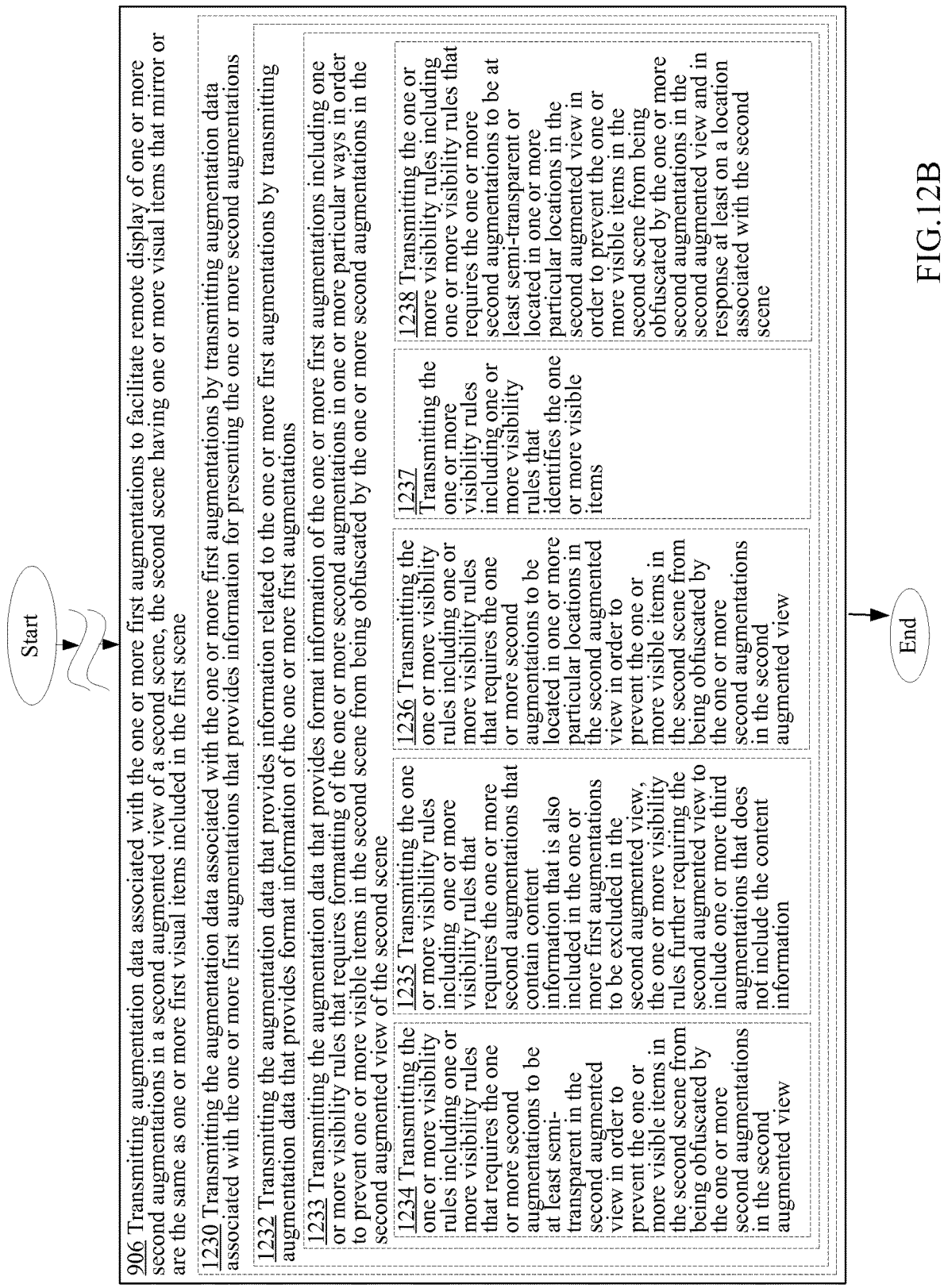
FIG. 12B is a high-level logic flowchart of a process depicting alternate implementations of the augmentation data transmitting operation 906 of FIG. 9.
Figure 12C:
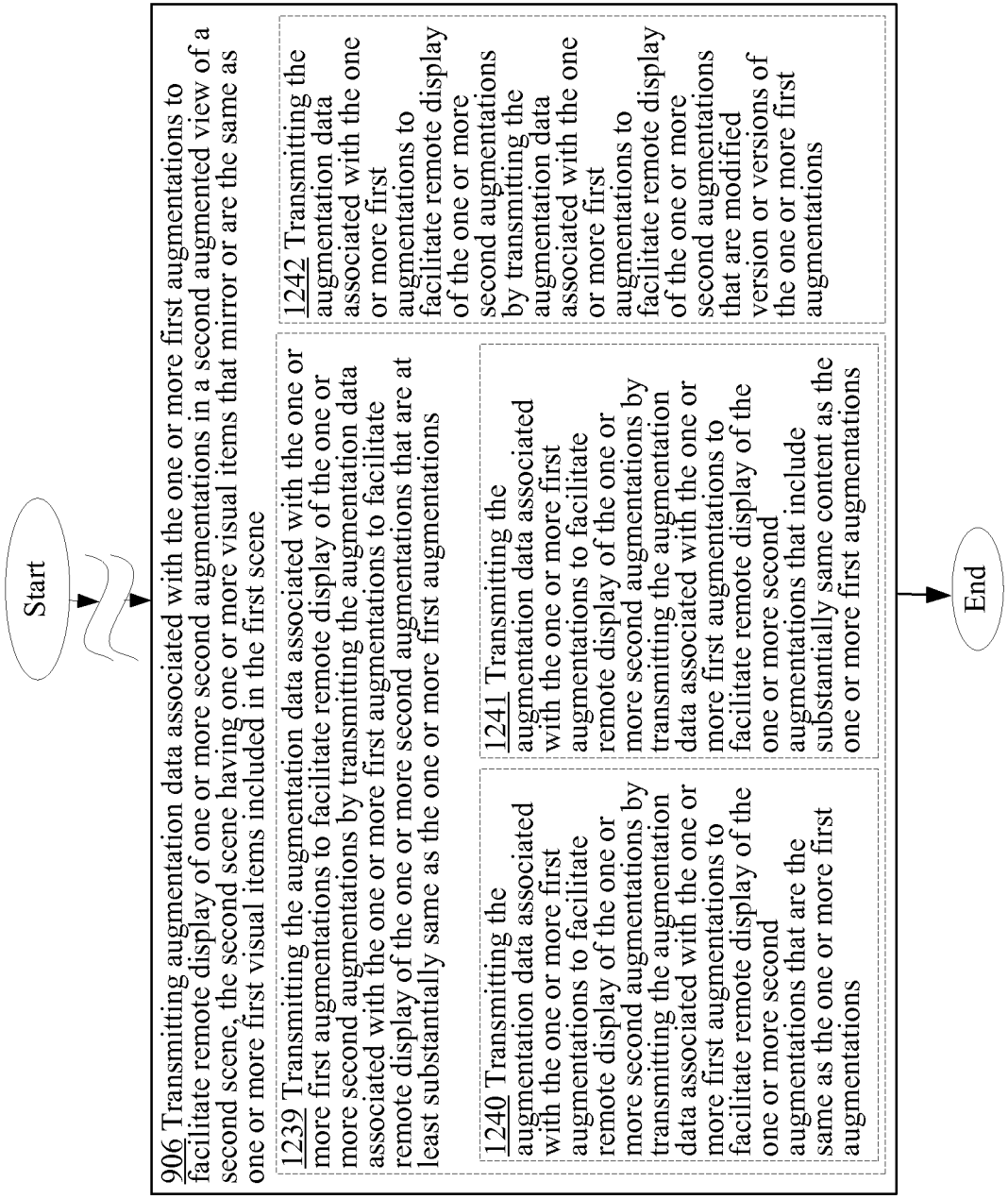
FIG. 12C is a high-level logic flowchart of a process depicting alternate implementations of the augmentation data transmitting operation 906 of FIG. 9.

Similar to the augmentation acquiring operation 902 and the augmented view displaying operation 904 of FIG. 9, the augmentation data transmitting operation 906 of FIG. 9 for transmitting augmentation data associated with the one or more first augmentations to facilitate remote display of one or more second augmentations in a second augmented view of a second scene, the second scene having one or more visual items that are also included in the first scene may be executed in a number of different ways in various alternative embodiments as illustrated in FIGS. 12A, 12B, and 12C. In some implementations, for example, the augmentation data transmitting operation 906 may include an operation 1227 for transmitting the augmentation data associated with the one or more first augmentations via one or more wireless and/or wired networks as illustrated in FIG. 12A. For instance, the network relaying module 816 (see FIG. 8B) of the AR device 70* of FIG. 7A or 7B transmitting (e.g., wirelessly sending or sharing with the AR device 50 of FIG. 5) the augmentation data (e.g., augmentation data 55 of FIG. 5) associated with the one or more first augmentations (e.g., augmentation 64a of FIG. 6B) via one or more wireless and/or wired networks 58.

In the same or different implementations, the augmentation data transmitting operation 906 may additionally or alternatively include an operation 1228 for transmitting the augmentation data associated with the one or more first augmentations to an augmented reality (AR) device. For instance, the augmentation data relaying module 106* of the AR device 70* of FIG. 7A or 7B transmitting (e.g., sending or relaying to the AR device 50 of FIG. 5) the augmentation data (e.g., augmentation data 55 of FIG. 5) associated with the one or more first augmentations (e.g., augmentation 64a of FIG. 6B) to an augmented reality (AR) device (e.g., AR device 50 of FIG. 5).

In the same or different implementations, the augmentation data transmitting operation 906 may additionally or alternatively include an operation 1229 for transmitting the augmentation data associated with the one or more first augmentations in response to a user request or a command to transmit the augmentation data. For instance, the user responsive augmentation data relaying module 818 (see FIG. 8B) of the AR device 70* of FIG. 7A or 7B transmitting the augmentation data (e.g., augmentation data 55 of FIG. 5) associated with the one or more first augmentations (e.g., augmentation 64a of FIG. 6B) in response to a user request or a command to transmit the augmentation data (e.g., one or more first augmentations 64a)

In the same or different implementations, the augmentation data transmitting operation 906 may additionally or alternatively include an operation 1230 for transmitting the augmentation data associated with the one or more first augmentations by transmitting augmentation data associated with the one or more first augmentations that provides information for presenting the one or more second augmentations. For instance, the augmentation data relaying module 106* of the AR device 70* of FIG. 7A or 7B transmitting the augmentation data (e.g., augmentation data 55 of FIG. 5) associated with the one or more first augmentations (e.g., augmentation 64a of FIG. 6B) by transmitting (e.g., relaying to the AR device 50 of FIG. 5) augmentation data 55 associated with the one or more first augmentations 64a that provides information (e.g., formatting information, content information, and so forth) for remotely presenting (e.g., displaying) the one or more second augmentations (e.g., augmentation 64b of FIG. 6D) at a remote AR device (AR device 50 of FIG. 5).

As further illustrated in FIG. 12A, in various implementations operation 1230 may include one or more additional operations including an operation 1231 for transmitting the augmentation data that provides information related to the one or more first augmentations by transmitting augmentation data that provides content information of the one or more first augmentations. For instance, the augmentation data relaying module 106* including the content information augmentation data relaying module 820 (see FIG. 8B) of the AR device 70* of FIG. 7A or 7B transmitting the augmentation data (e.g., augmentation data 55 of FIG. 5) that provides information related to the one or more first augmentations (e.g., augmentation 64a of FIG. 6B) when the content information augmentation data relaying module 820 transmits (e.g., relays to the AR device 50 of FIG. 5) augmentation data 55 that provides content information (e.g., background information of the Mona Lisa painting, the visual item 62a, provided in the first augmentation 64a) of the one or more first augmentations 64a.

In the same or different implementations, operation 1230 may additionally or alternatively include an operation 1232 for transmitting the augmentation data that provides information related to the one or more first augmentations by transmitting augmentation data that provides format information of the one or more first augmentations. For instance, the augmentation data relaying module 106* including the format information augmentation data relaying module 821 (see FIG. 8B) of the AR device 70* of FIG. 7A or 7B transmitting the augmentation data (e.g., augmentation data 55 of FIG. 5) that provides information related to the one or more first augmentations (e.g., augmentation 64a of FIG. 6B) when the format information augmentation data relaying module 821 transmits (e.g., relays to the AR device 50 of FIG. 5) augmentation data 55 that provides format information (e.g., font size and style if textual augmentation, table format, color, size, and so forth) of the one or more first augmentations 64a.

As further illustrated in FIG. 12B, operation 1232 in various implementations may include one or more additional operations including, for example, an operation 1233 for transmitting the augmentation data that provides format information of the one or more first augmentations including one or more visibility rules that requires formatting of the one or more second augmentations in one or more particular ways in order to prevent one or more visible items in the second scene from being obfuscated by the one or more second augmentations in the second augmented view of the second scene. For instance, the format information augmentation data relaying module 821 including the visibility rule relaying module 822 (see FIG. 8B) of the AR device 70* of FIG. 7A or 7B transmitting the augmentation data (e.g., augmentation data 55 of FIG. 5) that provides format information of the one or more first augmentations (e.g., augmentation 64a of FIG. 6B) including the visibility rule relaying module 822 transmitting (e.g., relaying to the AR device 50 of FIG. 5) one or more visibility rules that requires formatting of the one or more second augmentations (e.g., augmentation 64b of FIG. 6D) in one or more particular ways in order to prevent one or more visible items (e.g., textual items such as a name, a title, a sign, and/or other visual items) in the second scene (e.g., actual view 60c of FIG. 6C) from being obfuscated by the one or more second augmentations 64b in the second augmented view 60d of the second scene.

In the same or different implementations, operation 1233 may additionally or alternatively include an operation 1234 for transmitting the one or more visibility rules including one or more visibility rules that requires the one or more second augmentations to be at least semi-transparent in the second augmented view in order to prevent the one or more visible items in the second scene from being obfuscated by the one or more second augmentations in the second augmented view. For instance, the visibility rule relaying module 822 of the AR device 70* of FIG. 7A or 7B transmitting (e.g., relaying to the AR device 50 of FIG. 5) the one or more visibility rules including one or more visibility rules that requires the one or more second augmentations (e.g., augmentation 64b of FIG. 6D) to be at least semi-transparent in the second augmented view (e.g., augmented view 60d of FIG. 6D) in order to prevent the one or more visible items in the second scene from being obfuscated by the one or more second augmentations 64b in the second augmented view 60d.

In some cases, operation 1233 may additionally or alternatively include an operation 1235 for transmitting the one or more visibility rules including one or more visibility rules that requires the one or more second augmentations that contain content information that is also included in the one or more first augmentations to be excluded in the second augmented view, the one or more visibility rules further requiring the second augmented view to include one or more third augmentations that does not include the content information. For instance, the visibility rule relaying module 822 of the AR device 70* of FIG. 7A or 7B transmitting the one or more visibility rules including one or more visibility rules that requires the one or more second augmentations (e.g., 64b of FIG. 6D) that contain content information that is also included in the one or more first augmentations (e.g., 64a of FIG. 6B) to be excluded in the second augmented view (e.g., augmented view 60e of FIG. 6E), the one or more visibility rules further requiring the second augmented view 60e to include one or more third augmentations (e.g., augmentation 64c of FIG. 6E that is a tab that the AR device user may select using, for example, eye tracking or gaze application, in order to reveal or uncloak hidden information related to the visual item 62b) that does not include the content information. Thus, when the one or more transmitted visibility rules are implemented, a substitute augmentation (e.g., augmentation 64c) that is less visually intrusive (e.g., with minimal amount of visual obfuscation of the actual view 60c of the second scene) may be inserted into the augmented view (e.g., augmented view 60e) rather than inserting a more intrusive augmentation (e.g., augmentation 64b) into the augmented view In the same or different implementations, operation 1233 may additionally or alternatively include an operation 1236 for transmitting the one or more visibility rules including the one or more visibility rules that requires the one or more second augmentations to be located in one or more particular locations in the second augmented view in order to prevent the one or more visible items in the second scene from being obfuscated by the one or more second augmentations in the second augmented view as further illustrated in FIG. 12B. For instance, the visibility rule relaying module 822 of the AR device 70* of FIG. 7A or 7B transmitting the one or more visibility rules including the one or more visibility rules that requires the one or more second augmentations (e.g., augmentation 64d of FIG. 6F) to be located in one or more particular locations in the second augmented view (e.g., augmented view 60f) in order to prevent the one or more visible items (e.g., visible item 62d) in the second scene from being obfuscated by the one or more second augmentations 64d in the second augmented view (e.g., augmented view 60f of FIG. 6F).

In the same or different implementations, operation 1233 may additionally or alternatively include an operation 1237 for transmitting the one or more visibility rules including the one or more visibility rules that identifies the one or more visible items. For instance, the visibility rule relaying module 822 of the AR device 70* of FIG. 7A or 7B transmitting the one or more visibility rules including one or more visibility rules that identifies the one or more visible items (e.g., visible item 62d). Note that although visible item 62d in the examples illustrated in FIGS. 6C, 6D, 6E, and 6F is a painting by Picasso, other types of visual items may alternatively identified in the visibility rules including, for example, a sign such as an exit or traffic sign (e.g., stop sign), labels including warning labels, traffic lights, faces of individuals, and so forth.

In the same or different implementations, operation 1233 may additionally or alternatively an operation 1238 for transmitting the one or more visibility rules including one or more visibility rules that requires the one or more second augmentations to be at least semi-transparent or located in one or more particular locations in the second augmented view in order to prevent the one or more visible items in the second scene from being obfuscated by the one or more second augmentations in the second augmented view and in response at least on a location associated with the second scene. For instance, the visibility rule relaying module 822 of the AR device 70* of FIG. 7A or 7B transmitting the one or more visibility rules including one or more visibility rules that requires the one or more second augmentations to be at least semi-transparent or located in one or more particular locations in the second augmented view in order to prevent the one or more visible items in the second scene from being obfuscated by the one or more second augmentations (e.g., the augmentation 64b in FIG. 6D or the augmentation 64d in FIG. 6F) in the second augmented view and in response at least on a location associated with the second scene.

For example, suppose the second user 52 in the example scenario illustrated in FIG. 5 was at a museum looking at a copy of a visual item 62a (e.g., the Mona Lisa painting) of FIGS. 6A and 6B, rather than at home looking at a book (e.g., visual item 65 in FIG. 5), then the transmitted visibility rules may include a rule that requires one or more second augmentations (e.g., augmentation 64b of FIG. 6D) that may be inserted into the second augmented view (e.g., augmented view 60d) to be at least semi-transparent or located in one or more particular locations in the second augmented view 60d in order to prevent one or more visible items (e.g., an Exit sign) from being obfuscated and in response, for example, to detecting that the AR device 50 being at the museum (or geographic location of the museum). On the other hand, if the AR device 50 is determined to be in the home of the second user 52, then the visibility rules may not require the one or more second augmentations to be semi-transparent or be located in one or more particular locations in the second augmented view in order to prevent obfuscation of one or more visible items. That is, it may be desirable to keep visible an item such as an Exit sign when the AR device user 50b is out in public such as at a museum. However, if the AR device user 50b is at home then an Exit sign that may be posted in his home may not be required to be visible since it is likely that an Exit sign that is detected at the user's home is likely to be a declaration such as a bedroom wall sign.

Referring now to FIG. 12C, in various implementations the augmentation data transmitting operation 906 of FIG. 9 may additionally or alternatively include an operation 1239 for transmitting the augmentation data associated with the one or more first augmentations to facilitate remote display of the one or more second augmentations by transmitting the augmentation data associated with the one or more first augmentations to facilitate remote display of the one or more second augmentations that are at least substantially same as the one or more first augmentations. For instance, the augmentation data relaying module 106* of the AR device 70* of FIG. 7A or 7B transmitting (e.g., relaying the AR device 50 of FIG. 5) the augmentation data 55 associated with the one or more first augmentations (e.g., augmentation 64a of FIG. 6B) to facilitate remote display (e.g., remote display at the AR device 50) of the one or more second augmentations by transmitting the augmentation data (e.g., augmentation data 55 of FIG. 5) associated with the one or more first augmentations 64a to facilitate remote display of the one or more second augmentations (e.g., augmentation 64b of FIG. 6D) that are at least substantially same as the one or more first augmentations 64a.

As further illustrated in FIG. 12C, operation 1239 may include one or more additional operation in various alternative implementations. For example, in some implementations, operation 1239 may include an operation 1240 for transmitting the augmentation data associated with the one or more first augmentations to facilitate remote display of the one or more second augmentations by transmitting the augmentation data associated with the one or more first augmentations to facilitate remote display of the one or more second augmentations that are the same as the one or more first augmentations. For instance, the augmentation data relaying module 106* of the AR device 70* of FIG. 7A or 7B transmitting the augmentation data (e.g., augmentation data 55 of FIG. 5) associated with the one or more first augmentations (e.g., augmentation 64a of FIG. 6B) to facilitate remote display of the one or more second augmentations by transmitting the augmentation data 55 associated with the one or more first augmentations 64a to facilitate remote display of the one or more second augmentations (e.g., augmentation 64a of FIG. 6B that is included in the augmented view 60d of FIG. 6D) that are the same as the one or more first augmentations 64a.

In the same or alternative implementations, operation 1239 may additionally or alternatively include an operation 1241 for transmitting the augmentation data associated with the one or more first augmentations to facilitate remote display of the one or more second augmentations by transmitting the augmentation data associated with the one or more first augmentations to facilitate remote display of the one or more second augmentations that include substantially same content as the one or more first augmentations. For instance, the augmentation data relaying module 106* of the AR device 70* of FIG. 7A or 7B transmitting the augmentation data (e.g., augmentation data 55 of FIG. 5) associated with the one or more first augmentations (e.g., augmentation 64a of FIG. 6B) to facilitate remote display of the one or more second augmentations (e.g., augmentation 64b of FIG. 6D) by transmitting the augmentation data 55 associated with the one or more first augmentations 64a to facilitate remote display of the one or more second augmentations 64b that include substantially same content (e.g., content information) as the one or more first augmentations 64a.

In the same or alternative implementations, the augmentation data transmitting operation 906 may additionally or alternatively include an operation 1242 for transmitting the augmentation data associated with the one or more first augmentations to facilitate remote display of the one or more second augmentations by transmitting the augmentation data associated with the one or more first augmentations to facilitate remote display of the one or more second augmentations that are modified version or versions of the one or more first augmentations. For instance, the augmentation data relaying module 106* of the AR device 70* of FIG. 7A or 7B transmitting the augmentation data (e.g., augmentation data 55 of FIG. 5) associated with the one or more first augmentations (e.g., augmentation 64a of FIG. 6B) to facilitate remote display of the one or more second augmentations (e.g., augmentation 64b of FIG. 6D or augmentation 64d of FIG. 6F) by transmitting the augmentation data 55 associated with the one or more first augmentations 64a to facilitate remote display of the one or more second augmentations 64b or 64d that are modified version or versions of the one or more first augmentations 64a. In some cases, the modified version or versions may be as a result of the AR device 50 of the second user 52, which is receiving the augmentation data 55, having apply its own visibility rules that dictates how and when will the one or more second augmentations (e.g., augmentations 64b, 64c, 64d, or 64e of FIG. 6D, 6E, 6F, or 6H) may be displayed through the second AR device 50.

Figure 13:
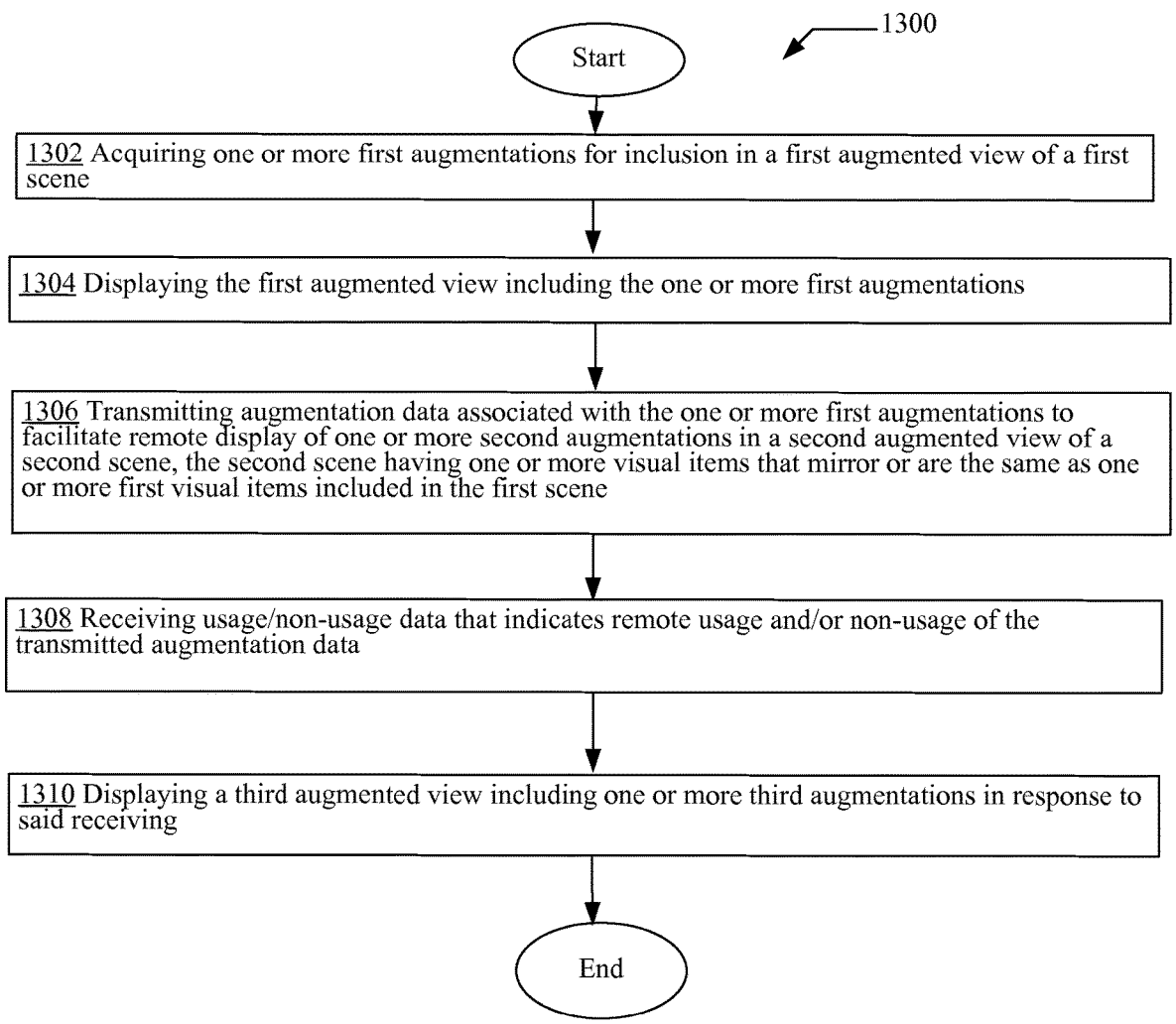
FIG. 13 is another high-level logic flowchart of a process, e.g., operational flow 1300, according to some embodiments.

Referring now to FIG. 13 illustrating another operational flow 1300. Operational flow 1300 includes certain operations that mirror the operations included in operational flow 900 of FIG. 9. These operations include an augmentation acquiring operation 1302, an augmented view displaying operation 1304, and an augmentation data transmitting operation 1306 that corresponds to and mirror the augmentation acquiring operation 902, the augmented view displaying operation 904, and the augmentation data transmitting operation 906, respectively, of FIG. 9.

In addition, operational flow 1300 may also include an operation 1308 for receiving usage/non-usage data that indicates remote usage and/or non-usage of the transmitted augmentation data. For instance, the usage/non-usage data acquiring module 107* of FIG. 7A or 7B receiving (e.g., obtaining or acquiring) usage/non-usage data (e.g., usage/non-usage data 56 of FIG. 5) that indicates remote usage and/or non-usage of the transmitted augmentation data by, for example, the AR device 50 of the second user 52 of FIG. 5.

As further illustrated in FIG. 13, operational flow 1300 in various implementations may further include an operation 1310 for displaying a third augmented view including one or more third augmentations in response to said receiving. For instance, the augmented view presenting module 104* of FIG. 7A or 7B displaying (e.g., showing or visually presenting) a third augmented view (e.g., augmented view 60i of FIG. 6I) including one or more third augmentations (e.g., augmentation 64f of FIG. 6I, which includes an indicator 65a that indicates successful transmission of augmentation data based on the received usage/non-usage data 56) in response to said receiving by, for example the usage/non-usage data acquiring module 107*.

Figure 14:
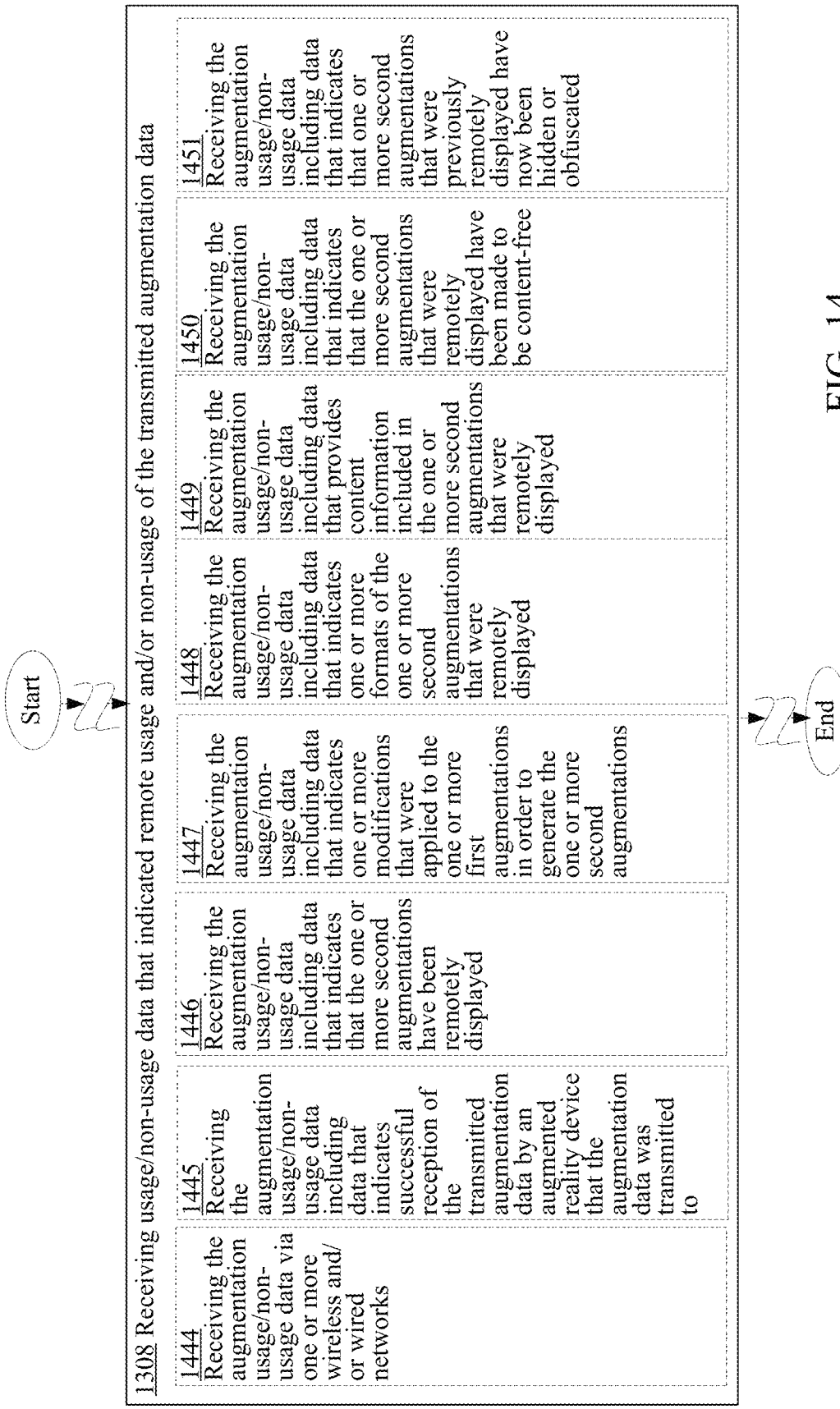
FIG. 14 is a high-level logic flowchart of a process depicting alternate implementations of operation 1308 of FIG. 13.

Similar to the augmentation acquiring operation 1302, the augmented view displaying operation 1304, and the augmentation data transmitting operation 1306 of FIG. 13, operation 1308 may also be executed in a variety of different ways in various alternative implementations as illustrated in FIG. 14. For instance, in some implementations operation 1308 may include or involve an operation 1444 for receiving the augmentation usage/non-usage data via one or more wireless and/or wired networks. For instance the network acquiring module 824 (see FIG. 8C) of the AR device 70* of FIG. 7A or 7B receiving the augmentation usage/non-usage data 56 via one or more wireless and/or wired networks 58.

In the same or alternative implementations, operation 1308 may additionally or alternatively include an operation 1445 for receiving the augmentation usage/non-usage data including data that indicates successful reception of the transmitted augmentation data by an augmented reality (AR) device that the augmentation data was transmitted to. For instance the successful reception indicating data acquiring module 826 (see FIG. 8C) of the AR device 70* of FIG. 7A or 7B receiving the augmentation usage/non-usage data (e.g., the augmentation usage/non-usage data 56 of FIG. 5) including data that indicates successful reception of the transmitted augmentation data by an augmented reality device (e.g., the AR device 50 of FIG. 5) that the augmentation data (e.g., the augmentation data 55 of FIG. 5) was transmitted to.

In the same or alternative implementations, operation 1308 may additionally or alternatively include an operation 1446 for receiving the augmentation usage/non-usage data including data that indicates that the one or more second augmentations have been remotely displayed. For instance the remotely displayed indicating data acquiring module 828 (see FIG. 8C) of the AR device 70* of FIG. 7A or 7B receiving the augmentation usage/non-usage data (e.g., the augmentation usage/non-usage data 56 of FIG. 5) including data that indicates that the one or more second augmentations (e.g., the augmentation 64b of FIG. 6D) have been remotely displayed (e.g., remotely displayed by an AR device 50 of FIG. 5).

In the same or alternative implementations, operation 1308 may additionally or alternatively include an operation 1447 for receiving the augmentation usage/non-usage data including data that indicates one or more modifications that were applied to the one or more first augmentations in order to generate the one or more second augmentations as further illustrated in FIG. 14. For instance the modification indicating data acquiring module 830 (see FIG. 8C) of the AR device 70* of FIG. 7A or 7B receiving the augmentation usage/non-usage data including data (e.g., the augmentation usage/non-usage data 56 of FIG. 5) that indicates one or more modifications (e.g., deletion, addition, formatting, and so forth) that were applied to the one or more first augmentations (e.g., the augmentation 64a of FIG. 6B) in order to generate the one or more second augmentations (e.g., the augmentation 64b of FIG. 6D).

In the same or alternative implementations, operation 1308 may additionally or alternatively include an operation 1448 for receiving the augmentation usage/non-usage data including data that indicates one or more formats of the one or more second augmentations that were remotely displayed. For instance the format indicating data acquiring module 832 (see FIG. 8C) of the AR device 70* of FIG. 7A or 7B receiving the augmentation usage/non-usage data (e.g., the augmentation usage/non-usage data 56 of FIG. 5) including data that indicates one or more formats (e.g. textual formats, display formats such as placement of augmentation in an augmented view, and so forth) of the one or more second augmentations (e.g., the augmentation 64b of FIG. 6D) that were remotely displayed at, for example, a remote AR device 50 (see FIG. 5).

In the same or alternative implementations, operation 1308 may additionally or alternatively include an operation 1449 for receiving the augmentation usage/non-usage data including data that provides content information included in the one or more second augmentations that were remotely displayed. For instance the content information acquiring module 834 (see FIG. 8C) of the AR device 70* of FIG. 7A or 7B receiving the augmentation usage/non-usage data (e.g., the augmentation usage/non-usage data 56 of FIG. 5) including data that provides content information included in the one or more second augmentations (e.g., the augmentation 64b of FIG. 6D) that were remotely displayed at, for example, a remote AR device 50 (see FIG. 5).

In the same or alternative implementations, operation 1308 may additionally or alternatively include an operation 1450 for receiving the augmentation usage/non-usage data including data that indicates that the one or more second augmentations that were remotely displayed have been made to be content-free. For instance the usage/non-usage data acquiring module 107* of FIG. 7A or 7B receiving the augmentation usage/non-usage data (e.g., the augmentation usage/non-usage data 56 of FIG. 5) including data that indicates that the one or more second augmentations (e.g., the augmentation 64c or 64e of FIG. 6E or 6H) that were remotely displayed have been made to be content-free. For example, in the examples illustrated in FIGS. 6E and 6H, the augmentation 64c (an augmentation in the form of a tab that can be "clicked" to refresh or retrieve content information) of FIG. 6E and the augmentation 64e of FIG. 6H (an augmentation in the form of a book or page marker) that provides little or no content.

In the same or alternative implementations, operation 1308 may additionally or alternatively include an operation 1451 for receiving the augmentation usage/non-usage data including data that indicates that the one or more second augmentations that were previously remotely displayed have now been hidden or obfuscated. For instance the usage/non-usage data acquiring module 107* of FIG. 7A or 7B receiving the augmentation usage/non-usage data (e.g., the augmentation usage/non-usage data 56 of FIG. 5) including data that indicates that the one or more second augmentations that were previously remotely displayed have now been hidden or obfuscated.

Figure 15:
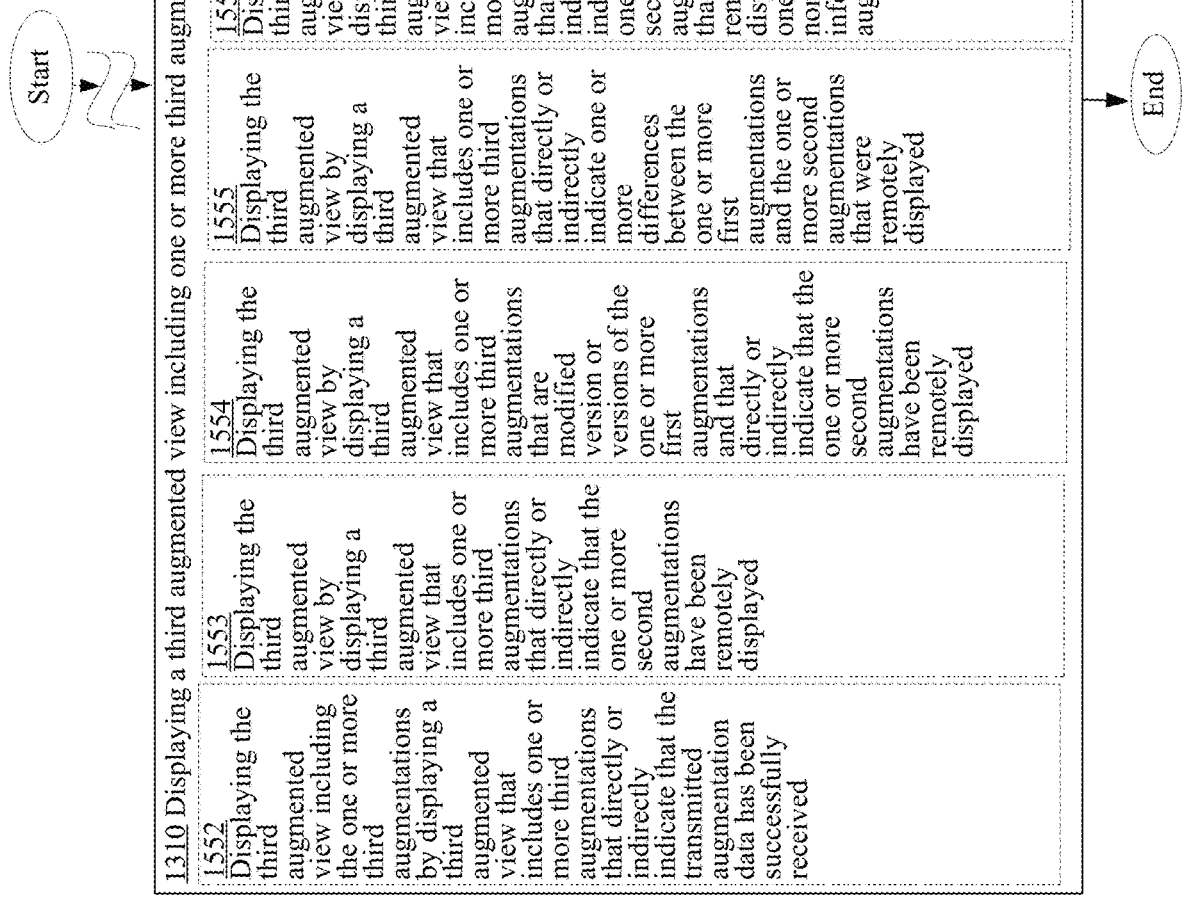
FIG. 15 is a high-level logic flowchart of a process depicting alternate implementations of operation 1310 of FIG. 13.

Similar to operation 1308 of FIG. 13, operation 1310 for displaying a third augmented view including one or more third augmentations in response to said receiving may be implemented in a variety of different ways as illustrated in FIG. 15. For example, in some implementations, operation 1310 may include or involve an operation 1552 for displaying the third augmented view including the one or more third augmentations by displaying a third augmented view that includes one or more third augmentations that directly or indirectly indicate that the transmitted augmentation data has been successfully received. For instance, the augmented view presenting module 104* of FIG. 7A or FIG. 7B displaying (e.g., visually presenting) the third augmented view including the one or more third augmentations by displaying (as illustrated, for example, in FIGS. 6I and 6K) a third augmented view 60i or 60k (see FIG. 6I or 6K) that includes one or more third augmentations 64f or 64g (see FIG. 6I or 6K) that directly or indirectly indicate that the transmitted augmentation data (e.g., augmentation data 55 of FIG. 5) has been successfully received (e.g., successfully relayed). For example, in the example augmented view 60i of FIG. 6I, the augmentation 64f through message 65a directly indicates that augmentation data was successfully received (e.g., transmitted) while in the example augmented view 60k of FIG. 6K, the augmentation 64g indirectly indicates (e.g., the augmentation 64g having flashing or particularly colored margin/border) that the augmentation data was successfully received by, for example, a remote AR device 50 (see FIG. 5).

In the same or alternative implementations, operation 1310 may additionally or alternatively include an operation 1553 for displaying the third augmented view by displaying a third augmented view that includes one or more third augmentations that directly or indirectly indicate that the one or more second augmentations have been remotely displayed. For instance, the augmented view presenting module 104* of FIG. 7A or FIG. 7B displaying the third augmented view by displaying (as illustrated, for example, in FIGS. 6M and 6N) a third augmented view 60m or 60n (see FIG. 6M or 6N) that includes one or more third augmentations 64h or 64i (see FIG. 6M or 6N) that directly or indirectly indicate that the one or more second augmentations (e.g., augmentation 64b of FIG. 6D) have been remotely displayed. For example in the augmented view 60m of FIG. 6M, the augmentation 64h through message 65c directly indicates that the one or more second augmentations 64b (see FIG. 6D) was viewed while in the example augmented view 60n of FIG. 6N, the augmentation 64i indirectly indicates (e.g., the augmentation 64i having a particular background color) that the one or more second augmentations was, for example, viewed through a remote AR device 50 (see FIG. 5).

In the same or alternative implementations, operation 1310 may additionally or alternatively include an operation 1554 for displaying the third augmented view by displaying a third augmented view that includes one or more third augmentations that are modified version or versions of the one or more first augmentations and that directly or indirectly indicate that the one or more second augmentations have been remotely displayed. For instance, the augmented view presenting module 104* of FIG. 7A or FIG. 7B displaying the third augmented view by displaying a third augmented view 60m or 60n of FIG. 6M or 6N that includes one or more third augmentations 64h or 64i that are modified version or versions of the one or more first augmentations 64a of FIG. 6B and that directly or indirectly indicate that the one or more second augmentations (e.g., augmentation 64b, 64c, 64d, or 64e, of FIGS. 6D, 6E, 6F, 6H) have been remotely displayed at, for example, a remote AR device 50 (see FIG. 5).

In the same or alternative implementations, operation 1310 may additionally or alternatively include an operation 1555 for displaying the third augmented view by displaying a third augmented view that includes one or more third augmentations that directly or indirectly indicate one or more differences between the one or more first augmentations and the one or more second augmentations that were remotely displayed as further illustrated in FIG. 15. For instance, the augmented view presenting module 104* of FIG. 7A or FIG. 7B displaying the third augmented view by displaying (as illustrated, for example, by FIG. 6P) a third augmented view 600p that includes one or more third augmentations 64k that directly or indirectly indicate one or more differences between the one or more first augmentations 64a (see FIG. 6B) and the one or more second augmentations 64b (see FIG. 6D) that were remotely displayed.

In the same or alternative implementations, operation 1310 may additionally or alternatively include an operation 1556 for displaying the third augmented view by displaying a third augmented view that includes one or more third augmentations that directly or indirectly indicate that the one or more second augmentations that was remotely displayed was one or more non-informational augmentations. For instance, the augmented view presenting module 104* of FIG. 7A or FIG. 7B displaying the third augmented view by displaying a third augmented view (e.g., the augmented view 60i of FIG. 6I) that includes one or more third augmentations (e.g., a modified version of augmentation 64f of FIG. 6i in which message 65a indicates that a non-informational augmentation was remotely displayed) that directly or indirectly indicate that the one or more second augmentations 64c or 64e of FIG. 6E or 6H that was remotely displayed was one or more non-informational augmentations (e.g., augmentations that are substantially or completely devoid of content information related to the one or more visual items that the augmentations are linked to—see, for example, FIG. 6E).

In the same or alternative implementations, operation 1310 may additionally or alternatively include an operation 1557 for displaying the third augmented view by displaying a third augmented view that includes one or more third augmentations that directly or indirectly indicate that one or more second augmentations that were previously remotely displayed have now been hidden or obfuscated. For instance, the augmented view presenting module 104* of FIG. 7A or FIG. 7B displaying the third augmented view by displaying a third augmented view that includes one or more third augmentations that directly or indirectly indicate that one or more second augmentations that were previously remotely displayed (e.g. remotely displayed by the AR device 50) have now been hidden or obfuscated at the remote AR device 50 (see FIG. 5).

As further illustrated in FIG. 15, in some implementations, operation 1557 may further include an operation 1558 for displaying the third augmented view that includes one or more third augmentations that directly or indirectly indicate that the one or more second augmentations that were hidden or obfuscated from being remotely displayed have again been redisplayed. For instance, the augmented view presenting module 104* of FIG. 7A or FIG. 7B displaying the third augmented view that includes one or more third augmentations that directly or indirectly indicate that the one or more second augmentations that were hidden or obfuscated from being remotely displayed have again been redisplayed.

In the same or alternative implementations, operation 1310 may additionally or alternatively include an operation 1559 for displaying the third augmented view by displaying a third augmented view including one or more third augmentations that indicate one or more degrees of correspondence between the one or more first augmentations and the one or more second augmentations. For instance, the augmented view presenting module 104* of FIG. 7A or FIG. 7B displaying the third augmented view by displaying (as illustrated, for example, in FIG. 6R) a third augmented view 60r including one or more third augmentations 64n that indicate one or more degrees of correspondence (see, for example, feature 65e of FIG. 6R) between the one or more first augmentations 64a and the one or more second augmentations 64b.

Figure 16:
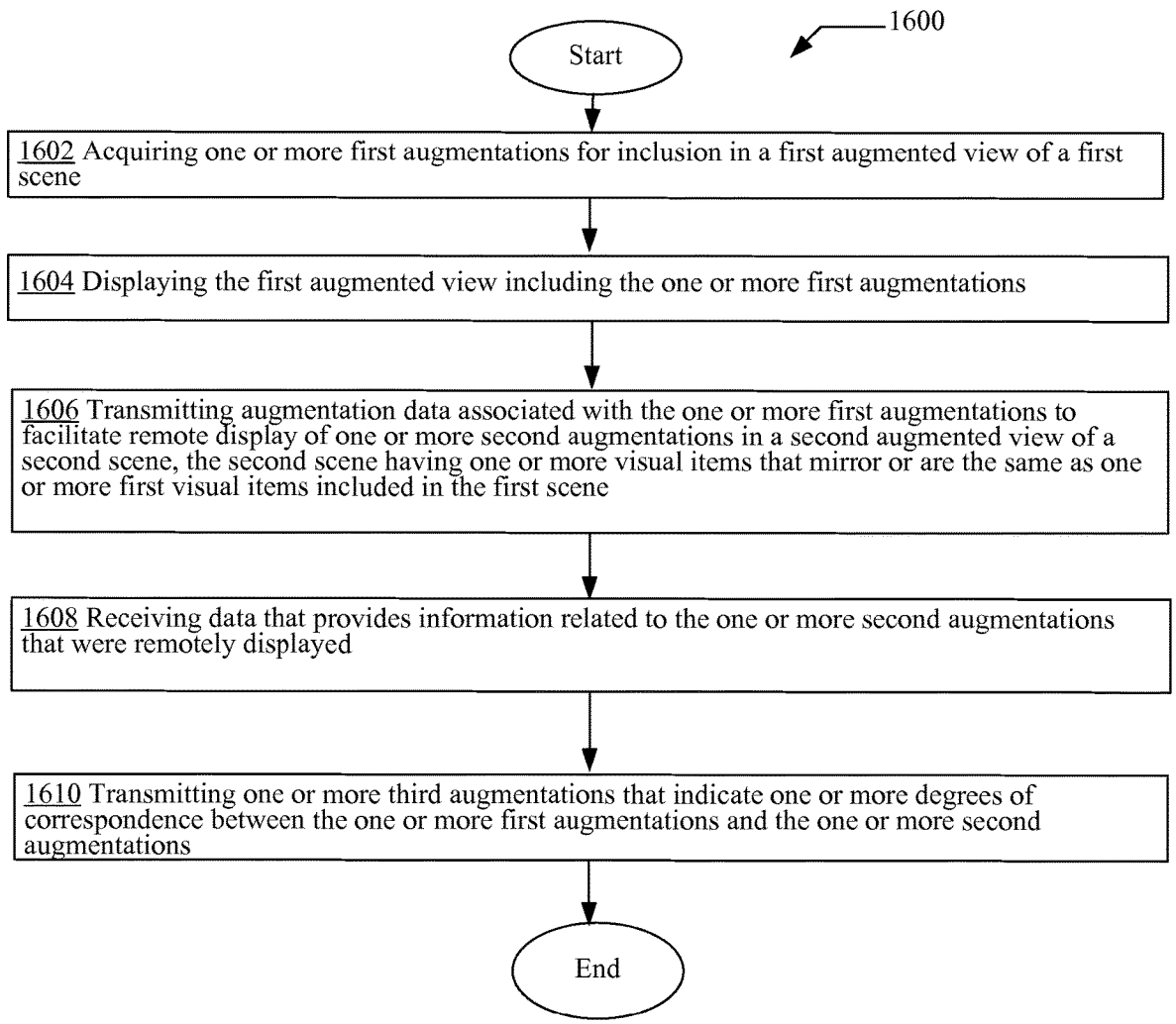
FIG. 16 is another high-level logic flowchart of a process, e.g., operational flow 1600, according to some embodiments.

Referring now to FIG. 16 illustrating another operational flow 1600. Operational flow 1300 includes certain operations that mirror the operations included in operational flow 900 of FIG. 9. These operations include an augmentation acquiring operation 1602, an augmented view displaying operation 1604, and an augmentation data transmitting operation 1606 that corresponds to and mirror the augmentation acquiring operation 902, the augmented view displaying operation 904, and the augmentation data transmitting operation 906, respectively, of FIG. 9.

In addition, operational flow 1600 additionally includes an operation 1608 for receiving data that provides information related to the one or more second augmentations that were remotely displayed. For instance, the augmentation data acquiring module 108* of FIG. 7A or 7B receiving data that provides information related to the one or more second augmentations (e.g., augmentation 64b of FIG. 6D) that were remotely displayed at, for example, a remote AR device 50 (see FIG. 5).

As further illustrated in FIG. 16, operational flow 1600 may also include an operation 1610 for transmitting one or more third augmentations that indicate one or more degrees of correspondence between the one or more first augmentations and the one or more second augmentations. For instance, the augmentation data relaying module 106* of FIG. 7A or 7B transmitting one or more third augmentations 64n (see FIG. 6R) that indicate one or more degrees of correspondence between the one or more first augmentations 64a (see FIG. 6B) and the one or more second augmentations 64b (e.g., see FIG. 6D). Although not illustrated in FIG. 16, in alternative implementation, operational flow 1600 may additionally include certain operations from operational flow 1300 of FIG. 13 including, for example, operation 1308 for receiving usage/non-usage data that indicates remote usage and/or non-usage of the transmitted augmentation data and operation 1310 for displaying a third augmented view including one or more third augmentations in response to said receiving.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructionsper_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinct ion left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/ converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A computationally-implemented method comprising:
    performing recognition at a first augmented reality device to identify a real-world visual item that is physically present within a real-world environment visible within a field of view of the first augmented reality device;
    acquiring one or more augmentations regarding the real-world visual item that is physically present within the real-world environment at the first augmented reality device via a wireless broadcast from a source local to the real-world visual item;
    displaying, via the first augmented reality device, an augmented view including the one or more augmentations regarding the real-world visual item; and
    transmitting the one or more augmentations regarding the real-world visual item and one or more visibility rules to at least one second augmented reality device to facilitate display of the one or more augmentations regarding the real-world visual item in response to detection of a different instance of the real-world visual item within a second field of view of a second real-world environment viewed by the at least one second augmented reality device.

2. The computationally-implemented method of claim 1, further comprising:
    soliciting the one or more augmentations.

3. The computationally-implemented method of claim 1, wherein said acquiring one or more augmentations regarding the visual item at the first augmented reality device via a wireless broadcast from a source local to the visual item comprises:
    acquiring one or more augmentations regarding the visual item at the first augmented reality device via a wireless broadcast from a source local to the visual item, in response to presence at a location.

4. The computationally-implemented method of claim 1, wherein said acquiring one or more augmentations regarding the visual item at the first augmented reality device via a wireless broadcast from a source local to the visual item comprises:
    acquiring one or more augmentations regarding the visual item at the first augmented reality device via a wireless broadcast from a source local to the visual item, wherein the visual item comprises a face.

5. The computationally-implemented method of claim 1, wherein said transmitting the one or more augmentations regarding the visual item and one or more visibility rules to at least one second augmented reality device to facilitate display of the one or more augmentations regarding the visual item in response to detection of a different instance of the visual item comprises:
    transmitting the one or more augmentations regarding the visual item and one or more format rules to at least one second augmented reality device to facilitate display of the one or more augmentations regarding the visual item in response to detection of a different instance of the visual item.

6. The computationally-implemented method of claim 5, wherein said transmitting the one or more augmentations regarding the visual item and one or more format rules to at least one second augmented reality device to facilitate display of the one or more augmentations regarding the visual item in response to detection of a different instance of the visual item comprises:
    transmitting the one or more augmentations regarding the visual item and one or more format rules to at least one second augmented reality device to facilitate display of the one or more augmentations regarding the visual item in response to detection of a different instance of the visual item, the one or more format rules requiring formatting of the one or more augmentations in one or more particular ways in order to prevent one or more items from being obfuscated.

7. The computationally-implemented method of claim 5, wherein the transmitting the one or more augmentations regarding the visual item and one or more format rules to at least one second augmented reality device to facilitate display of the one or more augmentations regarding the visual item in response to detection of a different instance of the visual item comprises:
    transmitting the one or more augmentations regarding the visual item and one or more format rules to at least one second augmented reality device to facilitate display of the one or more augmentations regarding the visual item in response to detection of a different instance of the visual item, the one or more format rules requiring the one or more augmentations to be at least semi-transparent.

8. The computationally-implemented method of claim 5, wherein the transmitting the one or more augmentations regarding the visual item and one or more format rules to at least one second augmented reality device to facilitate display of the one or more augmentations regarding the visual item in response to detection of a different instance of the visual item comprises:
    transmitting the one or more augmentations regarding the visual item and one or more format rules to at least one second augmented reality device to facilitate display of the one or more augmentations regarding the visual item in response to detection of a different instance of the visual item, the one or more format rules requiring the one or more augmentations to be located in one or more particular locations.

9. The computationally-implemented method of claim 1, wherein said transmitting the one or more augmentations regarding the visual item and one or more visibility rules to at least one second augmented reality device to facilitate display of the one or more augmentations regarding the visual item in response to detection of a different instance of the visual item comprises:
    transmitting the one or more augmentations regarding the visual item and one or more visibility rules to at least one second augmented reality device to facilitate display of a modified version of the one or more augmentations regarding the visual item in response to detection of a different instance of the visual item.

10. The computationally-implemented method of claim 1, further comprising:

after transmitting the one or more augmentations regarding the real-world visual item and one or more visibility rules to at least one second augmented reality device, receiving at the first augmented reality device usage/non-usage data that indicates remote usage and/or non-usage of the one or more augmentations by the at least one second augmented reality device; and displaying one or more additional augmentations within the field of view of the first augmented reality device in response to said usage/non-usage data.

11. The computationally-implemented method of claim 10, wherein said receiving usage/non-usage data that indicates remote usage and/or non-usage of the one or more augmentations by the at least one second augmented reality device comprises:

receiving via a wireless network usage/non-usage data that indicates remote usage and/or non-usage of the one or more augmentations by the at least one second augmented reality device.

12. The computationally-implemented method of claim 10, wherein said receiving usage/non-usage data that indicates remote usage and/or non-usage of the one or more augmentations by the at least one second augmented reality device comprises:

receiving usage/non-usage data that indicates reception of the one or more augmentations by the at least one second augmented reality device.

13. The computationally-implemented method of claim 10, wherein said receiving usage/non-usage data that indicates remote usage and/or non-usage of the one or more augmentations by the at least one second augmented reality device comprises:

receiving usage/non-usage data that indicates remote display of the one or more augmentations by the at least one second augmented reality device.

14. The computationally-implemented method of claim 10, wherein said receiving usage/non-usage data that indicates remote usage and/or non-usage of the one or more augmentations by the at least one second augmented reality device comprises:

receiving usage/non-usage data that indicates one or more modifications applied to the one or more augmentations by the at least one second augmented reality device.

15. The computationally-implemented method of claim 10, wherein said receiving usage/non-usage data that indicates remote usage and/or non-usage of the one or more augmentations by the at least one second augmented reality device comprises:

receiving usage/non-usage data that indicates one or more formats of the one or more augmentations displayed by the at least one second augmented reality device.

16. The computationally-implemented method of claim 10, wherein said receiving usage/non-usage data that indicates remote usage and/or non-usage of the one or more augmentations by the at least one second augmented reality device comprises:

receiving usage/non-usage data that indicates content of the one or more augmentations displayed by the at least one second augmented reality device.

17. The computationally-implemented method of claim 10, wherein said receiving usage/non-usage data that indicates remote usage and/or non-usage of the one or more augmentations by the at least one second augmented reality device comprises:

receiving usage/non-usage data that indicates hiding or obfuscation caused by the one or more augmentations at the at least one second augmented reality device.

18. The computationally-implemented method of claim 10, wherein said displaying one or more additional augmentations in response to said usage/non-usage data comprises:

displaying one or more additional augmentations that indicate the one or more augmentations have been remotely displayed by the at least one second augmented reality device.

19. The computationally-implemented method of claim 10, wherein said displaying one or more additional augmentations in response to said usage/non-usage data comprises:

displaying one or more additional augmentations that are a modified version or versions of the one or more augmentations.

20. The computationally-implemented method of claim 10, wherein said displaying one or more additional augmentations in response to said usage/non-usage data comprises:

displaying one or more additional augmentations that indicate one or more differences between the one or more augmentations displayed at the at least one second augmented reality device.

21. The computationally-implemented method of claim 10, wherein said displaying one or more additional augmentations in response to said usage/non-usage data comprises:

displaying one or more additional augmentations that indicate that at least a portion of the one or more augmentations have now been hidden or obfuscated.

22. The computationally-implemented method of claim 10, wherein said displaying one or more additional augmentations in response to said usage/non-usage data comprises:

displaying one or more additional augmentations that indicate that the one or more augmentations that were hidden or obfuscated have again been redisplayed.

23. The computationally-implemented method of claim 10, wherein said displaying one or more additional augmentations in response to said usage/non-usage data comprises:

displaying one or more additional augmentations that indicate one or more degrees of correspondence with the one or more augmentations displayed by the at least one second augmented reality device.

24. The computationally-implemented method of claim 1, further comprising:

receiving data that provides information related to one or more remotely displayed augmentations;

outputting one or more additional augmentations that indicate one or more degrees of correspondence between the one or more augmentations and the one or more remotely displayed augmentations.

25. The method of claim 1, further comprising:

receiving one or more wireless signals emitted from one or more wireless transmitters including the one or more augmentations and identification of a face for which the one or more augmentations are associated.

26. The method of claim 1, further comprising:

storing to memory the one or more augmentations for inclusion in the first augmented view of the first real-world scene in an event that the visual item is recognized.

27. The method of claim 1, further comprising:

displaying at the first augmented reality device one or more additional augmentations indicating usage data associated with the at least one second augmented reality device.

28. The method of claim 1, wherein the acquiring one or more augmentations regarding the visual item at the first augmented reality device via a wireless broadcast from a source local to the visual item comprises:

acquiring one or more augmentations regarding the visual item at the first augmented reality device via a wireless broadcast from a source local to the visual item, the one or more augmentations regarding a name and a background summary of an individual.

29. The method of claim 1, wherein the acquiring one or more augmentations regarding the visual item at the first augmented reality device via a wireless broadcast from a source local to the visual item comprises:
acquiring one or more augmentations regarding the visual item at the first augmented reality device via a wireless broadcast from a transmitter physically present with the visual item.

30. The method of claim 1, wherein the transmitting the one or more augmentations regarding the visual item and one or more visibility rules to at least one second augmented reality device to facilitate display of the one or more augmentations regarding the visual item in response to detection of a different instance of the visual item comprises:
transmitting the one or more augmentations regarding the visual item and one or more visibility rules to at least one second augmented reality device to facilitate display of the one or more augmentations regarding the visual item in response to detection of a different instance of the visual item, the one or more visibility rules providing identification information for the visual item and format information for the one or more augmentations.

31. The method of claim 1, wherein the acquiring one or more augmentations regarding the visual item at the first augmented reality device via a wireless broadcast from a source local to the visual item comprises:
acquiring one or more augmentations regarding the visual item at the first augmented reality device via a wireless broadcast from a router device local to the visual item.

32. The method of claim 1, wherein the acquiring one or more augmentations regarding the visual item at the first augmented reality device via a wireless broadcast from a source local to the visual item comprises:
downloading one or more augmentations regarding the visual item at the first augmented reality device from a source local to the visual item.

33. The method of claim 1, wherein the acquiring one or more augmentations regarding the visual item at the first augmented reality device via a wireless broadcast from a source local to the visual item comprises:
acquiring one or more augmentations regarding the visual item at the first augmented reality device via a wireless broadcast from a device positioned at a geographical location of the visual item.

34. The method of claim 1, wherein the transmitting the one or more augmentations regarding the visual item and one or more visibility rules to at least one second augmented reality device to facilitate display of the one or more augmentations regarding the visual item in response to detection of a different instance of the visual item comprises:
transmitting the one or more augmentations regarding the visual item and one or more visibility rules to at least one second augmented reality device that is geographically remote from the first augmented reality device to facilitate display of the one or more augmentations regarding the visual item in response to detection of a different instance of the visual item, wherein the at least one second augmented reality device is outside a communication range of the source local to the visual item.

35. A computationally-implemented system comprising:
at least one computing device; and
one or more instructions that, when executed by the at least one computing device, program the at least one computing device for:
performing recognition at a first augmented reality device to identify a real-world visual item that is physically present within a real-world environment visible within a field of view of the first augmented reality device;
acquiring, at the first augmented reality device, one or more augmentations received from one or more wireless transmitters located within broadcast range to the real-world visual item, the one or more augmentations providing information regarding the real-world visual item that is physically present within the real-world environment;
displaying, via the first augmented reality device, a first augmented view of a first real-world scene including the one or more augmentations in association with the real-world visual item; and
transmitting the one or more augmentations to at least one second augmented reality device that is remote from the first augmented reality device to facilitate display of at least part of the one or more augmentations within a second augmented view of a second real-world scene viewed by the at least one second augmented reality device that includes at least one substantially similar additional instance of the real-world visual item.

36. A system comprising:
circuitry configured for performing recognition at a first augmented reality device to identify a real-world visual item that is physically present within a real-world environment visible within a field of view of the first augmented reality device;
circuitry configured for acquiring, at the first augmented reality device, one or more augmentations received from one or more wireless transmitters located within broadcast range to the real-world visual item, the one or more augmentations providing information regarding the real-world visual item that is physically present within the real-world environment;
circuitry configured for displaying, via the first augmented reality device, a first augmented view of a first real-world scene including the one or more augmentations in association with the real-world visual item; and
circuitry configured for transmitting the one or more augmentations to at least one second augmented reality device that is remote from the first augmented reality device to facilitate display of at least part of the one or more augmentations within a second augmented view of a second real-world scene viewed by the at least one second augmented reality device that includes at least one substantially similar additional instance of the real-world visual item.

* * * * *